(12) United States Patent
Shimomura et al.

(10) Patent No.: US 6,480,289 B1
(45) Date of Patent: Nov. 12, 2002

(54) POSITION MEASURING APPARATUS AND OPTICAL DEFLECTION ANGLE MEASURING APPARATUS FOR UNDERGROUND EXCAVATORS

(75) Inventors: Yoshiaki Shimomura, Nagasaki (JP); Naoki Miyanagi, Ibaraki (JP); Takashi Moro, Ibaraki (JP)

(73) Assignee: Hitachi Construction Machinery Co. Ltd., Tokyo (JP)

( * ) Notice: Subject to any disclaimer, the term of this patent is extended or adjusted under 35 U.S.C. 154(b) by 0 days.

(21) Appl. No.: 09/331,865
(22) PCT Filed: Oct. 16, 1998
(86) PCT No.: PCT/JP98/04689
§ 371 (c)(1), (2), (4) Date: Oct. 13, 1999
(87) PCT Pub. No.: WO99/22201
PCT Pub. Date: Jun. 5, 1999

(30) Foreign Application Priority Data

Oct. 29, 1997 (JP) ............................................. 9-297295

(51) Int. Cl.⁷ .............................................. G01B 11/14
(52) U.S. Cl. ...................................................... 356/614
(58) Field of Search ................................. 356/614–624, 356/138–154

(56) References Cited

U.S. PATENT DOCUMENTS 4,513,504 A * 4/1985 Nussbaumer et al. ........ 356/153
4,656,743 A * 4/1987 Thiemann et al. ........... 356/153
4,666,300 A * 5/1987 Zollman et al. ............. 356/141

FOREIGN PATENT DOCUMENTS

| JP | 5-296768 | 11/1993 |
| JP | 06221853 | 8/1994 |
| JP | 08136256 | 5/1996 |
| JP | 08304072 | 11/1996 |
| JP | 09033246 | 7/1997 |

* cited by examiner

Primary Examiner—Frank G. Font
Assistant Examiner—Amanda Merlino
(74) Attorney, Agent, or Firm—Crowell & Moring LLP

(57) ABSTRACT

An optical deflection angle measuring apparatus which, upon optically measuring a deflection angle, does not require an operation for directing a light onto a position detecting element and makes it possible to obtain measurement results without being affected by external force such as vibrations. A detector 410 is constructed with a common lens 411 for converging diffuse lights from light sources 41,42. Position detecting elements 412-2,412-1 receive the thus-converged lights from the light sources 41,42 and detect received positions of the converged lights. Reflecting prisms 413-1,413-2 allow the diffuse lights from the light sources 41,42 to be transmitted and guided so that the diffuse lights from the light sources 42,41, are converged, by the lens 411, onto the position detecting elements 412-1,412-2. The respective position detecting elements are arranged so as not to interfere with the convergence of the lights by the lens 411. The deflection angle Φ can then be measured by computation.

12 Claims, 25 Drawing Sheets

POSITION MEASURING APPARATUS AND OPTICAL DEFLECTION ANGLE MEASURING APPARATUS FOR UNDERGROUND EXCAVATORS

TECHNICAL FIELD

This invention relates to a position measuring apparatus for an underground excavator, which is useful in measuring a position of excavation by the underground excavator, such as a pipe-jacking machine or a shield machine, which is advancing in the ground while excavating a tunnel, to an optical deflection angle measuring apparatus for measuring with lights a deflection angle between two line segments connecting a cardinal point to respective points set on opposite sides of the cardinal point with distances left from the cardinal point, and also to a position measuring apparatus for an underground excavator, which by using this optical deflection angle measuring apparatus, measures a position of excavation by the underground excavator advancing along a curved path.

BACKGROUND ART

For an underground excavator such as a pipe-jacking machine or a shield machine which advances in the ground while excavating a tunnel, it is necessary to enable the excavator to accurately advance along a planned line which is a preset advancing route. For this purpose, it is desired to make it possible to measure the current position of the advancing underground excavator in real time and accurately. Namely, if the underground excavator begins to advance off the planned line, an operator can quickly find out this problem and can take a countermeasure at an early stage if the operator is provided in real time with highly-reliable information on the current position of the underground excavator. Control can therefore be performed with ease to make the underground excavator advance along the planned line, and improvements in the accuracy of the work can also be expected. As techniques for measuring a position of excavation by an underground excavator, a variety of methods have been used to date including a method in which "a measurement is performed manually by using a transit", a method in which "a position of excavation by an underground excavator is measured by arranging an oscillating coil, which generates an induction field, on the underground excavator and measuring the intensity of the induction field with a receiving coil arranged on the ground", and a method in which "a position of excavation by an underground excavator is measured by laying a cable way conversely on the ground, causing a current to flow through the cable way to generate an induction field, and detecting the intensity of the induction field with a receiving coil arranged on the underground excavator". However, these conventional techniques for the measurement of positions of underground excavators are inherently incapable of performing real-time measurements of positions of excavation or, even if such real-time measurements are feasible theoretically, can hardly be put into practical use.

As a position measuring technique for an underground excavator, which can reduce these problems, a direction detecting apparatus for a shield machine has been proposed as disclosed in JP 61-45092 A. This direction detecting apparatus for the shield machine, which has been proposed previously, is an apparatus in which "a first laser beam oscillator for performing radiation into a forward tunnel and a first laser beam receiver capable of receiving a laser beam from a front are mounted on a base such that they can be turned in an X direction (yawing direction) and an Y direction (pitching direction) by servomotors, a measuring instrument capable of detecting their turned angles by sensors is arranged in an entrance section to the tunnel, a second laser beam oscillator for performing radiation toward a first laser beam receiver at a rear, a second laser beam receiver capable of receiving a laser beam from the first laser beam at the rear and a third laser beam oscillator for performing radiation toward the shield machine at a front are arranged on a base such that they can be turned in the X direction and the Y direction by servomotors, a measuring relay designed to detect their turned angles is arranged in an intermediate section of the tunnel, and a third laser beam receiver and a pitching-rolling meter, which can receive a laser beam from the second laser beam oscillator at the rear and can detect the X and Y directions and a rolling angle, respectively, are arranged on the shield machine".

Upon performing construction work on the ground or under the ground, it is necessary to determine an angle relationship between two line segments which connect a point, which serves as a cardinal point, to points set on opposite sides of the cardinal point with distances left from the cardinal point. Upon constructing a curved or bent road, it is necessary to determine the angle of the curved or bent part of the road surface under construction. In this case, a measurement point which serves as a cardinal point is set at a suitable place in the curved or bent part, measurement points are also set in road-surface working zones on the opposite sides of the cardinal point with distances left from the cardinal point, and an angle between line segments connecting the measurement point as the cardinal point to the respective measurement points on the opposite sides of the cardinal point is measured. To excavate a curved tunnel by an underground excavator, the position of excavation must be ascertained to determine whether or not the underground excavator is accurately advancing along a planned route (preset advancing route). In this case, it is also necessary to determine an angle relationship between line segments connecting a measurement point, which serves as a cardinal point, to respective measurement points on opposite sides of the cardinal point, as will be described in detail subsequently herein. To determine an angle relationship between line segments on opposite sides of such a cardinal point as an apex, either an interior angle or an exterior angle of both the line segments can be measured, and this object can be achieved if a value concerning such an angle as enabling to automatically specify the angle relationship can be measured. In this specification, a value concerning such an angle as enabling to specify the angle relationship between such two line segments is called a "deflection angle".

In construction work, a measuring method making use of a transit has been adopted to date in general to measure such deflection angles. As this measuring method of a deflection angle by a transit is a method which relies upon human ability, it requires labor such as a skilled worker and moreover, takes a long time for each measurement. In addition, a turning mechanism is required to turn a telescope in a yawing direction (horizontal direction) and a pitching direction (vertical direction), so that mechanical measurement errors tend to occur due to this turning mechanism, thereby making it difficult to assure high measuring accuracy. Furthermore, if external force such as that causing tilting in the yawing direction and/or pitching direction, such as vibrations, is applied, a measurement error takes place by such external force, thereby affecting the results of the measurement.

Incidentally, upon excavating a curved tunnel by an underground excavator which advances in the ground while excavating a tunnel, the position of excavation by the underground excavator is measured so that the underground excavator can accurately advance along a planned route. Examples of underground excavators of this type can include small-diameter pipe-jacking machine for burying in the ground small-diameter pipes which men cannot enter and semi-shield and shield machines for burying in the ground large-diameter pipes which men can enter. To measure the position of excavation by such an underground excavator, it is the general practice to set a measuring start point and a measuring end point at a position—which serves as a start pint for excavation by the underground excavator, such as a starting shaft—and within the underground excavator, respectively, and also to set a suitable number of intermediate measuring points between the measuring start point and the measuring end point as the excavation by the underground excavator proceeds. By measuring distances between these measuring points and also measuring deflection angles between line segments connecting each intermediate measuring point and its adjacent measuring points on opposite sides of the intermediate measuring point, the position of excavation by the underground excavator is determined by computation on the basis of the results of these measurements. When measuring such deflection angles in the course of the measurement of positions of excavation by the underground excavator, the method in which measurements are performed by a transit has also been adopted to date. The method which makes use of a transit, however, takes a long time for each measurement and requires labor as mentioned above and, especially when measurements are performed in a narrow tunnel, the measurement work involves a great deal of labor and danger. As techniques for measuring the position of excavation by an underground excavator of this type, there are techniques which have adopted a method which optically measures a deflection angle by a laser beam without relying upon a transit.

As a representative example of the techniques which had adopted such a method for the measurement of the position of excavation by an underground excavator, the technique disclosed in JP 5-340186 A can be mentioned by way of example. According to the technique disclosed in JP 5-340186 A (hereinafter called "the conventional technique"), "a laser aiming system having an angle measuring function is arranged in front of a rear collimation point set in a curved tunnel, a position detecting element (photoelectric element) provided with a miniature reflecting prism is arranged as a target within a shied machine, and a suitable number of wedge prisms—each of which is equipped with a range finder capable of measuring the direction change angle of a laser beam obtained by refracting a laser beam from the laser aiming system—are arranged as the excavation by the underground excavator proceeds.

Upon measuring the position of excavation by an underground excavator by this conventional technique, each wedge prism is caused to turn by a remote operation such that a laser beam from a laser aiming system is always directed through the wedge prism onto a target in the shield machine. As the laser beam from the laser aiming system, which has been transmitted through the wedge prism, is directed onto the position detecting element as the target, the position of a laser spot can be detected, the deflection angle at the point where the wedge prism is arranged is measured by the quantity of turning of the wedge prism, and the distance between the individual measuring points is also measured by the range finder of the wedge prism. According to this conventional technique, the position of excavation by the underground excavator is measured in terms of coordinate positions on the basis of the distances between the respective measuring points, the deflection angle and the position of the laser spot obtained as described above.

According to the former conventional apparatus, the laser beam oscillator is caused to turn in the yawing direction and/or the pitching direction such that a laser beam, which is a laser light of a high convergence degree, is irradiated to a predetermined position on a laser beam receiver. The turned angle or angles are detected, and based on the turned angle or angles so detected, the position of the shield machine offset from the planned line is computed and determined by a computer. Upon measuring the position of excavation by the underground excavator, an operation for turning the laser beam oscillator to precisely direct a laser beam to the predetermined position on the laser beam receiver is therefore needed. This makes the operation complex and moreover, requires a turning mechanism for turning the laser beam oscillator, such as servomotors, thereby also making the mechanism complex. As a consequence, various problems have arisen. For example, because of the provision of such a turning mechanism, the apparatus becomes too large as one to be arranged in a tunnel, and needless to say, requires higher manufacturing cost. As the turning mechanism is a mechanical one, mechanical errors are added to optical errors, thereby making it difficult to assure high measuring accuracy and also making the apparatus weak against vibrations.

On the other hand, the deflection angle measuring technique which is adopted in the latter conventional technique is a method in which a deflection angle is optically measured by a laser beam. Of the problems observed on the above-mentioned method making use of a transit, the problem that measurement errors occur due to mechanical measurement errors by the turning mechanism and external force such as vibrations therefore still remains unsolved, although the problems caused by the dependence on human ability, such as the need for labor and the requirement of a long time for each measurement, have been reduced. Described specifically, according to the deflection angle measuring technique making use of this conventional technique, to always direct a laser beam from the laser aiming system, said laser beam being a laser light of a high convergence degree, onto the position detecting element as a target by a turning operation of the wedge prism, the turning mechanism is required. Like the method making use of a transit, mechanical measurement errors tend to occur due to the turning mechanism, thereby making it difficult to assure high measuring accuracy.

Furthermore, according to the deflection angle measuring technique making use of this conventional technique, an application of external force, such as that causing tilting in the yawing direction or the pitching direction like vibrations, to the laser aiming system, the wedge prism or the target results in a measurement error by the external force, so that the measurement results of a deflection angle are affected significantly. This external force, such as vibrations, is applied by vibrations of street traffic or construction work, wind force or the like on the ground or by yawing or pitching of an underground excavator or vibrations due to excavation by the underground excavator or falling of earth in the ground. Especially in the measurement of the position of excavation by the underground excavator, the measurement results of a deflection angle affects the measurement results of the position of excavation to a considerable extent and moreover, there is a high degree of need for the accurate measurement of deflection angles because such deflection angles are often measured at gently curved places. When a measurement error takes place due to a mechanical measurement error associated with the turning mechanism or external force such as vibrations, the measurement results of the position of excavation by the underground excavator are affected considerably.

The present invention is intended to eliminate these problems which are observed on the conventional techniques, and has as a first object the provision of a position measuring apparatus for an underground excavator, which upon measuring a position of excavation by the underground excavator, does not need an operation for directing a light onto light-receiving means and hence does not require any mechanism for such an operation.

Further, the present invention also has as a second object the provision of an optical deflection angle measuring apparatus which upon optically measuring a deflection angle, does not require an operation for directing a light onto a position detecting element and prevents external force such as vibrations, even when applied, from affecting the measurement results.

DISCLOSURE OF THE INVENTION

The first object of the present invention is achieved by a position measuring apparatus for an underground excavator, said apparatus being useful in measuring a position of excavation by the underground excavator advancing in the ground while excavating a tunnel and being adapted to measure a position of a measured point, which is arranged at a front in an excavating direction and serves as an indication for the position of excavation, on a basis of its positional relationship with a measuring cardinal point arranged at a rear in the excavating direction and serving as a cardinal point for the measurement, comprising:

a cardinal-point measuring unit for setting the measuring cardinal point, said cardinal-point measuring unit having a light source capable of emitting a diffuse light forward, converging means capable of converging a diffuse light from a forward light source, and light-receiving means arranged such that the light-receiving means can receive a light converged by the converging means and can detect a direction of the forward light source on a basis of a position of the light so received;

a measured-point measuring unit for setting the measured point, said measured-point measuring unit having a light source capable of emitting a diffuse light rearward, converging means capable of converging a diffuse light from a rear light source, and light-receiving means arranged such that the light-receiving means can receive a light converged by the converging means and can detect a direction of the rear light source on a basis of a position of the light so received;

at least one intermediate measuring unit arranged between the cardinal-point measuring unit and the measured-point measuring unit in the tunnel and having a light source capable of emitting diffuse lights forward and rearward, converging means capable of converging diffuse lights from forward and rearward light sources, respectively, and light-receiving means arranged such that the light-receiving means can receive respective lights converged by the converging means and can detect directions of the forward and rearward light sources on a basis of positions of the respective lights so received; and computing means for computing and measuring a position of the measured point relative to the measuring cardinal point on a basis of data, which are concerned with the directions of the respective light sources as determined based on detection results at the respective measuring units consisting of the cardinal-point measuring unit, the measured-point measuring unit and the intermediate measuring unit, and data on distances between the individual measuring units and their adjacent measuring units.

Owing to the adoption of these technical means in the position measuring apparatus of the present invention for the underground excavator, the intermediate measuring unit converges by converging means diffuse lights from the front and rear light sources of the adjacent measuring units located at the front and rear of the intermediate measuring unit, the thus-converged lights are received by the corresponding light-receiving means, directions of the front and rear light sources relative to the intermediate measuring unit can be detected based on the positions of the respective lights so received, and data on the directions of the individual light sources can be obtained based on the detection results. In this case, the light sources capable of emitting diffuse lights are used as light sources, and the diffuse lights from the light sources are converged by the converging means and are directed onto the light-receiving means. Unlike the conventional art, it is therefore unnecessary to perform an operation for directing a light from each light source onto its corresponding light-receiving means. Once the data on the directions of the respective light sources are obtained as described above, the angles of individual advancing routes, which connect the adjacent measuring units with each other, relative to a starting direction line can be indirectly determined by computation without directly detecting them from their relationships with the starting direction line. In this case, even when the intermediate measuring unit and the measured-point measuring unit deviate depending on their spatial positions upon mounting or deviate depending on yawing or pitching while the underground excavator is advancing, the angles can be accurately determined under conditions with such influence excluded. If data concerning the distances between the individual measuring units and their adjacent measuring units are separately collected by a suitable method, the position of the measured point relative to the measuring cardinal point can be computed and measured from the above-described data on the respective angles as determined by computation and also from the data on the respective distances.

The second object of the present invention is achieved by an optical deflection angle measuring apparatus for measuring with lights a deflection angle between two line segments connecting a cardinal point to respective points set on opposite sides of the cardinal point with distances left from the cardinal point, comprising:

deflection-angle measuring light sources for emitting diffuse lights, said deflection-angle light sources being arranged at the respective points set on the opposite sides of the cardinal point; and a deflection-angle measuring detector arranged at the cardinal point and provided with:

a common converging means for converging at least portions of the diffuse lights from the respective light sources, position detecting elements for receiving the lights, which have been emitted from the respective light sources and have been converged by the converging means, and detecting received positions of the converged lights, and light-direction changing means for changing direction of at least portions of the diffuse lights from the respective light sources, which are about to enter the converging means, such that the at least portions of the diffuse lights are allowed to be transmitted and lights, which have been emitted from the respective light sources and have then been converged by the converging means, are guided to the corresponding position detecting elements;

wherein the respective position detecting elements are arranged at positions where the position detecting elements do not block the diffuse lights from the respective light sources, said diffuse lights being about to enter the converging means, whereby the deflection-angle measuring detector is constructed and a deflection angle between optical axes of the respective light sources can be calculated by computation on a basis of results of detections by the respective position detecting elements.

The optical deflection angle measuring apparatus according to the present invention, upon optically measuring a deflection angle, does not require an operation for directing a light onto each position detecting element unlike the case making use of laser beams as light sources, because as described above, the light sources capable of emitting especially diffuse lights are used as the deflection angle measuring light sources, which are arranged at the respective points set on the opposite sides of the cardinal point, to permit illumination of wide areas with spread lights and coupled with this, the spread lights from the respective light sources are converged by the converging means and received at the corresponding position detecting elements to determine the received positions of the lights and the deflection angles between the optical axes of the individual light sources can be obtained based on the respective detection results. Further, the light direction changing means are arranged to transmit at least portions of the diffuse lights from the respective light sources, said diffuse lights being about to enter the converging means, and also to change the directions of the lights form the respective light sources, said lights being about to be converged by the converging means, such that the thus-converged lights are guided to the corresponding position detecting elements, and the individual position detecting elements are arranged at positions where the, individual position detecting elements do not block the corresponding diffuse lights which are about to enter the converging means. The incidence of the diffuse lights from the corresponding light sources into the converging means is therefore not prevented by the corresponding position detecting elements. It is accordingly not required to provide each light source with its own converging means for converging a diffused light, and a common converging means can be used for the light sources. Owing to these features, even when external force such as vibrations in the pitching or yawing direction is applied to the deflection angle measuring detectors or light sources, the measurement results of the deflection angle are not affected by such external force. Moreover, the measurement results of the deflection angle are not affected by the spatial positions of the mounted detectors and light sources insofar as the setting of positions is accurately conducted upon mounting the detectors and light sources.

BEST MODES FOR CARRYING OUT THE INVENTION

1. First Embodiment

With reference to the drawings, a description will be made about modes for carrying out the invention.

Figure 1:
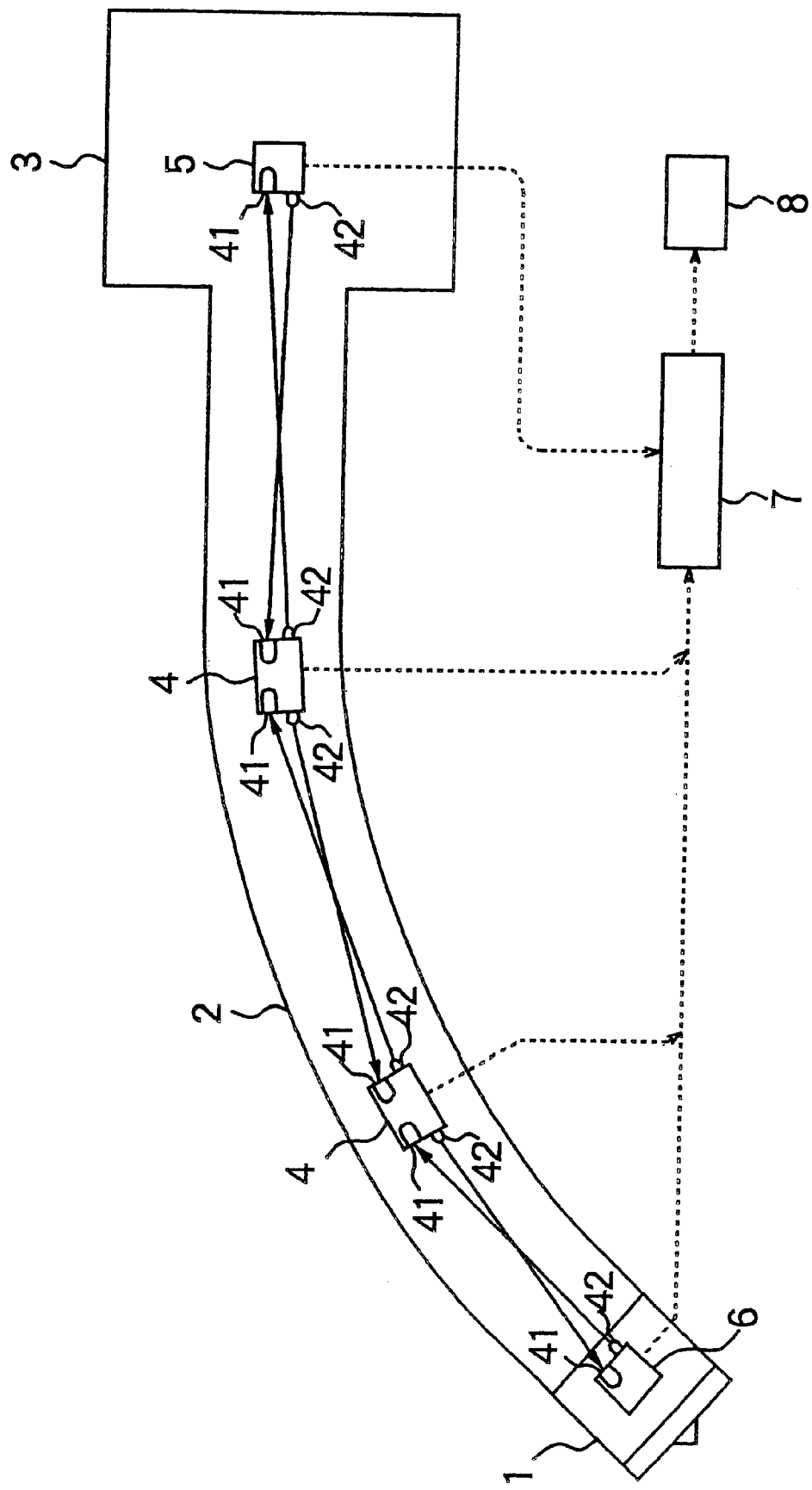
FIG. 1 is a horizontal cross-sectional view schematically illustrating the overall features of a position measuring apparatus for an underground excavator, which relates to a first specific example of a first embodiment of the present invention.
Figure 2:
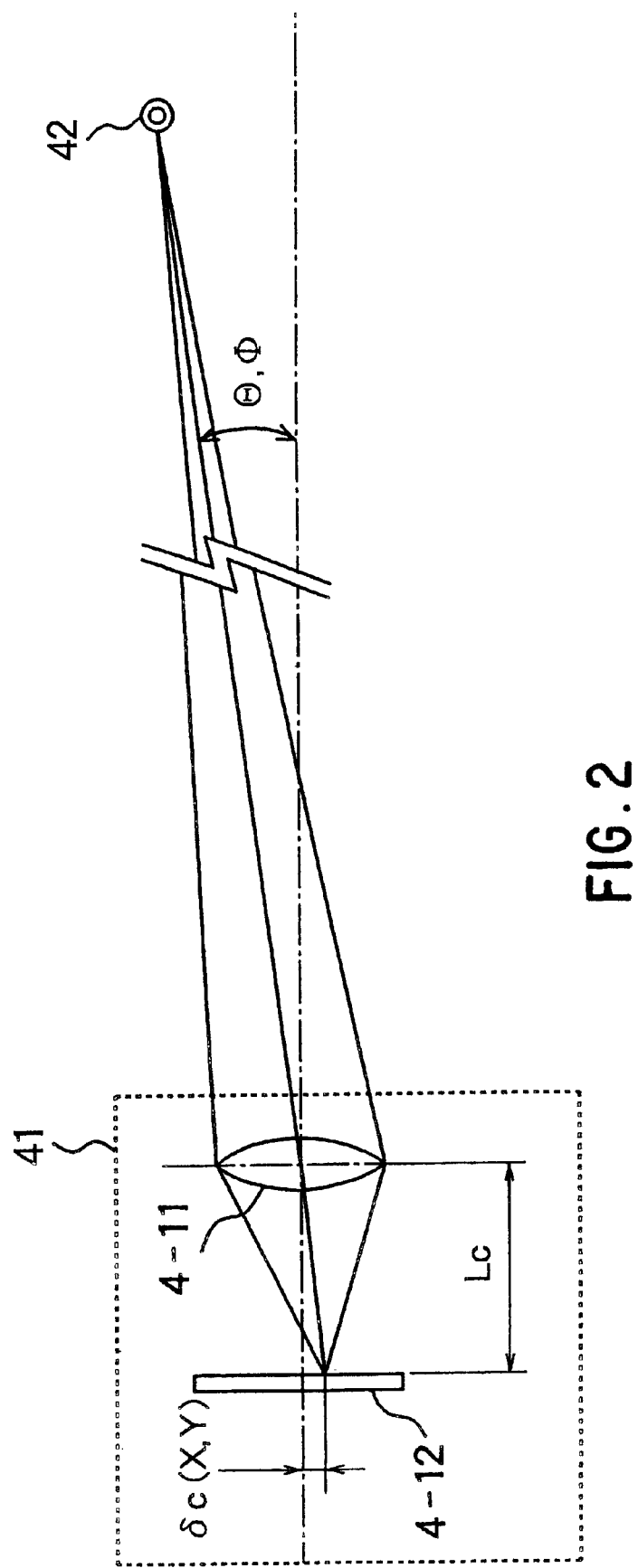
FIG. 2 is a concept diagram illustrating the principle of detection of the direction of a light source by a measuring unit in the position measuring apparatus of FIG. 1 for the underground excavator.
Figure 4:
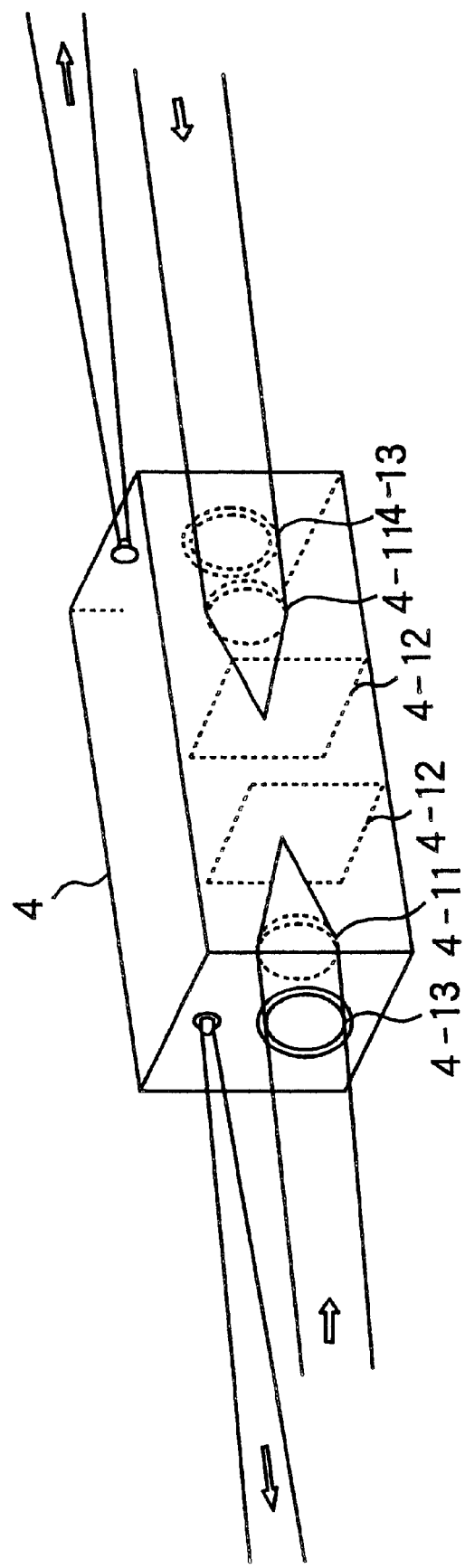
FIG. 4 is a perspective view depicting images upon operation of the intermediate measuring unit in the position measuring apparatus of FIG. 1 for the underground excavator.
Figure 5:
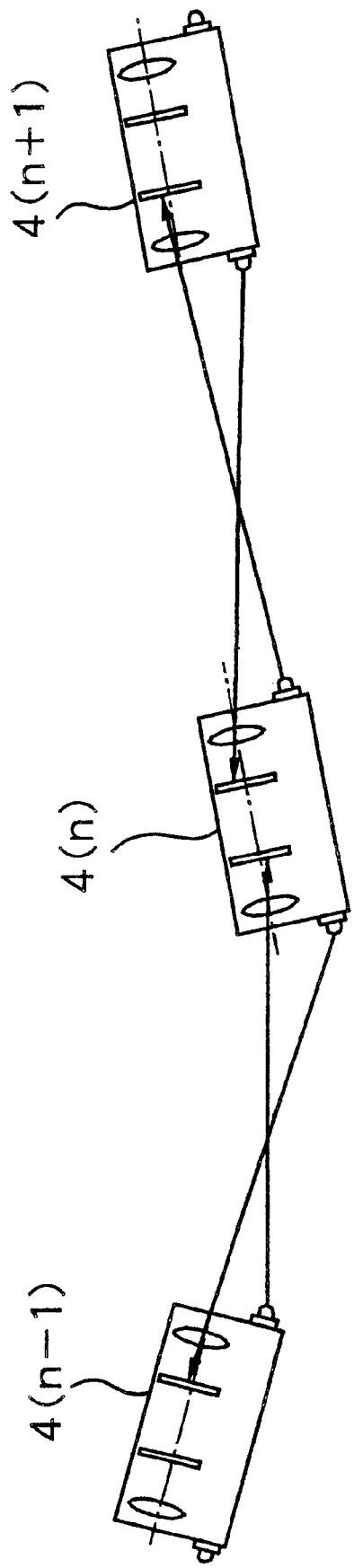
FIG. 5 is a fragmentary horizontal cross-sectional view illustrating a situation where lights are being transmitted and received in the position measuring apparatus of FIG. 1 for the underground excavator.
Figure 6:
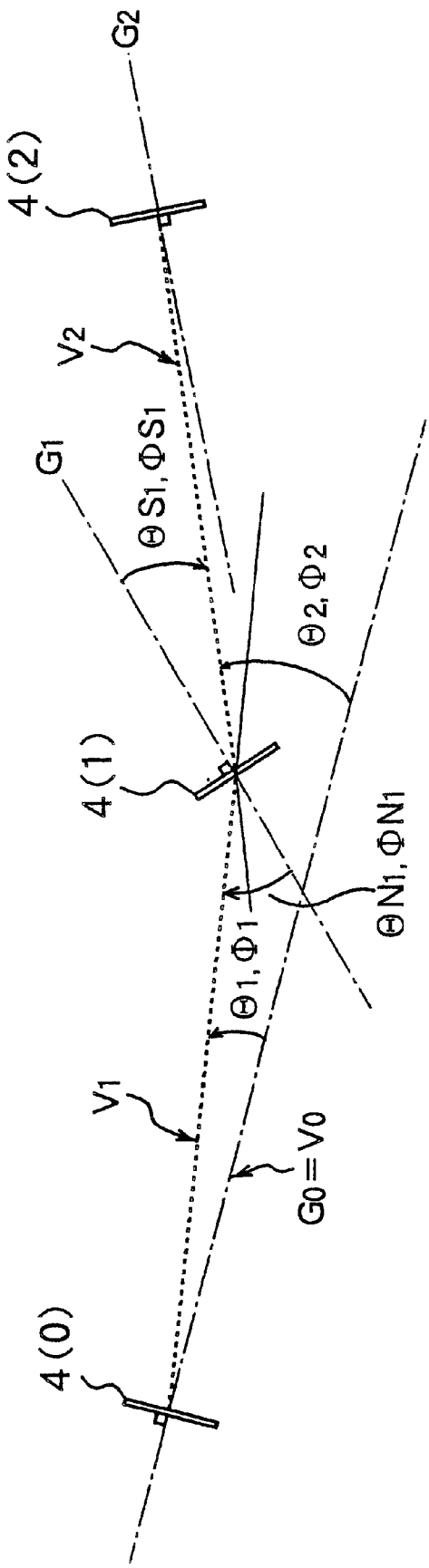
FIG. 6 is a concept diagram illustrating a method for calculating the direction of a measuring unit close to a measuring cardinal point in the position measuring apparatus of FIG. 1 for the underground excavator.
Figure 7:
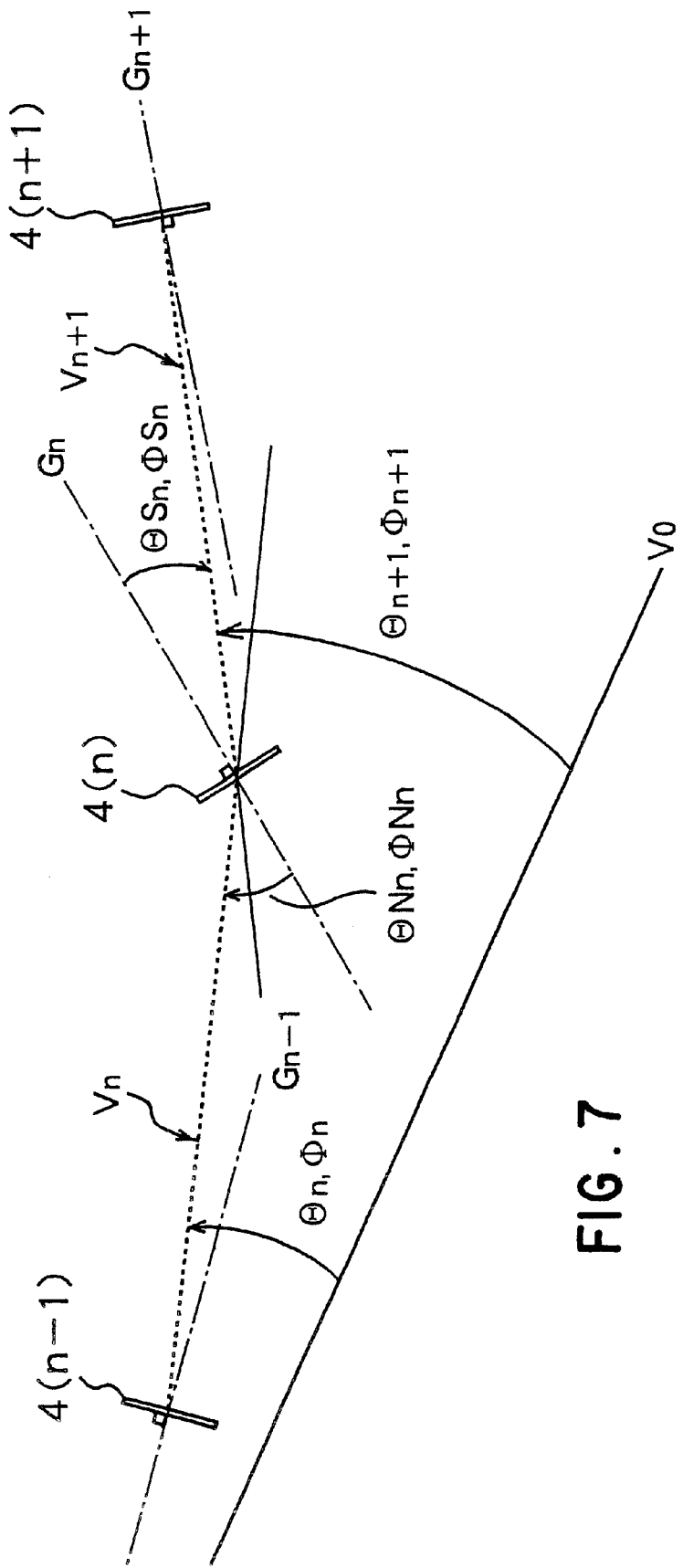
FIG. 7 is a concept diagram illustrating a method for calculating the direction of a measuring unit at a desired point in the position measuring apparatus of FIG. 1 for the underground excavator.
Figure 8:
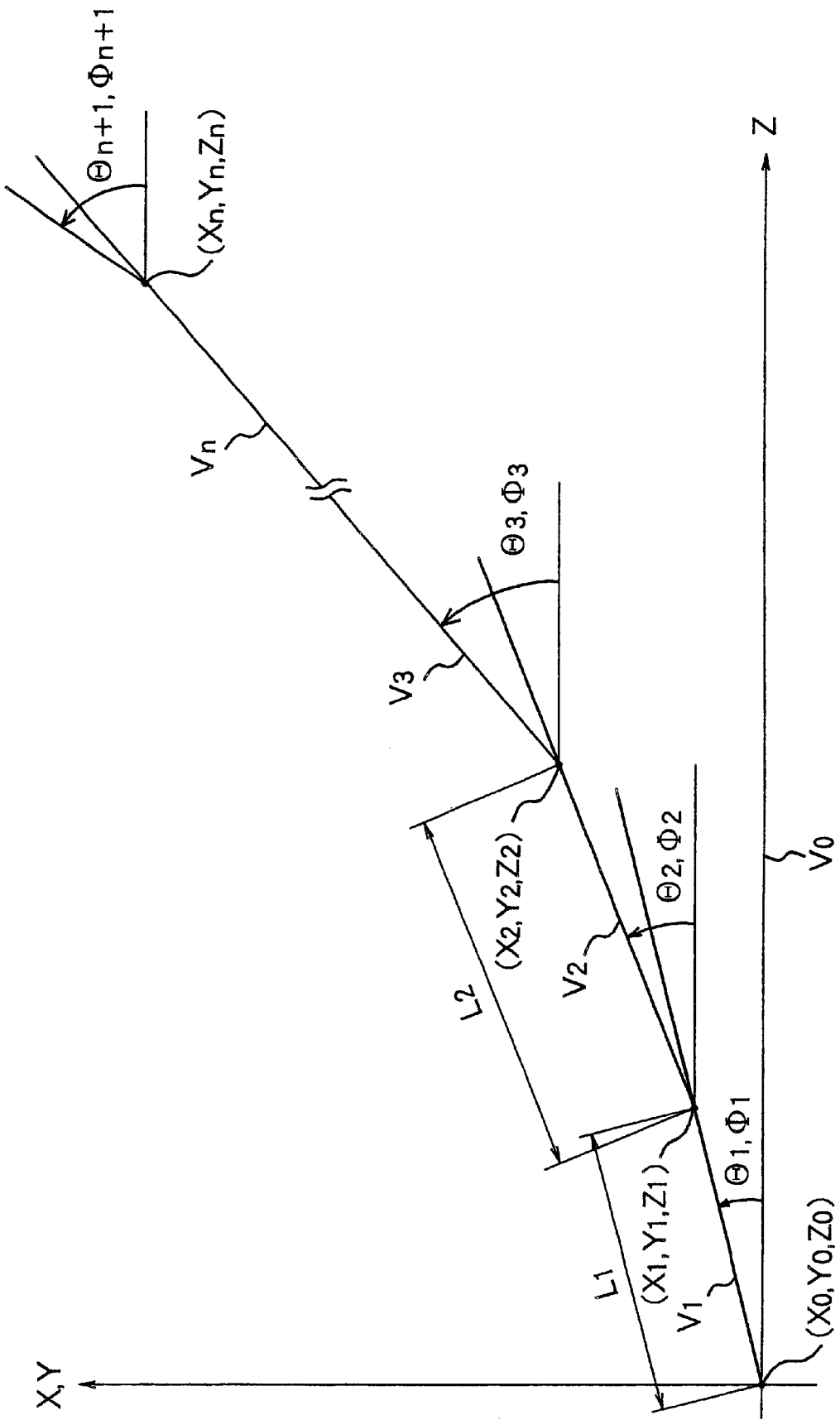
FIG. 8 is a concept diagram illustrating a basic principle of calculation and determination of a position of excavation by the underground excavator by using the position measuring apparatus of FIG. 1 for the underground excavator.
Figure 9:
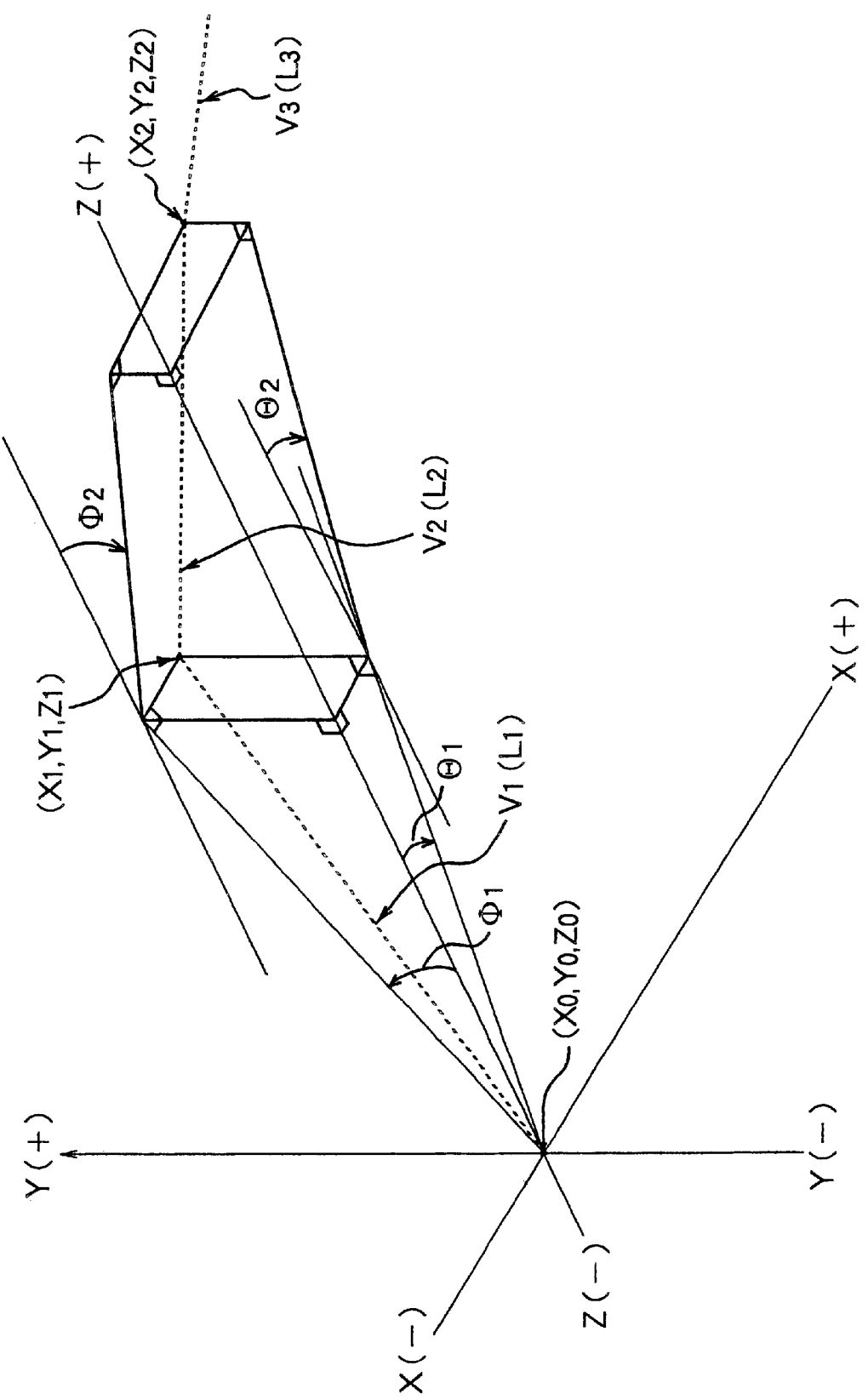
FIG. 9 is a concept diagram illustrating a practical method for calculating and determining a position of excavation by the underground excavator by using the position measuring apparatus of FIG. 1 for the underground excavator.

The position measuring apparatuses for underground excavators, which relate to this embodiment, are all useful in measuring positions of excavation by the underground excavators which are advancing in the ground while excavating tunnels, and are apparatuses each of which measures the position of a measured point, which is arranged at a front in an excavating direction and serves as an indication of the position of excavation, based on a positional relationship with a measuring cardinal point which is arranged at a rear in the excavating direction and serves as a cardinal point for the measurement. First of all, using FIG. 1 through FIG. 9, a description will be made about the position measuring apparatus for the underground excavator, which relates to the first specific example of the present invention. FIG. 1 is a horizontal cross-sectional view schematically illustrating the overall features of a position measuring apparatus for an underground excavator, which relates to a first specific example of a first embodiment of the present invention, FIG. 2 is a concept diagram illustrating the principle of detection of the direction of a light source by a measuring unit in the position measuring apparatus of FIG. 1 for the underground excavator, FIG. 3 is a horizontal cross-sectional view showing in detail an intermediate measuring unit in the position measuring apparatus of FIG. 1 for the underground excavator, FIG. 4 is a perspective view depicting images upon operation of the intermediate measuring unit in the position measuring apparatus of FIG. 1 for the underground excavator, FIG. 5 is a fragmentary horizontal cross-sectional view illustrating a situation where lights are being transmitted and received in the position measuring apparatus of FIG. 1 for the underground excavator, FIG. 6 is a concept diagram illustrating a method for calculating the direction of a measuring unit close to a measuring cardinal point in the position measuring apparatus of FIG. 1 for the underground excavator, FIG. 7 is a concept diagram illustrating a method for calculating the direction of a measuring unit at a desired point in the position measuring apparatus of FIG. 1 for the underground excavator, FIG. 8 is a concept diagram illustrating a basic principle of calculation and determination of a position of excavation by the underground excavator by using the position measuring apparatus of FIG. 1 for the underground excavator, and FIG. 9 is a concept diagram illustrating a practical method for calculating and determining a position of excavation by the underground excavator by using the position measuring apparatus of FIG. 1 for the underground excavator.

In FIG. 1 through FIG. 4, there are shown an excavator 1 as a principal unit of an underground excavator, a tunnel 2 such as a gallery excavated by a shield machine or a pipe drain excavated by a pipe-jacking machine, a starting shaft 3 as a starting point for excavation by the underground excavator, intermediate measuring units 4 arranged between a below-described cardinal-point measuring unit 5 and a below-described measure-point measuring unit 6 in the tunnel 1, the cardinal-point measuring unit 5 arranged in the starting shaft 3, the measured-point measuring unit 6 arranged in the excavator 1, a central processing unit 7 connected with these intermediate measuring units 4, cardinal-point measuring unit 5 and measured-point measuring unit 6 via communication lines, respectively, and adapted to compute a position of excavation by the underground excavator, and a display 8 for displaying the results of computation by the central processing unit 7 and information available based on the computation results in the form of numeral values and/or graphs for the convenience of operation by an operator. The excavator 1 can be any excavator insofar as it is an excavator of an underground excavator which advances in the ground while excavating a tunnel, such as a pipe-jacking machine or a shield machine. In the tunnel 2, the tunnel wall is formed with underground pipes such as hume pipes or steel pipes in the case of a pipe-jacking machine, or the tunnel wall is formed with steel or concrete segments in the case of a shield machine. Roughly describing, the intermediate measuring units 4, the cardinal-point measuring unit 5 and the measured-point measuring unit 6 are each composed of light-source-direction detecting means 41, each of which is constructed such that it receives a light from a light source 42 of its adjacent measuring unit and can detect the direction of the light, and light sources 42, and are not different in basic construction.

Figure 3:
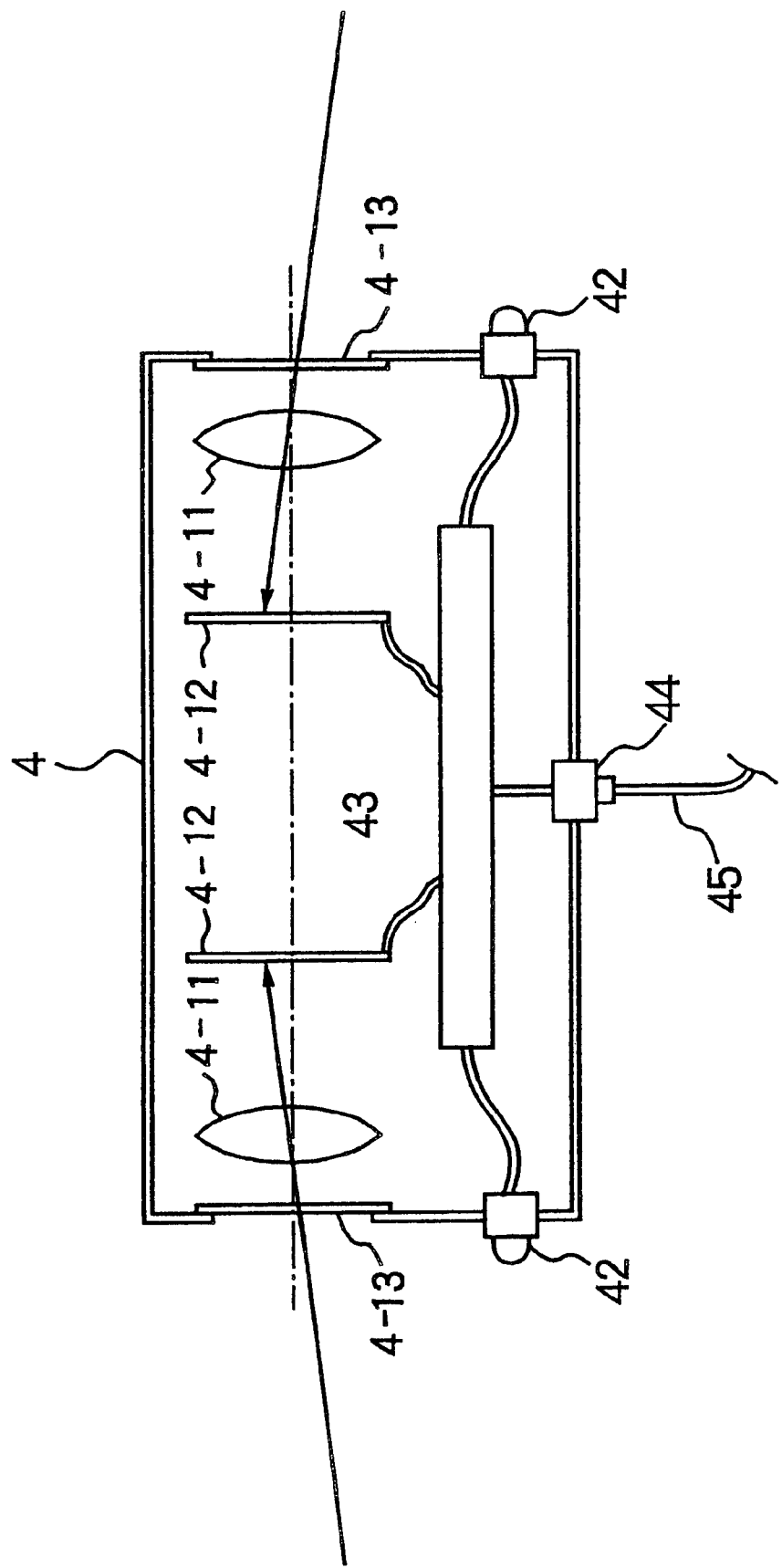
FIG. 3 is a horizontal cross-sectional view showing in detail an intermediate measuring unit in the position measuring apparatus of FIG. 1 for the underground excavator.

The construction of one of the intermediate measuring units 4, as a typical example of these measuring units 4,5,6, will be therefore described based on FIG. 3. As is shown in detail in FIG. 3, the intermediate measuring unit 4 is provided with the light sources 42, such as light-emitting diodes, capable of emitting diffuse lights toward the adjacent measuring units, convex lenses 4–11 as converging means capable of converging diffuse lights from the light sources 42 of the adjacent measuring units, and CCD image pickup devices 4–12 ("CCD" is an abbreviation of a Charge Coupled Device) as light-receiving means capable of receiving the lights converged by the convex lenses 4–11 and detecting the positions of the lights so received. Each CCD image pickup device 4–12 as the light-receiving means is arranged such that, as will be described in detail subsequently herein with reference to FIG. 2, the direction of the light source of its adjacent measuring unit can be detected relative to the associated convex lens 4–11 as the converging means on the basis of the position of the light so received. Each light-source-direction detecting means 41, which is illustrated in the drawings, is an assembled unit of the convex lens 4–11 and the CCD image pickup device 4–12. In each intermediate measuring unit 4, the light sources 42 are arranged apart from each other in a horizontal direction, respectively, such that they can emit diffuse lights forward and rearward, respectively, as viewed in the excavating direction of the underground excavator. Further, the convex lenses 4–11 are also arranged apart from each other in the horizontal direction such that they can converge corresponding diffuse lights from the light sources of the other measuring units which are adjacent in the front and in the rear, respectively, and the CCD image pickup devices 4–12 are also arranged apart from each other in the horizontal direction such that they can receive lights converged by the associated convex lenses 4–11, respectively. Each convex lens 4–11 and its associated CCD image pickup device 4–12 are arranged in parallel with each other and are secured within a casing of the corresponding intermediate measuring unit 4, while each light source 42 is attached to an outer wall of the casing.

Use of two-dimensional plane sensors as the CCD image pickup devices 4–12 is adopted as a premise in this specific example, although they can be one-dimensional line sensors. The CCD image pickup devices 4–12 are used as light-receiving means in this specific example, but PSDs (Position Sensitive Devices), which can determine light spots by using surface resistances of photodiodes, or the like may also be used instead. In essence, no particular limitation is imposed on the kind of the light-receiving means insofar as they can receive lights converged by converging means such as the convex lenses 4–11 and can detect the positions of the lights so received. As the light sources 42, so-called point light sources or the like are used, and those emitting lights of high convergence such as laser beams cannot be used. Nonetheless, any light sources can be used fundamentally insofar as they can emit radially-spreading lights from very small areas, that is, so-called diffuse lights. The intermediate measuring units 4 are disposed at intervals of from 5 m to 50 m in the tunnel 3 in many instances. The light sources 42 are needed to emit low-convergence lights having spreadability of illuminating substantially the entire area 5 m to 50 m ahead in the tunnel. Described specifically, a light which spreads at an angle of at least 5° to 10° is usable in the present invention although this varies depending upon the inner diameter of the tunnel 3. Accordingly, even a laser beam may still be practically usable provided that it is a low-convergence laser beam which spreads at an angle of the above-specified angle or greater. As has been described above in connection with the problems sought for solution by the present invention, the conventional apparatuses require an operation for turning a laser beam oscillator to precisely direct a laser beam onto a predetermined position on its corresponding laser beam receiver upon measuring a position of excavation by an underground excavator because they use laser beams as light sources. In the present invention, however, those capable of emitting diffuse lights are used as light sources. Even when the spatial position of any of the measuring units deviates during the excavation of the tunnel 2, the light of its own or adjacent light source 42 can be precisely directed onto its adjacent or own CCD image pickup device 4–12 as light-receiving means so that the above-mentioned operation can be obviated.

In addition to, the convex lenses 4–11, CCD image, pickup devices 4–12 and light sources 42 mentioned above, each intermediate measuring unit 4 is also provided with transparent plates 4–13, which are made of transparent glass and a controller unit 43 as additional elements. The transparent plate 4–13 are attached such that they cover respective light collecting bores formed in the front and rear walls of the intermediate measuring unit 4, whereby the transparent plates maintain the air-tightness of the casing and also protect the convex lenses 4–11 and the like inside the casing. The controller unit 43 is accommodated within the casing of the intermediate measuring unit 4, and to the controller unit, the CCD image pickup devices 4–12 and the individual light sources 42 are electrically connected and a cable 45 is also connected. This cable 45 is led out from an outlet formed in the casing and is connected to the central processing unit 7. Here, the cable 45 is led out through a gland 44 fitted in the outlet to keep the casing air-tight. The controller unit 43 is composed of a power supply unit for causing the light sources 42 to emit lights, a data processing unit for converting into numeral data image data oh light positions detected by the CCD image pickup devices 4–12 and processing the numeral data, a communication processing unit for outputting to the central processing unit 7 the data processed by the data processing unit, and the like. The data processing unit of the controller unit 43 also performs computation for converting data on light positions, which have been detected by the CCD image pickup devices 4–12, into data on the directions of the individual light sources 42 and also for correcting the thus-converted data. The cable 45 is internally provided with signal lines for transmitting and receiving communication signals between the communication processing unit of the controller unit 43 and the central processing unit 7 and also with a cable way for guiding a current from a power supply to the intermediate measuring unit 4.

A description has been made about the construction of the intermediate measuring unit 4. The cardinal-point measuring unit 5, on the other hand, is provided with a light source 42 capable of transmitting a diffuse light forward, a convex lens 4–11 capable of converging a diffuse light from the forward light source 42, and a CCD image pickup device 4–12 capable of receiving the light converged by the convex lens 4–11. Further, the measured-point measuring unit 6 is provided with a light source 42 capable of emitting a diffuse light rearward, a convex lens 4–11 capable of converging a diffuse light from the rearward light source 42, and a CCD image pickup device 4–12 capable of receiving the light converged by the convex lens 4–11. In other words, the cardinal-point measuring unit 5 and the measured-point measuring unit 6 are provided with structures which perform the functions of the front half and the functions of the rear half in the intermediate measuring unit 4, respectively. Except for this difference, there is no fundamental difference from the structure of the intermediate measuring units 4. As the cardinal-point measuring unit 5 and measured-point measuring unit 6, the intermediate measuring units 4 may therefore be used as they are, and upon setting them, they may be set such that they can be actuated only at the front half and the rear half, respectively, or they can be actuated by software only at the front half and the rear half, respectively. If measuring units for use as the intermediate measuring units 4 are also used as the cardinal-point measuring unit 5 and the measured-point measuring unit 6, the kinds of equipments to be manufactured can be reduced. This makes it possible not only to reduce the labor required for their manufacture and also to reduce the kinds of equipments to be used and hence to convenience the use of such equipments. Upon measuring a position of excavation by the underground excavator, it is necessary to set a measuring cardinal point as a cardinal point for the measurement and also a measured point which can serve as an indication representing a current position of the advancing underground excavator. The cardinal-point measuring unit 5 plays a role to set the measuring cardinal point, while the measure-point measuring unit 6 plays a role to set the measured point.

The principle of detections of the directions of the light sources 42 by the light-source-direction detecting means 41 of these measuring units 4,5,6 will be described with reference to FIG. 2. Upon describing the individual specific examples led by the following description, a horizontal coordinate axis (shortly speaking, a horizontal axis) on a three-dimensional position coordinate system will hereinafter be referred to as "X-axis", a vertical coordinate axis (shortly speaking, a vertical axis) on the three-dimensional position coordinate system as "Y-axis", and a horizontal coordinate axis (shortly speaking, a front-to-back axis) intersecting X-axis at a right angle on the three-dimensional position coordinate system as "Z-axis". Now, assume that, as is illustrated in FIG. 2, the convex lens 4–11 and the CCD image pickup device 4–12 are arranged in parallel with each other at an interval Lc and a diffuse light is emitted from the light source 42 of the adjacent measuring unit. An image of the light source 42 is transmitted through the convex lens 4–11 and is then formed on the surface of the CCD image pickup device 4–12. In this case, the following formulas can be established:

$$\tan \Theta = \delta cX/Lc \quad (1)$$

$$\tan \Phi = \delta cY/Lc \quad (2)$$

where $\Theta$: an X-Z plane component of an angle which an optical axis (which means a line connecting the light source 42 with a center of the convex lens 4–11; this meaning will apply equally hereinafter) forms with a base line (which means a line extending through the center of the convex lens 4–11 and intersecting the plane of the CCD image pickup device 4–12 at a right angle; this meaning will apply equally hereinafter), $\Phi$: a Y-Z plane component of the same angle (a turning angle about X-axis), $\delta cX$: an X-axis component of an offset of an image-forming point of an image of the light source 42 on the surface of the CCD image pickup device 4–12 from the base line (i.e., a deviation of the image-forming point of the light source 42 on the surface of the CCD image pickup device 4–12 from a center of the CCD image pickup device 4–12), and $\delta cY$: a Y-axis component of the offset.

From the formula (1) and the formula (2), the angle $\Theta$ and the angle $\Phi$ can be determined by computation on the basis of $\delta cX/Lc$ and $\delta cY/Lc$, respectively. Based on this principle, the directions of the respective light sources 42 can be detected by the light-source-direction detecting means 41 of the corresponding measuring units 4,5,6 on the basis of the positions of lights as detected by the associated CCD image pick-up devices 4–12. The actual computation of the angles $\Theta$, $\Phi$ on the basis of $\delta cX/Lc$ and $\delta cY/Lc$ may be performed by the central processing unit 7, although it is performed by the computing means of the controller unit 43 in this specific example.

It is however to be noted that the angles $\Theta$, $\Phi$ are angles which the optical axis of the measuring unit forms with the base line of the same measuring unit, are not angles to be formed relative to a starting direction upon starting the underground excavator, and cannot be used as indications for determining an advancing direction of the underground excavator. Moreover, the base line itself of the measuring unit deviates depending on the spatial position of the measuring unit upon its mounting and also deviates by yawing or pitching during advancing of the underground excavator. Simple use of the above-described angles $\Theta$, $\Phi$ detected by the light-source-direction detecting means 41, therefore, cannot make it possible to correctly compute the advancing direction of the underground excavator. With the foregoing in view, the intermediate measuring unit 4 is provided, as mentioned above, with the convex lenses 4–11 which are horizontally apart from each other to permit convergence of diffuse lights from both of the forward and rearward light sources 42, and also with the CCD image pickup devices 4–11 which are horizontally apart from each other to permit reception of the lights converged by these left and light convex lenses 4–11, so that the angles $\Theta$, $\Phi$ are detected at both the front and the rear. Further, use of these detection values of the angles $\Theta$, $\Phi$ at both the front and the rear in a unique computing method to be described in detail subsequently herein has made it possible to correctly compute the advancing direction of the underground excavator under a situation where influence of the spatial positions of the measuring units upon their mounting and that of yawing or pitching of the underground excavator are excluded. Its technical details will be mentioned specifically upon describing the computing method of a position of the underground excavator.

When the intermediate measuring unit 4 is arranged and actually operated, an overall image may be illustrated as shown in FIG. 4. The arrows shown in the drawing indicate the directions of incidence or radiation of lights from the light sources 42. Overall images of the cardinal-point measuring unit 5 and measured-point measuring unit 6 are similar to the front half and rear half of the image shown in FIG.4, respectively. When these measuring units 4,5,6 are used for the measurement of the position of the underground excavator, it is the general practice to arrange the cardinal-point measuring unit 5 in the starting shaft 3 and the measured-point measuring unit 6 in the excavator 1 (a shield machine in the case of shield tunneling, or a leading mole in the case of pipe-jacking tunneling) no matter whether the tunneling is shield tunneling or pipe-jacking tunneling). Here, the cardinal-point measuring unit 5 should be arranged with good accuracy so that its base line coincides with the starting direction. However, no problem or inconvenience arises for the measurement of the position of the underground excavator even when the cardinal-point measuring unit 5 is arranged with its base line not coincided with the starting direction, provided that an angle formed between the base line and the starting direction is measured with good accuracy, its measurement value is stored beforehand as an offset value in the controller unit 43 or the central processing unit 7, and its value is reflected upon computing the advancing position of the underground excavator is computed by the central processing unit 7. This method can also be adopted accordingly.

Concerning especially each intermediate measuring unit 4 among the individual measuring units 4,5,6, on the other hand, its arrangement method somewhat differs between shield tunneling and pipe-jacking tunneling. Described specifically, there is no difference in that each intermediate measuring unit 4 is arranged within the tunnel 2 in both shield tunneling and pipe-jacking tunneling. In the former case, the intermediate measuring unit is generally attached to a segment already arranged and forming the inner peripheral wall of the tunnel 2, whereas in the latter case, the intermediate measuring unit is generally mounted on an inner wall of an underground pipe forming the tunnel 2, an outer wall or the like of an auger casing, an earth removal pipe or the like as an earth removal equipment. Upon arranging each intermediate measuring unit 4 in the tunnel 2 in pipe-jacking tunneling, its mounting on an temporary extension, such as an auger casing or an earth removal pipe, which is temporarily arranged with an arranged distance extended as the excavation of the tunnel 2 proceeds, makes it possible to automatically remove the intermediate measuring unit 4 upon removal of the temporary extension and is hence convenient. In the case of shield tunneling, on the other hand, mounting of each intermediate measuring unit on a temporary extension such as a muck sending pipe, a muck removal pipe or an earth removal pipe can bring about a similar advantageous effect.

In shield tunneling, excavation is effected forward while causing a shield machine to advance by shield tunneling jacks, and segments are assembled in the tunnel 2 formed by the excavation. The works are allowed to go ahead by repeating these steps. When the measured-point measuring unit 6 becomes no longer visible through from the point of arrangement of the cardinal-point measuring unit 5 in the course of the works, an intermediate measuring unit 4 is newly arranged at a suitable position between these measuring units 5,6. When the works advance further and the measured-point measuring unit 6 becomes no longer visible through from the newly-arranged intermediate measuring unit 4, a fresh measuring unit 4 is additionally arranged at a suitable position between these measuring units 4,6, and this arrangement work is repeated. In pipe-jacking tunneling, a final underground pipe is buried in the ground while pushing by final lining jacks a trailing end portion of underground pipe or pipes connected behind a leading mole. Whenever the burying of the final underground pipe is completed, a fresh underground is added to allow the works to advance. When an underground is jacked forward over a predetermined distance and is buried in the course of the works, another intermediate measuring unit 4 is arranged in the final underground pipe. When the works advance further and the underground pipe is jacked forward over a predetermined distance and is buried, a further intermediate measuring unit 4 is additionally arranged again in the final underground pipe. This arrangement work is repeated to maintain suitable intervals between the individual measuring units 4,5,6. As a standard for these intervals, the intermediate measuring units are arranged such that the individual measuring units 4,5,6 can also be seen each other without any obstruction in a planned curved working section.

A drawing which schematically shows a state where a suitable number of intermediate measuring units 4 are arranged in the tunnel 2 to make them visible each other without any obstruction and lights are given and received therebetween is FIG. 5. In this drawing, 4(n) designates an nth intermediate measuring unit as seen from the side of the cardinal-point measuring unit 5, while 4(n+1) and 4(n−1) indicate its forward and rearward intermediate measuring units. When the individual measuring units 4,5,6 are actually arranged in the tunnel 2, an incident light into each measuring unit and a radiating light from the measuring unit intersect each other, and the center positions of the front and rear lenses 4–11 and front and rear light sources 42 in each intermediate measuring unit 4 do not center at a single point as a base point and measurements are performed with these center positions offset in the direction of X-Y plane or in the direction of Z-axis, as shown in FIG. 5.

Upon computing the position of the underground excavator on the basis of the data obtained by measuring in the above-described situation, the computation is performed by correcting, for the sake of convenience of the computation, the center positions of the front and rear lenses 4–11 and front and rear light sources 42 in the direction of X-Y plane or the direction of Z-axis such that the respective center positions are brought into registration with the base point of the corresponding measuring unit 4, 5 or 6 (a suitable point on a center line of the front and rear lenses 4–11, for example, a-midpoint on the center line) as illustrated in FIG. 6 and FIG. 7. In this case, some correction is made to the angle formed between the optical axis and the base line such that the measurement of the position of the underground excavator can be performed more precisely. A correction value for this correction is designed to be calculated at the controller unit 43 on the basis of the angles $\Theta$, $\Phi$ obtained from the formulas (1),(2) while taking into consideration the positional relationships between the respective center positions of the front and rear lenses 4–11 and front and rear light sources 42 and the reference point. Angles $\Theta N_n, \Phi N_n, \Theta S_n, \Phi S_n$, which will be described subsequently herein, are available through such corrections. As has been described above, the correction is made to the angle formed between the optical axis and the base line in this specific example with a view to performing a more correct measurement. A practical position measuring apparatus, however, can still be obtained without such a correction provided that the arrangement of the lenses 4–11 and light sources 42 on the intermediate measuring units 4 is suitably chosen, because the offsets of the center positions of the front and rear lenses 4–11 and light sources 42 are of small values compared with the distances between the individual measuring units 4,5,6.

Hence, a method for computing the position of the underground excavator by data obtained at the individual measuring units 4,5,6 will be described with reference to FIG. 6 to FIG. 9. Before setting out the description of the method, the meanings of signs used in these drawings and subsequent formulas will be defined:

V: unobstructed view lines which means straight lines connecting the base points of the adjacent measuring units 4,5,6 with each other; these unobstructed view lines can be considered as the optical axes of lights given and received between the adjacent individual measuring units 4,5,6, $V_o$: a starting direction line indicating a starting direction of the underground excavator upon starting, $V_n$: an unobstructed view line connecting the $n-1^{th}$ measuring unit and the nth measuring unit together, out of the unobstructed view lines V, G: the above-mentioned base lines, each of which means a line extending through the centers of the convex lenses 4–11 in the corresponding measuring unit and intersecting at right angles the surfaces of the CCD image pickup devices 4–12 in the same measuring unit, $G_n$: the base line of the $n^{th}$ measuring unit, out of the base lines G, $\Theta_n$: an X-Z plane component of an angle which the unobstructed view line $V_n$ forms with the starting direction line $V_o$ (an angle which the unobstructed view line $V_n$ forms with a line obtained by orthographically projecting the starting direction line $V_o$ onto X-Z plane, or shortly speaking, an angle of a horizontal direction toward an axial direction of the tunnel 2), $\Phi_n$: a Y-Z plane component of an angle which the unobstructed view line $V_n$ forms with the starting direction line $V_o$ (an angle which the unobstructed view line $V_n$ forms with a line obtained by orthographically projecting the starting direction line $V_o$ onto Y-Z plane, or shortly speaking, an angle of a vertical direction toward the axial direction of the tunnel 2), $\Theta N_n$: an X-Z plane component of an angle which in the $n^{th}$ measuring unit, its rear unobstructed view line $V_n$ forms with the base line $G_n$ (an angle formed between the unobstructed view line $V_n$ and a line obtained by orthographically projecting the base line $G_n$ onto X-Z plane), $\Phi N_n$: a Y-Z plane component of an angle which in the $n^{th}$ measuring unit, its rear unobstructed view line $V_n$ forms with the base line $G_n$ (an angle formed between the unobstructed view line $V_n$ and a line obtained by orthographically projecting the base line $G_n$ onto Y-Z plane), $\Theta S_n$: an X-Z plane component of an angle which in the $n^{th}$ measuring unit, its front unobstructed view line $V_{n+1}$ (for the $n+1^{th}$ measuring unit, the rear unobstructed view line) forms with the base line $G_n$ (an angle formed between the unobstructed view line $V_{n+1}$ and a line obtained by orthographically projecting the base line $G_n$ onto X-Z plane), $\Phi S_n$: a Y-Z plane component of an angle which in the $n^{th}$ measuring unit, its front unobstructed view line $V_{n+1}$ (for the $n+1^{th}$ measuring unit, the rear unobstructed view line) forms with the base line $G_n$ (an angle formed between the unobstructed view line $V_{n+1}$ and a line obtained by orthographically projecting the base line $G_n$ onto Y-Z plane), and $L_n$: a distance between base points of the $n-1^{th}$ measuring unit and the $n^{th}$ measuring unit, out of distances between base points of the adjacent measuring units 4,5,6.

Upon describing the method for the computation of the position of the underground excavator, all the measuring units 4,5,6, without being limited only to the intermediate measuring units 4, will all be designated by a sign 4(n), which contains "4" as the first numeral, for the sake of convenience of description. In this case, 4(n) means the $n^{th}$ measuring unit as counted from the measuring unit next to the cardinal-point measuring unit 5, and 4(O) means the cardinal-point measuring unit 5. Further, $G_o$ means a base line G of the cardinal-point measuring unit 4(O), which is set to coincide with the direction of the starting direction line $V_o$ in this specific example. The angles $\Theta_n, \Phi_n, \Theta N_n, \Phi N_n, \Theta S_n, \Phi S_n$ are provided with polarities, respectively. In FIG. 6 and FIG. 7, it is defined that an angle over which an unobstructed view line $V_n$ is tilted clockwise relative to a base line $G_n$ as a reference has negative (−) polarity while an angle over which an unobstructed view line $V_n$ is tilted counterclockwise relative to a base line $G_n$ as a reference has positive (+) polarity. In FIG. 6, for example, the angles $\Theta_1, \Phi_1$ are positive angles because an arrow at an end of a circular arc, said arrow indicating the tilting direction of their corresponding unobstructed view line $V_n$, is directed counterclockwise. The angles $\Theta N_1, \Phi N_1, \Theta S_1, \Phi S_1$, on the other hand, are negative angles as an arrow at an end of a circular arc, said arrow indicating the tilting direction of their corresponding unobstructed view line $V_n$, is directed clockwise.

As is evident from the foregoing description, the angles $\Theta N_n, \Phi N_n, \Theta S_n, \Phi S_n$, which their corresponding unobstructed view lines $V_n$ form with the corresponding base lines $G_n$, respectively, can be determined by the measuring units 4(n). Upon computing the position of the underground excavator, however, angles to be determined finally in this specific example are the angles $\Theta n, \Phi n$ which the unobstructed view line $V_n$ form with the starting direction line $V_o$. With reference to FIG. 6 and FIG. 7, a description will be made about a method for the computation of these angles $\Theta_n, \Phi_n$. First, the angles $\Theta_1, \Phi_1$ can be obtained directly from measurement results by the cardinal-point measuring unit 4(0), because the base line $G_o$ of the cardinal-point measuring unit 4(0) is preset to coincide with the direction of the starting direction line $V_o$, in other words, to satisfy $\Theta_1 = \Theta S_0$ and $\Phi = \Phi S_0$. Angles $\Theta_2, \Phi_2$ can next be obtained in accordance with the following formulas, respectively, on the basis of the thus-obtained values of the angles $\Theta_1, \Phi_1$ and the values of $\Theta N_1, \Theta S_1, \Phi N_1, \Phi S_1$ obtained by the measuring unit 4(1):

$$\Theta_2 = \Theta_1 - \Theta N_1 + \Theta S_1 \quad (3)$$

$$\Phi_2 = \Phi_1 - \Phi N_1 + \Phi S_1 \quad (4)$$

Similarly, if the angles $\Theta_n, \Phi_n$ are obtained, angles $\Theta_{n+1}, \Phi_{n+1}$ can be determined in accordance with the following formulas, respectively, on the basis of the thus-obtained values of the angles $\Theta_n, \Phi_n$ and the values of $\Theta N_n, \Theta S_n, \Phi N_n, \Phi S_n$ obtained by the measuring unit 4(n):

$$\Theta_{n+1} = \Theta_n - \Theta N_n + \Theta S_n \quad (5)$$

$$\Phi_{n+1} = \Phi_n - \Phi N_n + \Phi S_n \quad (6)$$

The angles $\Theta_n, \Phi_n$ in these formulas (5),(6) can be determined from the formulas (5),(6) on the basis of angles $\Theta_{n-1}, \Phi_{n-1}$ as the values of these angles $\Theta_{n-1}, \Phi_{n-1}$ can be determined from the computation in the course of the measurement of the position of the underground excavator. Namely, the angles $\Theta_{n-1}, \Phi_{n-1}$ can be obtained by successively performing computation that the values of the angles $\Theta_2, \Phi_2$ obtained in accordance with the formulas (3),(4) are substituted for $\Theta_n, \Phi_n$ in the formulas (5),(6) to calculate $\Theta_3, \Phi_3$ and based on the calculation results, $\Theta_4, \Phi_4$ are then calculated from the formulas (5),(6). Accordingly, the angles $\Theta_n, \Phi_n$ can be obtained eventually by introducing these values into the formulas (5),(6). Data on the direction of each light source 42, such as these angles $\Theta_n, \Phi_n$, can be determined by performing computation in accordance with the above-described respective formulas at the computing unit of the central processing unit 7 in this specific example. In this specific example, among the data concerning the directions of the respective light sources 42 as obtained based on the detection results by the respective measuring units 4,5,6, the angles $\Theta N_n, \Phi N_n, \Theta S_n, \Phi S_n$ are determined by the computing means of the controller unit 43 while the angles $\Theta_n, \Phi_n$ are determined in accordance with the above-described respective formulas at the computing unit of the central processing unit 7. However, what is to be used for the determination of these data is a matter of design choice which can be made as desired upon practice of the invention.

As is apparent from the above description, the angles $\Theta_n, \Phi_n$ of the unobstructed view line $V_n$ of the measuring unit 4(n) relative to the starting direction line $V_o$, said angles being useful as a basis for the computation of the position of the underground excavator, can be indirectly determined by detecting them relative to both the forward and rearward unobstructed view lines $V_n$ on the basis of their relationship with the base line $G_n$ of the measuring unit 4(n), successively measuring the angles $\Theta N_n, \Phi N_n, (\Theta S_n, \Phi S_n$ with respect to each of the measuring units 4(n), and then performing computation by the method described above while using the measurement results, without needing direct detection of the angles of the unobstructed view line $V_n$ on the basis of its relationship with the starting direction line $V_o$. Even when the base line $G_n$ of the measuring unit 4(n) deviates due to its spatial position upon mounting the same or deviates by yawing or pitching during excavation by the underground excavator, this specific example therefore makes it possible to correctly compute, with the deviation incorporated as is, the direction of excavation by the underground excavator provided only that the angles $\Theta N_n, \Phi N_n, \Theta S_n, \Phi S_n$ are measured adequately, and the results of the computation are not affected by the deviation.

After, for example, the values of the angles $\Theta_1$ to $\Theta_n$ and the values of the angles $\Phi_1$ to $\Phi_n$ have been successively measured as described above, the values of the distances $L_1$ to $L_n$ of the rearward measuring units 4(n−1), which are adjacent to the respective measuring units 4(n), from the cardinal point are successively measured by a suitable method such as that to be described in detail subsequently herein, and based on the measurement results of these angles and distances, the position of the underground excavator, in other words, the position of the measured point relative to the measuring cardinal point on a preset three-dimensional position coordinate system is computed. A basic principle of this computation method will hence be described with reference to FIG. 8. In FIG. 8, the positions of the cardinal points of the respective measuring units 4(n) upon constructing a tunnel while changing only one of the angles $\Theta_n, \Phi_n$ but keeping the other angle unchanged, in other words, upon performing by the underground excavator works curved only in either the horizontal direction or the vertical direction are successively indicated as $(X_1, Y_1, Z_1)$, $(X_2, Y_2, Z_2)$ $(X_n, Y_n, Z_n)$ on a two-dimensional position coordinate system formed of the abscissa employed commonly as X-axis and Y-axis and the ordinate as Z-axis. In this case, Z-axis of the two-dimensional position coordinate system is brought into coincidence with the starting direction line $V_o$ and the origin of the two-dimensional position coordinate system is brought into coincidence with the measuring cardinal point of the cardinal-point measuring unit 5 [4(0)].

As will become apparent when FIG. 8 is referred to, the deviations of the coordinate positions of the cardinal points of the respective measuring units 4(n) relative to the cardinal points of their adjacent rearward measuring units 4(n−1) can be successively calculated in accordance with a trigonometric function by using the values of the respective angles $\Theta_1-\Theta_n, \Phi_1-\Phi_n$ and the values of the respective distances $L_1-L_n$ (which are equivalent to the lengths of the respective unobstructed through lines $V_1-V_n$). Namely, out of the deviations of the coordinate positions of the cardinal points of the respective measuring units 4(n) relative to the cardinal points of their adjacent rearward measuring units 4(n−1), the X-axis component and the Y-axis component can be determined as $L_n \cdot \sin \Theta_n$ and $L_n \cdot \sin \Phi_n$, respectively, and the Y-axis component is determined as $L_{n19 \cos \Theta n}$ or $L_n \cdot \cos \Phi_n$. It is designed to cause only one of the angles $\Theta_n, _{101 n}$ to vary in this example as described above upon performing curved tunneling. When the angle $\Theta_n$ is caused to vary, only the X-axis component out of deviations of the coordinate positions of the cardinal point of each measuring units 4(n) therefore deviates by $L_n \cdot \sin \Theta_n$ but the Y-axis component remains unchanged. When the angle $\Phi_n$ is caused to vary, only the Y-axis component deviates by $L_n \cdot \sin \Theta_n$ but the X-axis component remains unchanged.

When the X-axis component, Y-axis component and Z-axis component of deviations in coordinate positions of the cardinal point of each measuring unit 4(n) relative to the cardinal point of its adjacent rearward measuring unit 4(n−1) are determined as described above, the coordinate positions of $(X_n, Y_n, Z_n)$ can be calculated by multiplying the quantities of the components in these directions. As each unobstructed view line $V_n$ deviates such that it is always tilted counterclockwise relative to Z-axis in the example of FIG. 8, their multiplication requires only to multiply the quantities of the components in the respective directions as are. However, even when the tilting direction of each unobstructed view line $V_n$ deviates clockwise or counterclockwise at random, the coordinate positions of $(X_n, Y_n, Z_n)$ can be calculated by multiplying the quantities of the components in the respective directions of X-axis, Y-axis and Z-axis as are as described above, provided that the angles $\Theta_n, \Phi_n$ are provided with such polarities as mentioned above.

In FIG. 8, the example in which only one of the angles $\Theta_n, \Phi_n$ is varied upon performing curved tunneling is shown. Referring next to FIG. 9, a description will be made about a computing method of the position of the underground excavator when both of the angles $\Theta_n, \Phi_n$ are varied to change the advancing direction of the underground excavator three-dimensionally, for example, in vertical and horizontal directions. Concerning the positions of the cardinal points of the respective measuring units 4(n) when the advancing direction of the underground excavator is changed three-dimensionally as described above, FIG. 9 illustrates by way of example those of only the measuring units 4(1), 4(2) as indicated $(X_1, Y_1, Z_1), (X_2, Y_2, Z_2)$ on an ordinary three-dimensional position coordinate system formed of X-, Y- and Z-axes. In this case, Z-axis of the three-dimensional position coordinate system is coincided with the starting direction line $V_o$, and its origin is coincided with the measuring cardinal point of the cardinal-point measuring unit 5[4(O)]. In FIG. 9, the angles $\Theta_n, \Phi_n$ are provided with polarities as in FIG. 6 and FIG. 7. With respect to the angles $\Theta_n$, each angle formed clockwise with respect to Y-Z plane as a reference is defined to have positive (+) polarity, while each angle formed counterclockwise is defined to have negative (−) polarity. Concerning the angles $\Theta_n$, on the other hand, each angle formed clockwise with respect to X-Z plane as a reference is defined to have negative (−) polarity while each angle formed counterclockwise is defined to have positive (+) polarity. In FIG. 9, the arrows at the free ends of the circular arcs which indicate the angles $_{73\ 1}, \Theta_2$ are both directed clockwise, so that these angles are positive angles. On the other hand, the angle $\Phi_1$ is a positive angle as the arrow at the free end of the circular arc indicating this angle is directed counterclockwise, while the angle $\Phi_2$ is a negative angle because the arrow at the free end of the circular art indicating this angle is directed clockwise.

The coordinate positions $(X_n, Y_n, Z_n)$ of the cardinal points of the respective measuring units 4(n) are calculated three-dimensionally in a similar manner as described briefly with reference to FIG. 8 by using values of the angles $\Theta_1-\Theta_n$ and $\Phi_1-\Phi_n$ as obtained by the above-mentioned method and values of the distances $L_1-L_n$ as obtained by measuring them by a suitable method. First, the coordinate positions $(X_1, Y_1, Z_1)$ can be determined by the following formulas, respectively, on the basis of the values of the angles $\Theta_1, \Phi_1$ and the value of the distance $L_1$ obtained directly from the measurement results at the cardinal-point measuring unit 4(0).

$$X_1 = L_1 \cos \theta_1 \cdot \tan \Theta_1 \tag{7}$$

$$Y_1 = L_1 \cos \theta \cdot \tan \Phi_1 \tag{8}$$

$$Z_1 = L_1 \cos \theta_1 \tag{9}$$

where the angle $\theta_1$ is an angle defined by the following formulas:

$$\theta_1 = \tan^{-1}(\tan \Theta_1/\sin \phi_1) \quad (9\text{-}1)$$

$$\phi_1 = \tan^{-1}(\tan \Theta_1/\tan \Phi_1) \quad (9\text{-}2)$$

Next, the coordinate positions $(X_2, Y_2, Z_2)$ can be determined by the following formulas, respectively, on the basis of the values of $X_1$, $Y_1$ and $Z_1$ as obtained in accordance with the above formulas (7), (8), (9), the values of the angles $\Theta_2$, $\Phi_2$ obtained in accordance with the formulas (3), (4) and the value of the distance $L_2$ obtained by measuring it in a suitable manner:

$$X_2 = X_1 + L_2 \cos \theta_2 \cdot \tan \Theta_2 \quad (10)$$

$$Y_2 = Y_1 + L2 \cos \theta_2 \cdot \tan \Phi_2 \quad (11)$$

$$Z_2 = Z_1 + L_2 \cos \theta_2 \quad (12)$$

where the angle $\theta_2$ is an angle defined by the following formulas:

$$\theta_2 = \tan^{-1}(\tan \Phi_2/\sin \phi_2) \quad (12\text{-}1)$$

$$\phi_2 = \tan^{-1}(\tan \Phi_2/\sin \Phi_2) \quad (12\text{-}2)$$

Similarly, the coordinate positions $(X_n, Y_n, Z_n)$ can be obtained in accordance with the following formulas (13), (14), (15) on the basis of the values of $X_{n-1}, Y_{n-1}, Z_{n-1}$ obtained by successively conducting computation similar to the above formulas (10),(11),(12), the values of the angles $\Theta_n, \Phi_n$ obtained by conducting computation in accordance with the above-described formulas (5),(6) and the value of the distance $L_n$:

$$X_n = X_{n-1} + L_n \cos \theta_n \cdot \tan \Theta_n \quad (13)'$$

$$Y_n = Y_{n-1} + L_n \cos \theta_{n \cdot tan \phi n} \quad (14)'$$

$$Z_n = Z_{n-1} + L_n \cos \theta_n \quad (15)'$$

where the angle $\theta_n$ is an angle defined by the following formulas:

$$\theta_n = \tan^{-1}(\tan \Theta_n/\sin \phi_n) \quad (15\text{-}1)'$$

$$\phi_n = \tan^{-1}(\tan \Theta_n/\tan \Phi_n) \quad (15\text{-}2)'$$

As a consequence, the coordinate positions $(X_n, Y_n, Z_n)$ of the cardinal point of each measuring unit $4(n)$ can therefore be represented by the following formulas (13),(14),(15):

$$X_n = \sum_{k=1}^{n} L_k \cos\theta_k \cdot \tan\Theta_k \quad (13)$$

$$Y_n = \sum_{k=1}^{n} L_k \cos\theta_k \cdot \tan\Theta_k \quad (14)$$

$$Z_n = \sum_{k=1}^{n} L_k \cos\theta_k \quad (15)$$

where the angle $\theta_k$ is an angle defined by the following formulas:

$$\theta_k = \tan^{-1}(\tan \Theta_k/\sin \phi_k) \quad (15\text{-}1)$$

$$\phi_k = \tan^{-1}(\tan \Theta_k/\tan \Phi_k) \quad (15\text{-}2)$$

Now assuming that the $n^{th}$ measuring unit $4(n)$ is the measured-point measuring unit 6 for setting the measured point, the position of the measured position relative to the measuring cardinal point set by the cardinal-point measuring unit 5 is expressed by $(X_n, Y_n, Z_n)$, which can be readily calculated in accordance with the formulas (13), (14), (15). Further, the spatial position of the excavator 1 in the pitching and yawing directions can be detected by measuring the angles $\Theta_{n+1}$, $\Phi_{n+1}$ with the measured-point measuring unit 6. Such computation of positions by the above-described formulas is performed at the computing unit of the central processing unit 7.

Figure 10:
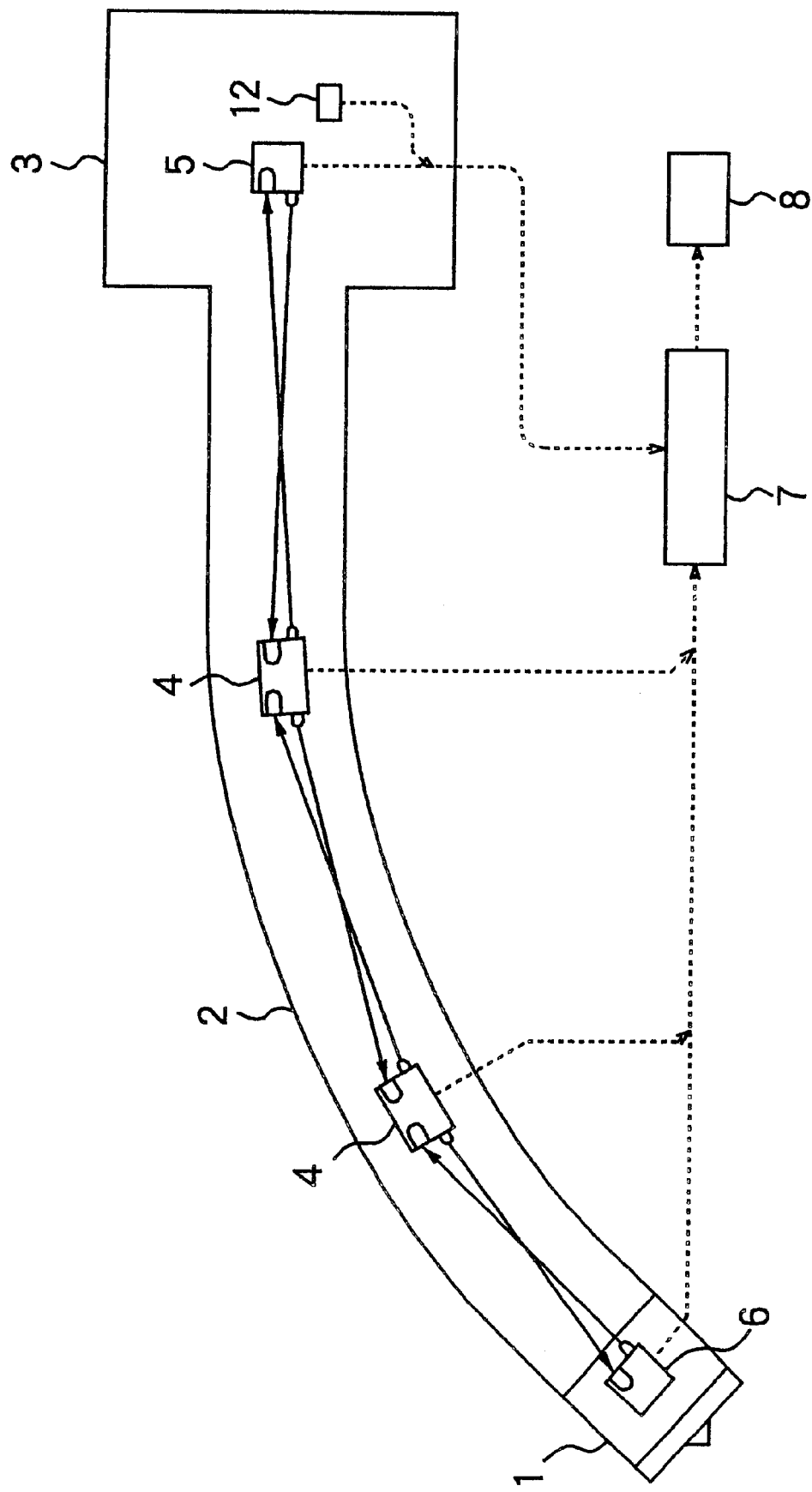
FIG. 10 is a horizontal cross-sectional view illustrating a method for inputting, in a central processing unit, data on distances of a tunnel when the first specific example is applied to a pipe-jacking machine.

As has been described above, the position of the measured point relative to the measuring cardinal point is calculated in accordance with the formulas (3)–(15) on the basis of the data on the directions of the respective light sources, which have been obtained based on detection results by the measuring units 4,5,6, and also of the data on the distances between the adjacent measuring units. In this case, it is necessary to collect data on the distances between the adjacent measuring units and then to input the data in the measuring unit of the central processing unit 7. Accordingly, one example of a method for inputting data on such distances in the computing unit of the central processing unit 7 will be described with reference to FIG. 10 and FIG. 11. FIG. 10 is a horizontal cross-sectional view for describing a method for inputting, into a central processing unit, data on distances in a tunnel when the first specific example is applied to a pipe-jacking machine, and FIG. 11 is a drawing similar to FIG. 10 when the first specific example is applied to a shield machine.

Basically speaking, data on the respective distances between measuring units can be inputted to the central processing unit 7 by collecting them in accordance with a suitable method, for example by measuring them with a conventional range finder. As representative methods for this purpose, the following methods can be mentioned.

(a) Distance detection means capable of automatically detecting the distances between the individual measuring units 4,5,6 is arranged, and data on the respective distances obtained from detection results by the distance detection means are automatically inputted to the processing unit of the central processing unit 7. (b) Distance detection means capable of automatically detecting a varying distance of a predetermined zone in the tunnel 2 is arranged; with respect to the zone the distance of which varies, data on distances obtained from detection results by the distance detection means are continuously inputted to the computing unit of the central processing unit 7, and concerning the other zones, data on determined distances—such as actually measured values obtained by performing measurements at the site or planned values available from a planned line—are non-continuously inputted.

Figure 11:
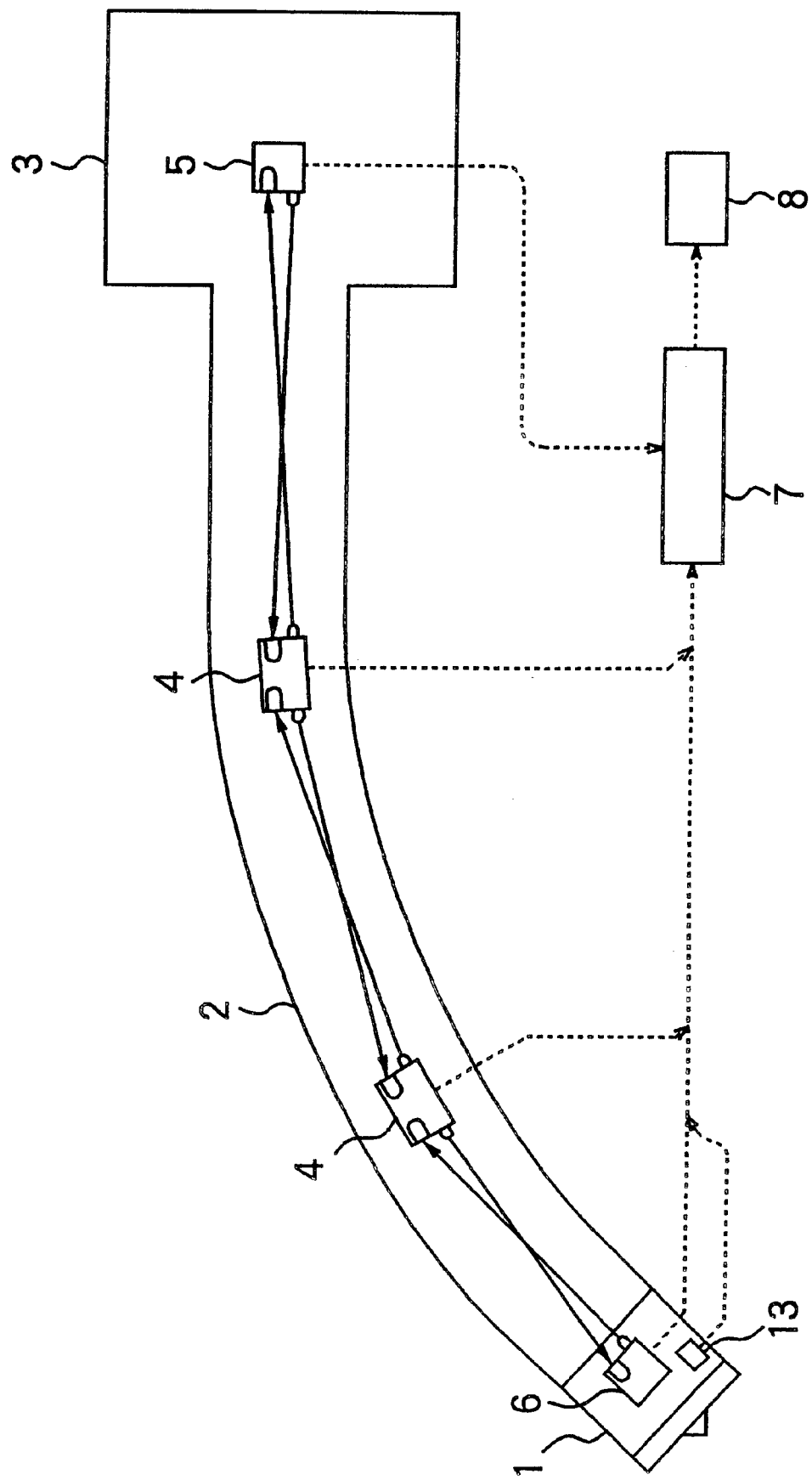
FIG. 11 is a view similar to FIG. 10 except that the first specific example is applied to a shield machine.

FIG. 10 and FIG. 11 illustrate the method (b) out of these methods. When constructing a tunnel 2 by a pipe-jacking machine, the distance of the tunnel 2 varies every moment only in the zone of a final underground pipe which is being buried while being pushed directly by final lining jacks, but in the other zones where underground pipes have been completely buried in the ground, the distance is fixed and does not vary moment by moment. For this reason, in the case of pipe-jacking tunneling, the distance of only the rearmost zone in which the burying of the underground pipe is under way is automatically detected by a stroke meter 12 of the final lining jacks and data on the distance is inputted to the central processing unit 7, and with respect to the other zones where the underground pipes have been completely buried in the ground, data on their determined distances are inputted, as illustrated in FIG. 10. In the rearmost specific zone where the burying of the underground pipe is under way, the distance varies every moment while the underground pipe is advancing. Data on the varying distance are therefore automatically inputted in a continuous manner. In the other zones where the buried underground pipes are located, their distances do not vary until burying of a new underground pipe is started behind the rearmost underground pipe after the completion of burying of the rearmost underground pipe. Data are therefore manually inputted in such a non-continuous manner that upon resumption of burying of the new underground pipe, the data on their established distances are corrected and inputted again. Needless to say, the data on the determined distances are inputted separately depending on the individual distances between the adjacent measuring units so that the individual distances between the adjacent measuring units can be known. As the data on the determined distances, distance data which can be calculated based on the number of underground pipes already buried are also usable instead of actually-measured values or planned values in the case of pipe-jacking tunneling.

When constructing the tunnel 2 by a shield machine, the distance of the frontmost zone where an excavator 1 is being caused to advance by shield jacks varies every moment, but in other zones, i.e., in zones already covered by segments, their distances are fixed and do not vary moment by moment. For this reason, in the case of shield tunneling, the distance of only the frontmost zone in which excavation is under way by the excavator 1 is automatically detected by a stroke meter 13 of the shield tunneling jacks and data on the distance is inputted to the central processing unit 7, and with respect to the zones covered by the segments, data on their determined distances are inputted, as illustrated in FIG. 11. In the frontmost zone where excavation is under way by the excavator 2, the distance varies every moment during the excavation. Data on the varying distance are therefore automatically inputted in a continuous manner. In the zones covered by the segments, on the other hand, their distances do not vary until a new segment is assembled after forward excavation over a distance equivalent to one ring of the segment. Data are therefore manually inputted in such a non-continuous manner that data on the distance established upon completion of the assembly of new segment is corrected and inputted again. Similarly, to the tunneling by the pipe-jacking machine, the data on the determined distances are inputted separately depending on the individual distances between the adjacent measuring units. As the data on the determined distances, distance data which can be calculated based on the kind of number of segments already assembled are also unable instead of actually-measured values or planned values in the case of shield tunneling. Accordingly the above-described inputting methods of the distance data of the tunnel 2 to the central processing unit 7, each of the methods makes additional use of the stroke meter 12 of the final lining jacks or stroke meter 13 of the shield tunneling jacks, which a pipe-jacking machine or a shield tunneling excavator is usually provided with, for the measurement of distances in the tunnel, so that it is not necessary to additionally arrange any special distance measuring means for the measurement of the distances. This has made it possible to reduce the cost and space which would otherwise be needed for the arrangement of measuring means for distances in the tunnel 2.

In the above-mentioned position measuring apparatus of the first specific example of the present invention for the underground excavator, the measuring units 4,5,6 are each constructed especially of the light sources 42 capable of emitting diffuse lights to the adjacent measuring units, the convex lenses 4–11 capable of converging diffuse lights from the light sources 42 of the adjacent measuring units, and the CCD image pickup devices 4–12 arranged such the light converged by the respective convex lenses 4–11 can be received and the directions of the light sources of the adjacent measuring units can be detected by the positions of the lights so received. The light from each light source 42 can therefore be directed surely onto its corresponding CCD pickup image device 4–12 as light-receiving means. As a result, it is no longer needed to perform an operation which would otherwise be required to direct each light onto its corresponding light-receiving means upon measuring the position of excavation by the underground excavator. No complex operating mechanism is hence needed. Even if the mounted spatial positions of the measuring units 4 are not unified or vary due to yawing or pitching during excavation by the underground excavator, the position of excavation can still be correctly computed and measured without being affected by such non-unification or variations. Further, the spatial position of the excavator 1 in the pitching and yawing directions can be detected by the measured-point measuring unit 6.

Figure 12:
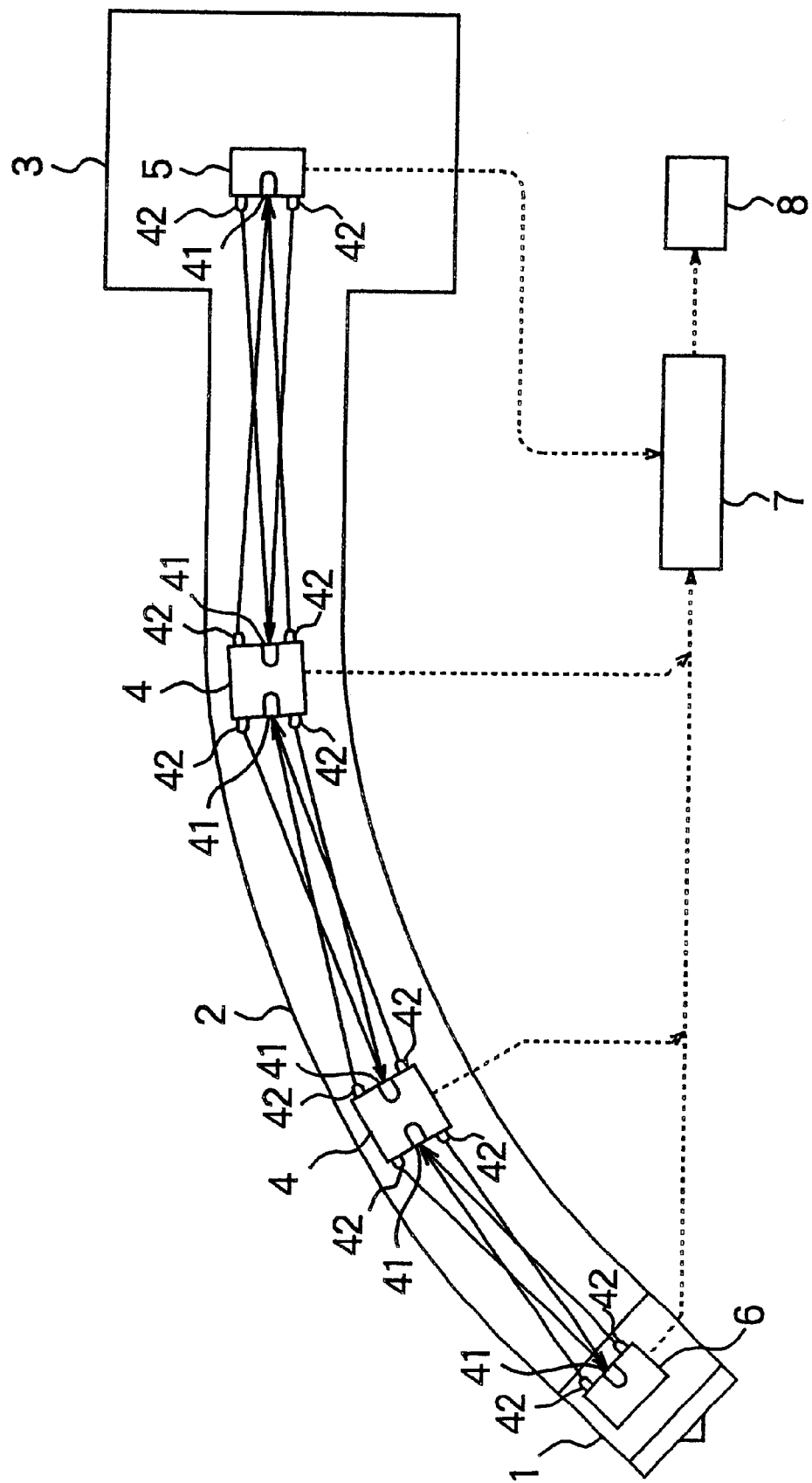
FIG. 12 is a horizontal cross-sectional view schematically illustrating overall features of a position measuring apparatus for an underground excavator, which pertains to a second specific example of the first embodiment of the present invention.
Figure 13:
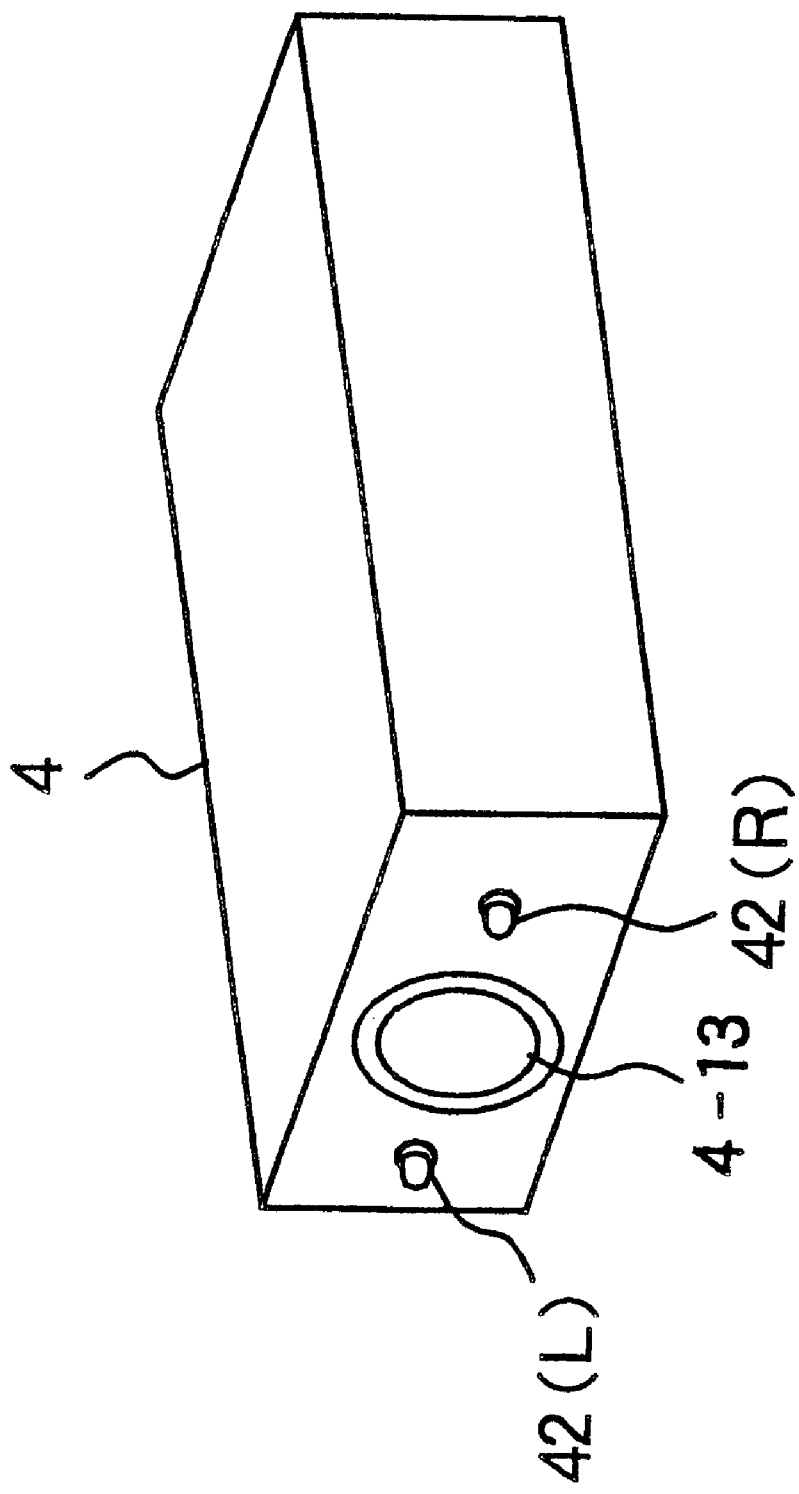
FIG. 13 is a perspective view depicting an intermediate measuring unit in the position measuring apparatus of FIG. 12 for the underground excavator.
Figure 14:
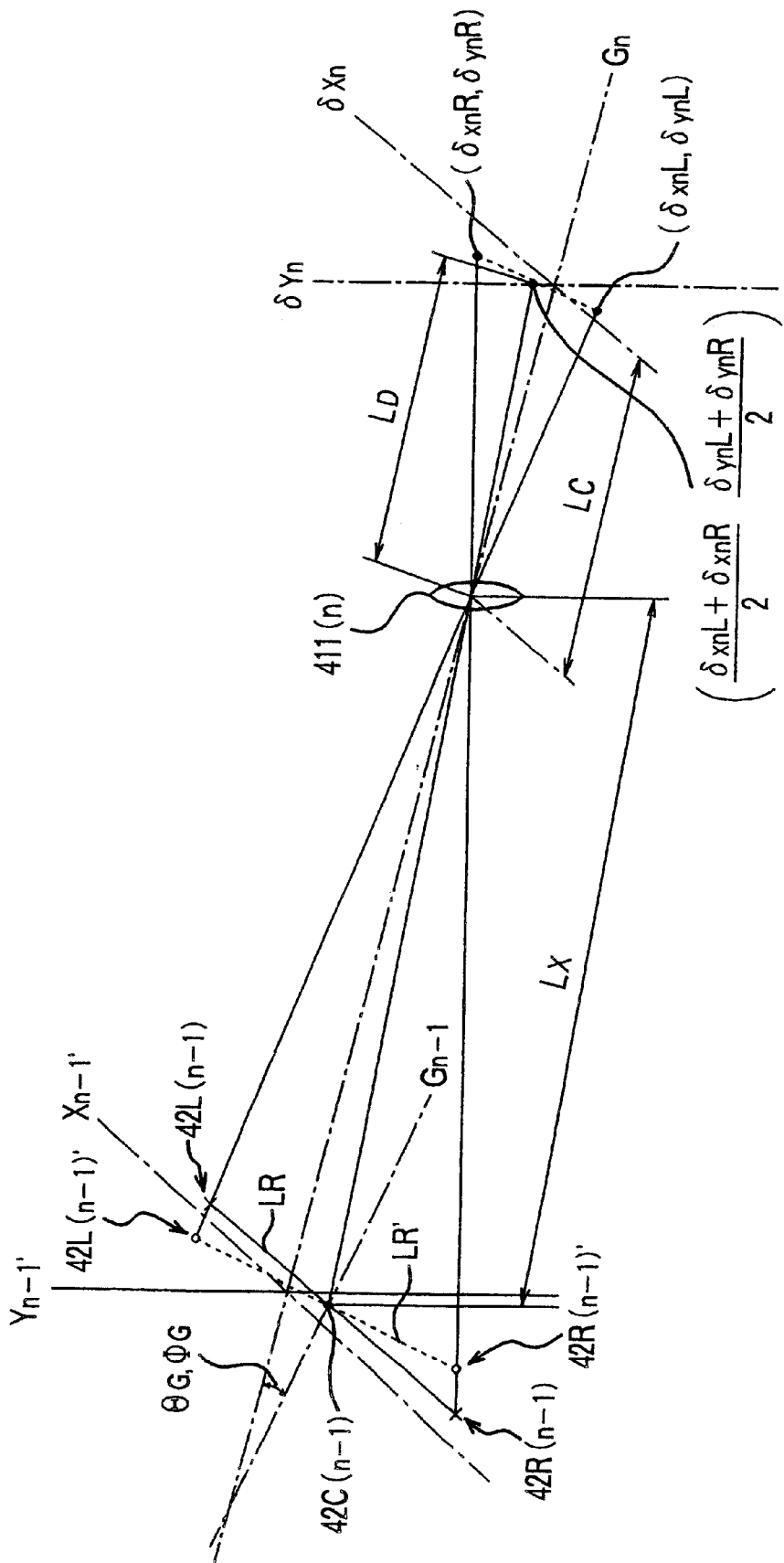
FIG. 14 is a concept diagram illustrating a method for calculating a distance between measuring units in the position measuring apparatus of FIG. 12 for the underground excavator.
Figure 15:
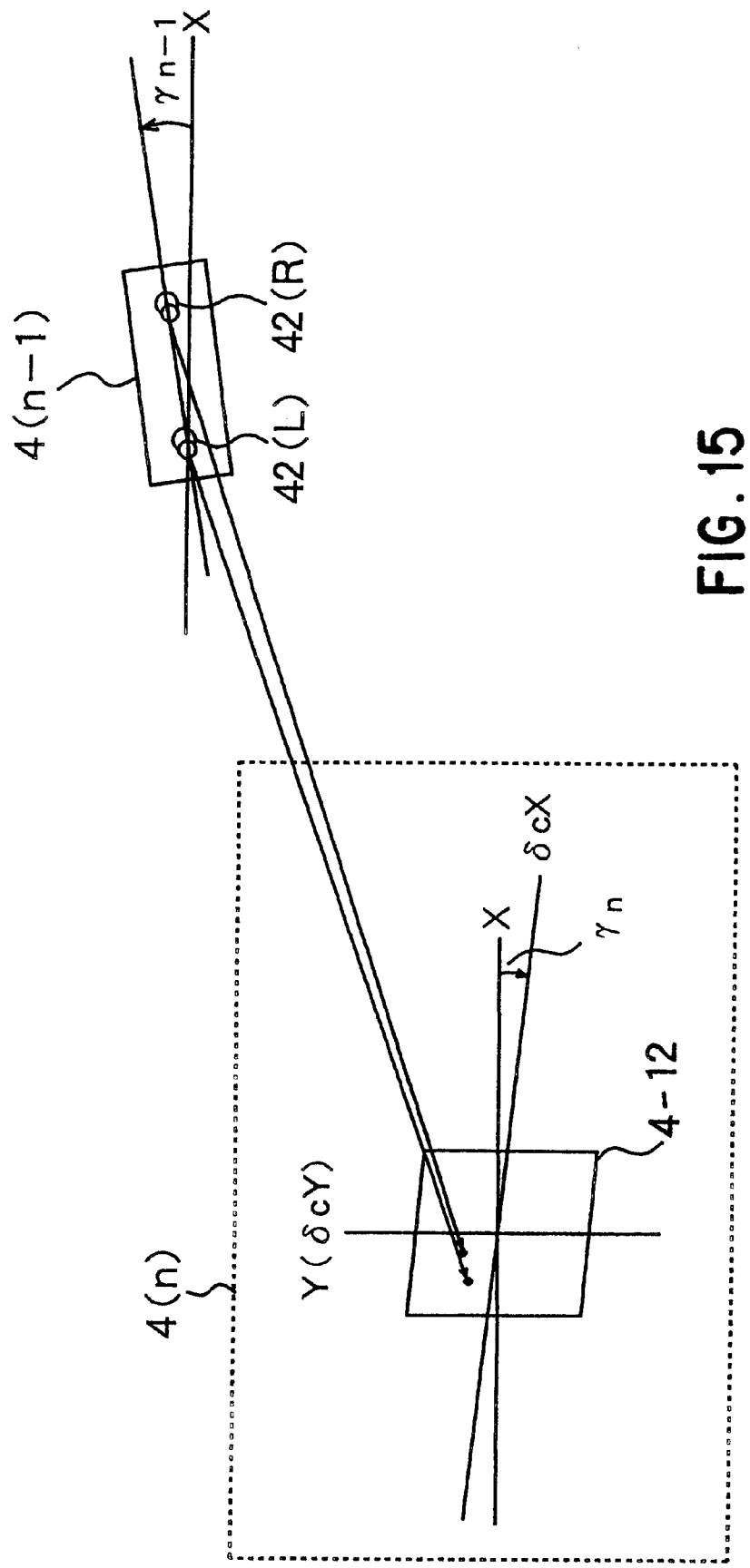
FIG. 15 is a concept diagram illustrating a basic principal of a measurement of a quantity of rolling of one of measuring units by the position measuring apparatus of FIG. 12 for the underground excavator when the one measuring unit has rolled.
Figure 16:
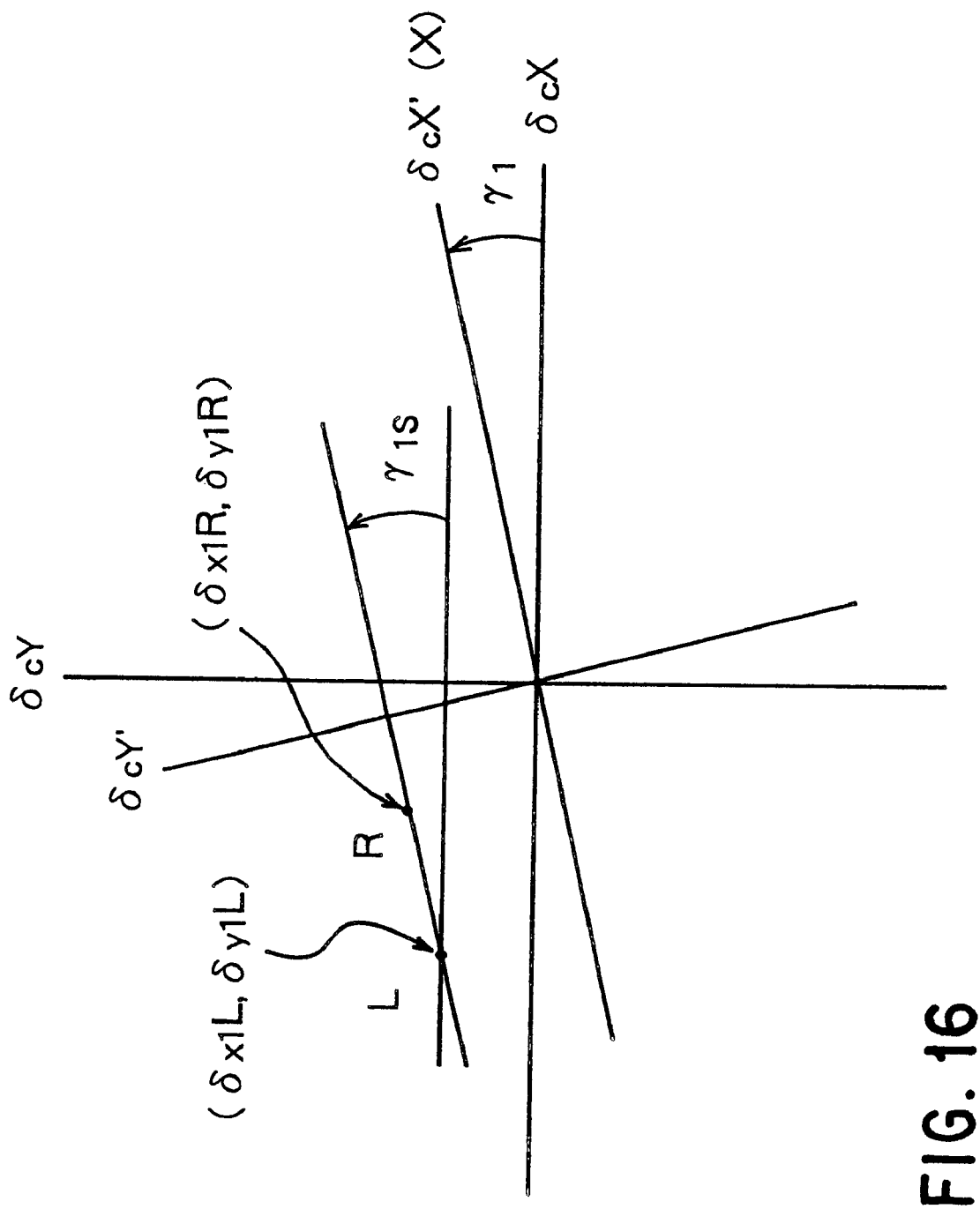
FIG. 16 is a concept diagram illustrating a method for calculating a quantity of rolling of one of measuring units by the position measuring apparatus of FIG. 12 for the underground excavator when the one measuring unit has rolled.
Figure 17:
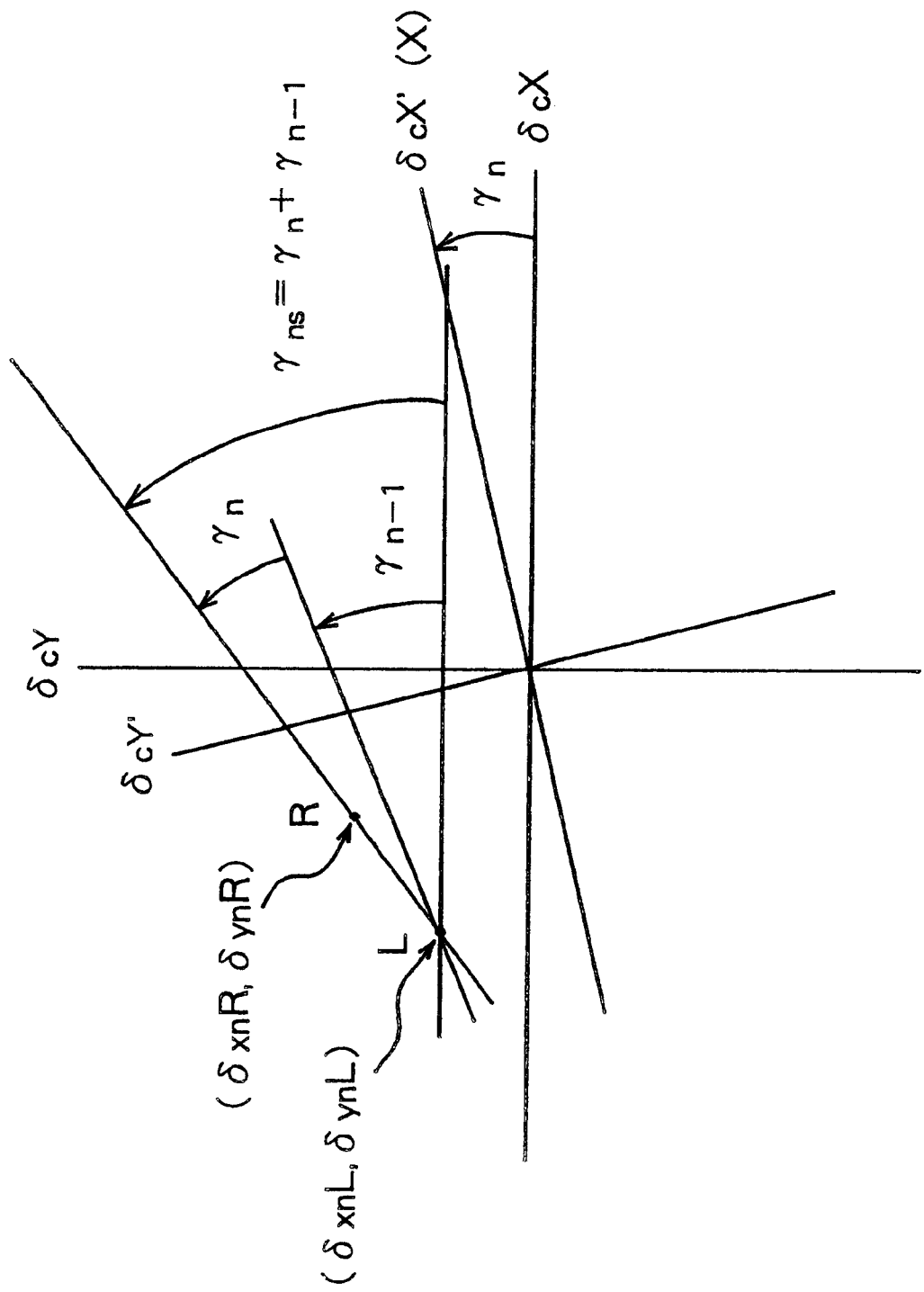
FIG. 17 is a concept diagram illustrating a method for calculating a relative quantity of rolling between adjacent two measuring units by the position measuring apparatus of FIG. 1 for the underground excavator when both of the adjacent two measuring units have rolled.

Referring next to FIG. 12 through FIG. 17, a description will next be made about a position measuring apparatus of the second specific example of this embodiment for an underground excavator. FIG. 12 is a horizontal cross-sectional view schematically illustrating overall features of the position measuring apparatus for the underground excavator, which pertains to the second specific example of the present invention, FIG. 13 is a perspective view depicting an intermediate measuring unit in the position measuring apparatus of FIG. 12 for the underground excavator, FIG. 14 is a concept diagram illustrating a method for calculating a distance between measuring units in the position measuring apparatus of FIG. 12 for the underground excavator, FIG. 15 is a concept diagram illustrating a basic principal of a measurement of a quantity of rolling of one of measuring units by the position measuring apparatus of FIG. 12 for the underground excavator when the one measuring unit has rolled, FIG. 16 is a concept diagram illustrating a method for calculating a quantity of rolling of one of the measuring units by the position measuring apparatus of FIG. 12 for the underground excavator when the one measuring unit has rolled, and FIG. 17 is a concept diagram illustrating a method for calculating a relative quantity of rolling between adjacent two measuring units by the position measuring apparatus of FIG. 1 for the underground excavator when both of the adjacent two measuring units have rolled. In FIG. 12 through FIG. 16, elements of structure identified by like signs as in the drawings already used in the description of the apparatus according to the first specific example indicate like elements of structure in the drawings.

In the above-described position measuring apparatus of the first specific example for the underground excavator, arrangement of plural light sources 42 on one of the intermediate measuring units 4, the cardinal-point measuring unit 5 and the measured-point measuring unit 6, said plural light sources being capable of emitting diffuse lights in the same one of the forward and rearward directions, can also exhibit the following functions in addition to the functions of the apparatus of the first specific example by using these plural light sources for a multiplicity of purposes.

(c) When computing the position of excavation by the underground excavator with the apparatus of the first specific example, the center positions of the lenses 4–11 and light sources 42 in each measuring unit are, as described above, positionally corrected in the directions of X-Y plane and in the direction of Z-axis such that their center positions are aligned on a single base point of the measuring unit, and at the same time, corrections are also made with respect to the angles $\Theta,\Phi$ formed between the optical axis and the base line G. If the plural light sources 42 in the measuring unit are symmetrically arranged in a pair with the base line G located between the light sources and at least one pair of light sources 42 in this arrangement are arranged, the respective center positions of the lenses 4–11 and light sources 42 in the measuring unit are aligned on the single base point of the same measuring unit as viewed in the direction of X-Y plane. concerning the corrections which are required to align the respective centers of the lenses 4–11 and light sources 42 on the single base point, it is necessary to perform such a correction only in the direction of Z-axis, leading to simplification.

(d) Use of desired two light sources 42 out of the above-described plural light sources 42 in the measuring unit makes it possible to measure the distance between the measuring unit and the measuring unit which receives diffuse lights from the two light sources 42.

(e) Use of Use of desired two light sources 42 out of the above-described plural light sources 42 in the measuring unit makes it possible to measure a quantity of rolling between the measuring unit and the measuring unit which receives diffuse lights from the two light sources 42.

To make it possible to exhibit these functions (c),(d),(e), the position measuring apparatus of the second specific example for the underground excavator is provided, as illustrated in FIG. 12 and FIG. 13, with paired light sources 42 each of which consists of a left light source 42(L) and a right light source 42(R), and each intermediate measuring unit 4 is provided with two pairs of left and right light sources, one on the front side thereof and the other on the rear side thereof, a cardinal-point measuring unit 5 is provided with a pair of left and right light sources on the front side thereof, and a measured-point measuring unit 6 is provided with a pair of left and right light sources on the rear side thereof. To permit exhibition of the function (c), the light sources 42 in each pair, said light sources 42 being capable of emitting diffuse lights in the same one of the forward and rearward directions, are arranged especially at symmetrical positions with the base line G interposed therebetween. When a pair of light sources 42 is arranged on the same side of a single measuring unit, the individual lights from these paired light sources 42 enter a single light-source-direction detecting means 41 of the adjacent measuring unit and the directions of the respective light sources can be detected by the light-source-direction measuring means 41, as illustrated in FIG. 12. As the paired light sources 42 are arranged especially at symmetrical positions with the base line G interposed therebetween, averaging of detection values on the directions of the individual light sources 42 gives a value approximating to a value which is detected when a single light source 42 arranged in the same X-Y plane like the center position of the lens 4–11 emits a light into the above-described adjacent measuring unit. As a consequence, concerning corrections to be performed as a result of aligning the respective center positions of the lenses 4–11 and light sources 42 on the single base point, it is necessary to perform such a correction only in the direction of Z-axis. Consequently, the computation to be performed upon measurement of the position of the underground excavator can be simplified. In this specific example, the paired light sources arranged at symmetrical positions are arranged such that the measuring units 4,5,6 are provided on the same sides thereof with only one pair of such light sources per measuring unit. However, arrangement of such light sources in plural pairs and averaging of values detected in connection with these light sources 42 by the light-source-direction detecting means 41 make it possible to improve the accuracy of the corrections still further.

With reference to FIG. 14, a description will be made about a method for exhibiting the function (c) by using the position measuring apparatus of the second specific example for the underground excavator. FIG. 14 illustrates a method for calculating the distance between a desired measuring unit 4(n) and its rearward adjacent measuring unit 4(n–1) by using the left and right light sources 42(L),42(R) of the measuring unit 4(n–1). Employed upon measuring this distance are a three-dimensional position coordinate system, which has been set in such a way that the center of the CCD image pickup device of the measuring unit 4(n) is chosen as an origin, the base line $G_n$ of the measuring unit 4(n) is chosen as so-called Z-axis, and $\delta X_n$-axis and $\delta Y_n$-axis intersecting the base line at right angles are chosen as so-called X-axis and Y-axis, and another three-dimensional position coordinate system which has been set in such a way that the base line $G_n$ of the measuring unit 4(n) is chosen as so-called Z-axis, $X_{n-1}$-axis and $Y_{n-1}$-axis intersecting the base line at right angles are chosen as so-called X-axis and Y-axis, and $X_{n-1}$-$Y_{n-1}$ plane extends through a midpoint between the left and right light sources 42(L) and 42(R) of the measuring unit 4(n–1). Incidentally, $\delta X_n$-$\delta Y_n$ plane in the former three-dimensional position coordinate system lies in the same plane as the surface of the CCD image pickup device 4–12 in the measuring unit 4(n). Before explaining a calculation method of the distance between the measuring unit 4(n) and the measuring unit 4(n–1), the meanings of signs used in the drawings and the following formulas will be described.

42L(n–1): left light source of the measuring unit 4(n–1),

42R(n–1): right light source of the measuring unit 4(n–1),

42C(n–1): midpoint between the left light source 42L(n–1) and the right light source 42R(n–1), 42L(n–1): point obtained by orthographically projecting the left light source 42L(n–1) onto $X_{n-1}$-$Y_{n-1}$ plane, 42R(n–1): point obtained by orthographically projecting the right light source 42R(n–1) onto $X_{n-1}$-$Y_{n-1}$ plane, $\delta_{yn}L$: $\delta X_n$-axis component of an image of the left light source 42L(n–1) formed on $\delta X_n$-$\delta Y_n$ plane, $\delta_{yn}L$: $\delta Y_n$-axis component of an image of the left light source 42L(n–1) formed on $\delta X_n$-$\delta Y_n$ plane, $\delta_{xn}R$: $\delta X_n$-axis component of an image of the right light source 42R(n–1) formed on $\delta X_n$-$\delta Y_n$ plane, $\delta_{yn}R$: $\delta Y_n$-axis component of an image of the right light source 42R(n–1) formed on $\delta X_n$-$\delta Y_n$ plane, $\Theta_G$: intersection angle between a line, which has been obtained by orthographically projecting a base line $G_{n-1}$ of the measuring unit 4(n–1) onto $X_{n-1}$-$G_n$ plane, and a base line $G_n$ of the measuring unit 4(n), $\Phi_G$: intersection angle between a line, which has been obtained by orthographically projecting the base line $G_{n-1}$ the measuring unit 4(n–1) onto $Y_{n-1}$-$G_n$ plane, and the base line $G_n$ of the measuring unit 4(n), LR: spaced distance between the left light source 42L(n–1) and the right light source 42R(n–1), LR': length of a line segment obtained by orthographically projecting a line, which connects the left light source 42L(n–1) and the right light source 42R(n–1) with each other, onto $X_{n-1}$-$Y_{n-1}$ plane, LC: length of a perpendicular drawn from the center of the lens 4–11(n) of the measuring unit 4(n) onto $\delta X_n$-axis, in other words, distance between the center of the lens 4–11(n) and the center of the CCD image pickup device 4–12 of the measuring unit 4(n), and LD: distance from a midpoint between a point of an image of the left light source 42L(n−1) and a point of an image of the right light source 42R(n−1), both formed on $\delta X_n$-$\delta Y_n$ plane, to the center of the lens 4–11(n) of the measuring unit 4(n).

Now, prescribing that the distance between the measuring unit 4(n) and the measuring unit 4(n−1), which is intended to be calculated by the apparatus of the second specific example, is the distance between the midpoint 42C(n−1) and the lens 4–11(n), this distance will be represented by LX, and a method for the calculation of the distance LX will be described.

A description will first be made of an essential point of this calculation method of the distance LX. A basic method for the calculation of the distance LX resides in that the distance LX is calculated by using the fact that the ratio of the distance LX to the distance LR' is equal to the ratio of the distance LD to "the distance between the point ($\delta_{xn}L$, $\delta_{yn}L$) of the image of the left light source 42L(n−1) and the point ($\delta_{xn}R$, $\delta_{yn}R$) of the image of the right light source 42R(n−1), both formed on $\delta X_n$-$\delta Y_n$ plane". This is collectively expressed by the below-described formula (17).

Specifically describing the calculation method of the distance LX, the relationship between the spaced distance LR from the left light source 42L(n−1) to the right light source 42R(n−1) and the length LR' of the line segment obtained by projecting the line, which connects the left and right light sources 42L(n−1) and 42R(n−1) together, onto $X_{n-1}$-$Y_{n-1}$ plane can be expressed by the following formula:

$$LR'=LR|\cos \Theta_G \cos \Phi_G| \quad (16)$$

On the other hand, $\delta X_n$-$\delta Y_n$ plane and $X_{n-1}$-$Y_{n-1}$ plane are both planes intersecting the base line $G_n$ at right angles and are parallel with each other. Thus, the following formula can be established.

$$LR'/LX=[\sqrt{\{(\delta_{xn}R-\delta_{xn}L)_2+(\delta_{yn}R-\delta_{yn}L)_2\}}]/2 \quad (17)$$

In the above formula (17), the square root term of $(\delta_{xn}R-\delta_{xn}L)_2+(\delta_{yn}R-\delta_{yn}L)_2$ represents "the distance between the point ($\delta_{xn}L,\delta_{yn}L$) of the image of the left light source 42L(n−1) and the point ($\delta_{xn}R,\delta_{yn}R$) of the image of the right light source 42R(n−1), both formed on $\delta X_n$-$\delta Y_n$ plane".

Using the distance LC, a known value, and the values of coordinates (($\delta_{xn}L +\delta_{xn}R)/2,(\delta_{xn}L+\delta_{xn}R)/2$) of the midpoint between the left and right light sources 42L(n−1) and 42R(n−1), said values being able to be calculated from the results of detections by the light-source-direction detecting means 41, the distance LD in the above formula can be expressed in accordance with the Pythagorean theorem as indicated by the following formula:

$$LD^2=LC^2+\{(\delta_{xn}L+\delta_{xn}R)/2\}^2+\{(\delta_{yn}L+\delta_{yn}R)/2\}^2 \quad (18)$$

When the above formula (17) is modified by eliminating LD in the formula while using the above formula (18), the distance LX between the forward and rearward measuring units 4(n) and 4(n−1), the calculation of which is intended, can be expressed by the following formula:

$$LX \approx (LR'/2)[\sqrt{\{4LC^2+(\delta_{xn}L+\delta_{xn}R)_2+(\delta_{yn}L+\delta_{yn}R)^2\}/\{(\delta_{yn}L+\delta_{yn}R)^2\}/\{(\delta_{xn}R-\delta_{xn}L)'_2+(\delta_{yn}R-\delta_{yn}L)_2\}}] \quad (20)$$

In this formula (20), the intersection angle ($\Theta_G$, $\phi_G$) between the base line $G_n$ and the base line $G_{-1}$ are values which can be readily determined from the differences between the angles $\Theta S_{n-1}, \Phi S_{n-1}$ available based on the results of detections by the measuring unit 4(n−1) and he angles $\Theta N_n, \Phi N_n$ available based on the results of detections by the measuring unit 4(n). On the other hand, the values of $\delta_{xn}L,\delta_{yn}L,\delta_{xn}R,\delta_{yn}R$, which represent the positions of lights from the left and right light sources 42L(n−1),42R(n−1) as received by the CCD image pickup devices 4–12 of the measuring unit 4(n), are values available from the results of detections by the measuring unit 4(n). Further, the "spaced distance between the left light source 42L(n−1) and the right light source 42R(n−1)" LR and the "distance between the center of the lens 4–11(n) and the center of the CCD image pickup device 4–12 in the measuring unit 4(n)" LC are both nothing but known values. Consequently, the distance LX between the forward and rearward measuring units 4(n),4(n−1) can hence be measured based on data $\Theta S_{n-1}, \Phi S_{n-1}$, $\Theta N_n, \Phi N_n$, which are concerned with the directions of the light sources of both of the measuring units and are obtained by the measuring unit 4(n−1) having the left and right light sources 42L(n−1),42R(n−1), and data $\delta_{xn}L$, $\delta_{yn}L,\delta_{xn}R,\delta_{yn}R$ concerning the received positions of the lights from the left and right light sources 42L(n−1),42R(n−1), said received positions being available at the measuring unit 4(n).

As has been described above, use of the apparatus according to the second specific example of the present invention makes it possible to use the data, which are obtained at the measuring units 4(n),4(n−1) in the course of the measurement of the measured point relative to the measuring cardinal point, practically as are for the measurement of the distance between the adjacent measuring units 4(n),4(n−1). When computing the distance on the basis of these data, it is only necessary to input these data in the computing unit of the central processing unit 7 and then to perform computation in accordance with the above formula (20). As the above-described measuring means for the distance between the measuring units 4(n),4(n−1) does not require to additionally arrange a special distance measuring means for the distance of the tunnel 2, the cost and space which would otherwise be required for the arrangement of the measuring means for the distance of the tunnel 2 can be omitted. The measuring units 4,5,6 arranged specially for the measurement of the position of the underground excavator can also be used for the measurement of the distance of the tunnel, so that these specially-arranged equipments can be used for plural purposes.

In the description made with reference to FIG. 14, the method for calculating the distance between the measuring unit 4(n) and the measuring unit 4(n−1) by using the left and right light sources 42L(n−1), 42R(n−1) of the measuring unit 4(n−1) was described. Conversely, the distance can also be calculated using the left and right light sources 42L(n), 42R(n) of the measuring unit 4(n). In this specific example, the specific measuring unit 4(n−1) provided with two light sources 42 capable of emitting diffused lights in the same one of the forward and rearward directions was described. It is possible to arrange many of such light sources 42 and to obtain many data on the distance LX between the forward and rearward measuring units 4(n),4(n−1) by combining these light sources 42 in pairs. In this case, the measurement of the distance LX can be performed still more precisely by combining these many data. When many intermediate measuring units 4 have to be arranged between the cardinal-point measuring unit 5 and the measured-point measuring unit 6 upon measuring the distance LX by a method such as that shown in FIG. 14, unignorable accumulated errors may occur as a result of accumulation of many measuring errors between the measuring units 4,5,6 even if a measuring error on the distance LX is small. In view of this, the positional measurement by the apparatus of the second specific example can be performed still more precisely provided that, upon measuring the position of the measured position with the position measuring apparatus of the second specific example by using a measuring method such as that shown in FIG. 14, the position of the measured point is actually measured, at a stage that the excavation by the underground excavator has advanced to a certain extent, by the conventional position measuring techniques such as those mentioned in the beginning of this description and such accumulated errors are then corrected by comparing the measurement results of the position of the measured point by the apparatus of the second specific example with the measurement results of the position by the actual measurement. Since the above-described distance measuring means can automatically detect the distances between the individual measuring units 4,5,6, one of the inputting methods of distance data in the computing means described above under (a) and (b) can be adopted.

Finally, a method for exhibiting the above function (e) by using the position measuring apparatus of the second specific example for the underground excavator will be described with reference to FIG. 15 through FIG. 17. In the course of excavation by the underground excavator, in the case of a pipe-jacking machine, an underground pipe and the excavator 6 may roll and the intermediate measuring unit 4 or the measured-point measuring unit 6 may hence roll, or in the case of the shield machine, the excavator 1 may roll and the measured-point measuring unit 6 may hence roll. This may lead to occurrence of variations in the data $\Theta N_n, (\Phi N_n, \Theta S_n, \Phi S_n)$ on the directions of the light sources 42 in the course of the measurement of the position of the underground excavator, whereby unignorable influence may be given to the measurement results of the position of the underground excavator. Since the technical means described here can heighten the reliability of the measurement results of the position of the underground excavator, The above-mentioned influence can be eliminated by measuring quantities of rollings between the adjacent measuring units 4,5,6 with the left and right light sources 42(L),42(R) in the apparatus of the second specific example. Incidentally, the intermediate measuring unit 4 and the measured-point measuring unit 6 are usually arranged in the vicinity of an inner peripheral wall of an underground pipe or the excavator 1 so that, when the underground pipe or the excavator 1 rolls, these measuring units are caused to revolve about the central axis of the underground pipe or the excavator and hence move to the revolved positions. The expression "rolling of the intermediate measuring unit 4 or the measure-point measuring unit 6" as used herein means a movement to such a revolved position.

FIG. 15 illustrates the basic principle of the measurement of a quantity of rolling, which takes place when a given measuring unit 4(n) rolls, by using the left and right sources 42(L),42(R) of its rearward measuring unit 4(n−1). On the surface of each CCD image pickup device 4–12 in the measuring unit 4(n), a two-dimensional position coordinate system is set with an origin placed on the base line $G_n$ and with δcX-axis and δcY-axis set as so-called X-axis and Y-axis. By these axes, the Y-axis component $δ_{cx}$ and Y-axis component δcy of a deviation of the point of an image of the light source 42 formed on the surface of the CCD image pickup device 4–12 can be determined. FIG. 15 illustrates a state in which the rearward measuring unit 4(n−1) has rolled together with its left and right light sources 42(L),42(R) over a rolling angle $γ_{n−1}$ and as a result, the images of the light sources 42(L), 42(R) as formed on the CCD image pickup device 4–12 of the measuring unit 4(n) have tilted to extents equivalent to the angle $γ_{n−1}$ and δcX-axis as X-axis has hence tilted to an extent equivalent to the angle $γ_n$. In this state, the images of the light sources 42(L),42(R) formed on the measuring unit 4(n) are hence tilted over an angle $γ_n + γ_{n−1}$ relative to the two-dimensional position coordinates of δcX-axis and γcY-axis. Incidentally, this angle is automatically determined from the positions of the images of the light sources 42(L), 42(R) on the coordinate system. The technical means which is being described now is to calculate the quantity of rolling of the given measuring unit 4(n) by the following calculation method while making use of the above-described phenomenon.

With reference to FIG. 16, a description will first be made about a calculation method for the measuring unit 4(1). When the measuring unit 4(1) rolls over a rolling angle $γ_1$, lines corresponding to δcX-axis and δcY-axis undergo rolling over the rolling angle $γ_1$ and hence move to positions δcX',δcY', and as a result of rolling of the convex lens 4–11 due to the rolling of the measuring unit 4(1), images L,R of the light sources 42(L),42(R) of the cardinal-point measuring unit 5 as formed on the measuring unit 4(1) are also tilted relative to a horizontal line which is in parallel with δcX-axis, as illustrated in FIG. 16. Now representing the angle, over which the left and right images L,R are tilted relative to the horizontal line, by $γ_{1S}$ and the coordinate positions (the positions on the coordinate system formed of untilted δcX-axis and δcY-axis) of the left and right images L,R by $(δ_{x1}L, δ_{y1}L), (δ_{x1}R, δ_{y1}R)$, the angle $γ_{1S}$ can be determined by the following formula from the relationship between the distance from the image L to the image R and the distance from the image point of the image L to the image point of the image R as projected onto δcX-axis.

$$γ_{1S} = \cos^{-1}[(δ_{x1}R - δ_{x1}L)/\sqrt{\{(δ_{x1}R - δ_{x1}L)^2 + (δ_{y1}R - δ_{y1}L)^2\}}] \qquad (21)$$

As the rearward measuring unit 4(0) which emits a light to the measuring unit 4(1) is the cardinal-point measuring unit 5 and does not undergo rolling, the value of the angle $γ_{1S}$ as calculated by the formula (21) is considered to be equal to the rolling angle $γ_1$ and as a consequence, this angle $γ_{1S}$ is the quantity of rolling of the measuring unit 4(1).

Referring to FIG. 17, a description will next be made of a method for calculating a quantity of rolling of a given measuring unit 4(n) when both of the measuring unit 4(n) and its rearward measuring unit 4(n−1) have rolled. When the rearward measuring unit 4(n−1) rolls together with its left and right light sources 42(L),42(R) over a rolling angle $γ_{n−1}$, images L,R of the light sources 42(L),42(R) of the rearward measuring unit 4(n−1) as formed on the measuring unit 4(n) are also tilted to extents equivalent to the angle $γ_{n−1}$ as shown in FIG. 17. As is also illustrated in FIG. 17, when the measuring unit 4(n) rolls over a rolling angle $γ_n$, lines corresponding to δcX-axis and δcY-axis undergo rolling over the rolling angle $γ_n$ and hence move to positions δcX',δcY', and as a result of rolling of the convex lens 4–11 due to the rolling of the measuring unit 4(1) (a movement to such a position as revolved about the central axis of the excavator 1 or the underground pipe), images L,R of the light sources 42(L),42(R) of the cardinal-point measuring unit 5 as formed on the measuring unit 4(1) are also tilted to extents equivalent to the angle $γ_n$ relative to a horizontal line which is in parallel with δcX-axis. Now representing the angle, over which the left and right images L,R are tilted relative to the horizontal line, by $\gamma_{ns}$ and the coordinate positions (the positions on the coordinate system formed of untilted δcX-axis and δcY-axis) of the left and right images L,R by $(\delta_{xn}L,\delta_{yn}L)$, $(\delta_{xn}R,\delta_{yn}R)$, the angle $\gamma_{ns}$ can be determined, similarly to the above formula (21), by the following formula from the relationship between the distance from the image L to the image R and the distance from the image point of the image L to the image point of the image R as projected onto δcX-axis.

$$\gamma_{ns}=\cos^{-1}[(\delta_{xn}R-\delta_{xn}L)/\sqrt{\{(\delta_{xn}R-\delta_{xn}L)^2+(\delta_{yn}R-\delta_{yn}L)^2\}}] \qquad (22)$$

As the rearward measuring unit 4(n−1) which emits a light to this measuring unit 4(n) is rolling over the rolling angle $\gamma_{n-1}$, the value of the angle $\gamma_{ns}$ as calculated by the formula (22) is not the rolling angle $\gamma_n$ itself of the measuring unit 4(n), and the rolling angle $\gamma_n$ is expressed by the following formula:

$$\gamma_n = \gamma_{ns} - \gamma_{6S\ n-1} \qquad (23)$$

Since values of $\gamma_{n-1}$ in the formula (23) are successively determined by computation in the course of measurements of quantities of rolling of the respective measuring units 4(n−1) behind the measuring unit 4(n), the above rolling angle $\gamma_n$ can be determined based on these values in accordance with the formula (23). Described specifically, the value of the angle $\gamma_{n-1}$ can be obtained by successively performing computation in such a manner that the value of the angle $\gamma_{1S}$, namely the value of the rolling angle $\gamma_1$ is substituted for the angle $\gamma_{n-1}$ in the formula (23) to calculate an angle $\gamma_2$ and based on the calculation results, an angle $\gamma_3$ is calculated from the formula (23) again. Finally, introduction of these values into the formula (23) therefore makes it possible to determine an angle $\gamma_n$ so that the actual quantity of rolling of the measuring unit 4(n) can be determined. Such computation which relates to the measuring unit 4(n) is performed at the computing unit of the central processing unit 7, and data on the individual measuring units located behind the measuring unit 4(n), such as quantities of rolling such as rolling angles $\gamma_1,\gamma_2,\gamma_3$, are stored as offset quantities in a memory unit of the central processing unit 7 and are used for the computation.

In this example, the quantity of rolling of each measuring unit 4(n) can be precisely measured by such a method. Accordingly, by accurately correcting data on the directions of the light sources 42, which are obtained in the course of the measurement of the position of the underground excavator, on the basis of the quantity of rolling so measured, influence of the rolling of the measuring unit 4(n) can be eliminated and the reliability of the measurement results of the position of the underground excavator can be heightened. The rolling angles in of the individual measuring units 4(n) are successively calculated by computation in this example. Where workers can enter as in the case of a tunnel excavated by a shield machine or a semi-shield machine, advantageous effects similar to the above-mentioned ones can also be exhibited by re-arranging the rearward measuring unit 4(n−1) behind the measuring unit 4(n) to set the quantity of its rolling at 0 as soon as the quantity of first rolling is detected with respect to the rearward measuring unit, and then repeating such an operation. According to the above-mentioned measuring method of the quantity of rolling of each measuring unit 4(n), it is no longer required to additionally arrange any special measuring equipment for the measurement of quantities of rolling. This makes it possible to omit the cost and space which would otherwise be required for the arrangement of such an equipment. In addition, the measuring units 4,5,6 arranged specially for the measurement of the position of the underground excavator can also be used for the measurement of quantities of rolling of the measuring units 4,6, thereby making it possible to use the special equipments for a multiplicity of purposes.

In the second specific example of this embodiment, such special means as described above are used as measuring means for quantities of rolling of the measuring units 4(n). Instead of arranging such means, each measuring unit may be internally provided with a conventional rolling meter (an instrument which detects an angle of tilting in the rolling direction and converts it into an electric signal). Especially when the tunnel 2 is constructed by a shield machine, such a rolling meter may be arranged only in the zone of the frontmost excavator 1 advancing by shield tunneling jacks because in the tunnel 2, only the above-mentioned zone undergoes rolling and the other zones already covered by segments do not roll. It is to be noted that the measuring means for rolling quantities is not an element essential to the present invention, because it is unnecessary to arrange such measuring means for rolling quantities provided that the intermediate measuring units 4 and the measured-point measuring unit 6 are arranged using automatic leveling means such as gimbals so that such equipments are held horizontally and are prevented from rolling.

2. Second Embodiment

With reference to the drawings, a description will hereinafter be made about the second embodiment.

Figure 18:
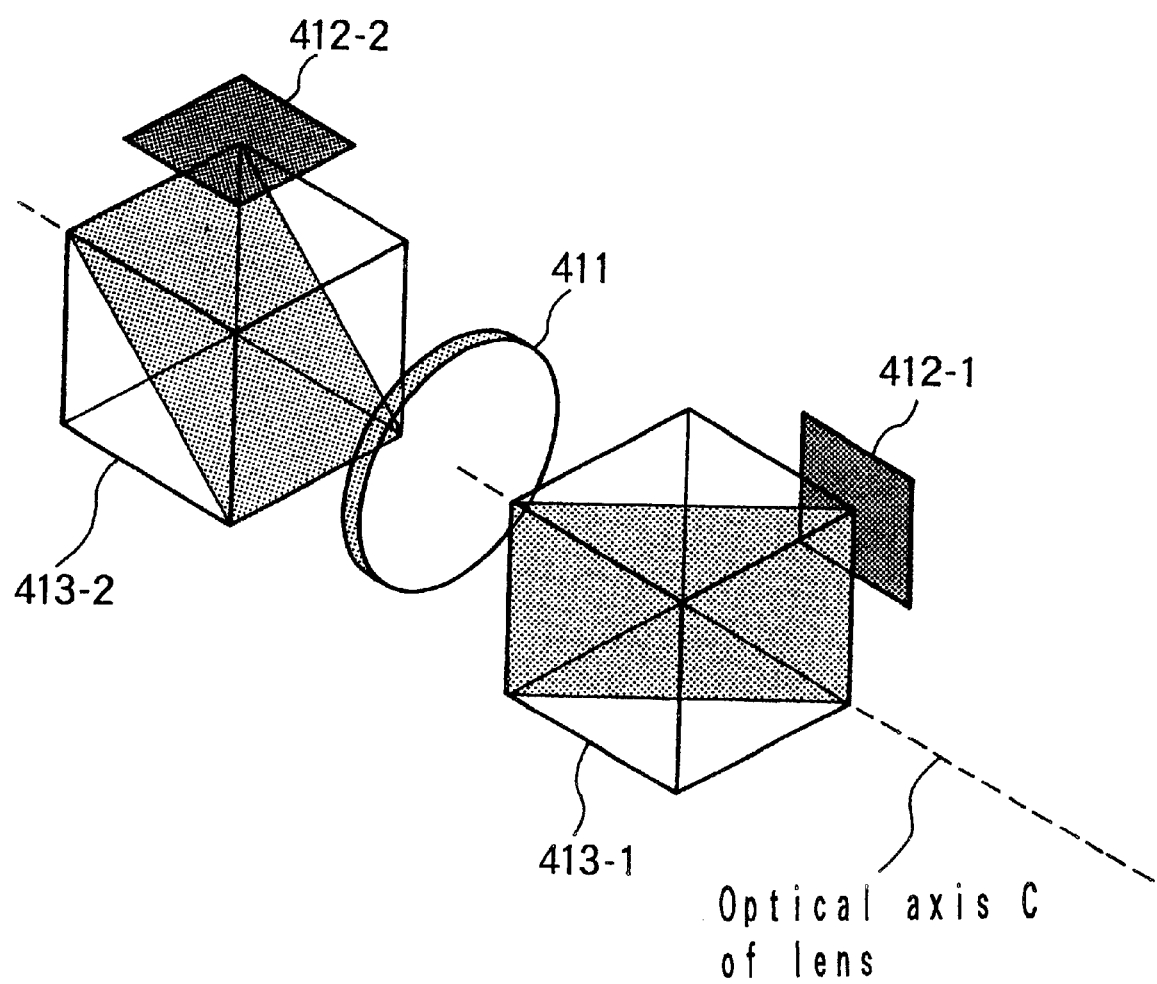
FIG. 18 is a perspective view showing a detector in an optical deflection angle measuring apparatus according to a first specific example of a second embodiment.
Figure 19:
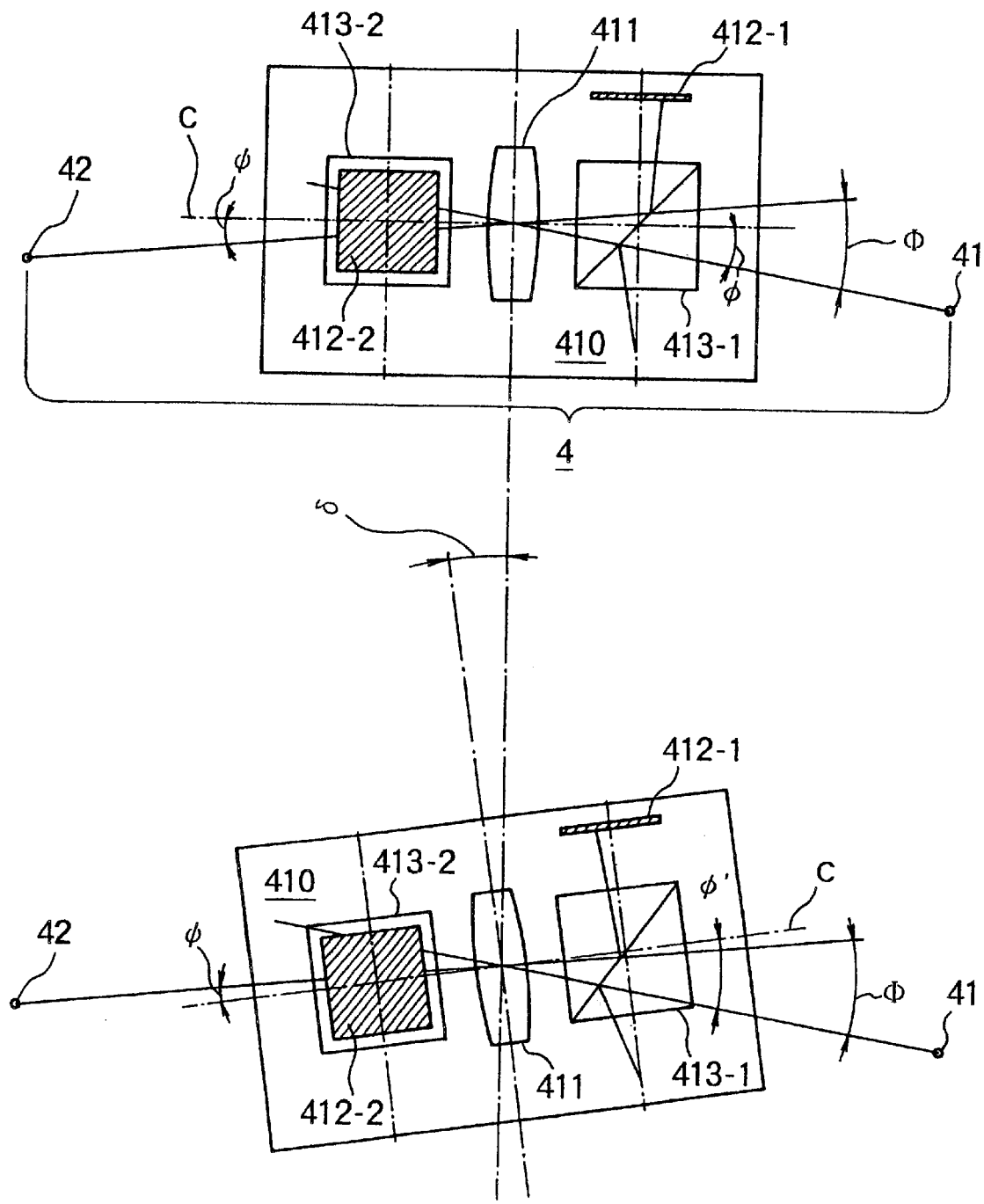
FIG. 19 is a concept diagram of the optical deflection angle measuring apparatus, which illustrates a principle of a measurement of a deflection angle.
Figure 20:
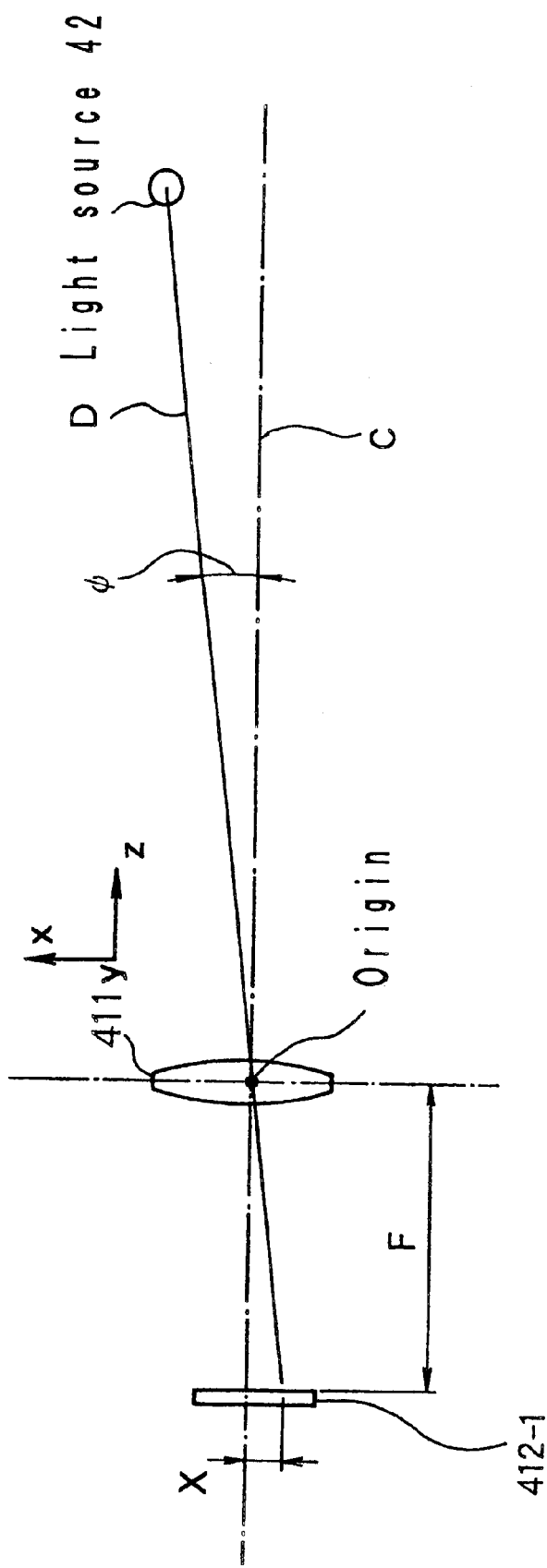
FIG. 20 is a concept diagram illustrating a principle of a detection of the direction of a light source by the detector of FIG. 18.
Figure 21:
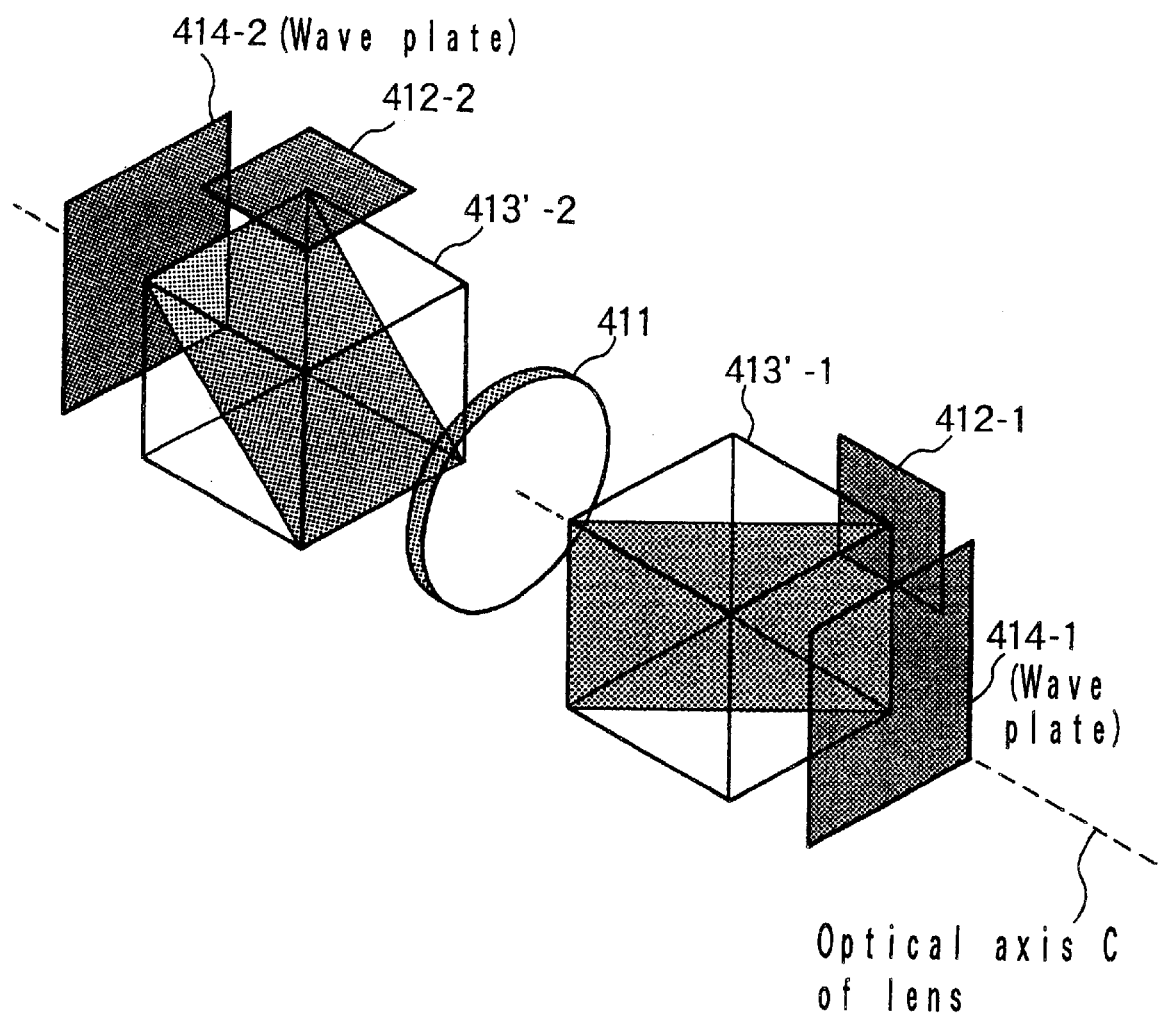
FIG. 21 is a perspective view depicting a detector in an optical deflection angle measuring apparatus according to a second specific example of the second embodiment.

Specific examples illustrating how the inventions of the present application—which relates to the optical deflection angle measuring apparatus and the position measuring apparatus for the underground excavator, respectively—can be embodied actually are shown in FIG. 18 through FIG. 25. Referring first to FIG. 18 through FIG. 21, the optical deflection angle measuring apparatus will be described. FIG. 18 is a perspective view showing a detector in the optical deflection angle measuring apparatus according to the specific example of this invention, FIG. 19 is a concept diagram of the optical deflection angle measuring apparatus, which illustrates a principle of a measurement of a deflection angle, FIG. 20 is a concept diagram illustrating a principle of a detection of the direction of a light source by the detector of FIG. 18, and FIG. 21 is a perspective view depicting a detector in an optical deflection angle measuring apparatus according to another specific example of the present invention.

As has already been described, an optical deflection angle measuring apparatus is an apparatus which optically measures a deflection angle between two line segments connecting a cardinal point with points set on opposite sides of the cardinal point with distances left from the cardinal point, respectively. The term "cardinal point" as used herein means a measuring point which is set at an apex of an angle to be measured. Overall features of an optical deflection angle measuring apparatus 400 of this example are shown in FIG. 19. Roughly describing, the optical deflection angle measuring apparatus is constructed of light sources 41,42 arranged for the measurement of a deflection angle at the points set on the opposite sides of the cardinal point, and also of a deflection angle measuring detector 410 which is set at the cardinal point and can detects the directions of the respective light sources 41,42. As the light sources 41,42, so-called point light sources which emit diffuse lights, for example, light-emitting diodes, are used. Namely, those emitting light beams of high convergence degree like laser beams cannot be used, but basically speaking, those emitting diffuse lights which radially spreads from small areas can be used by suitably selecting them in light of the design.

A description will now be made about the deflection angle measuring detector 410. There are shown a lens 411 as a light converging means which is common to both of the light sources 41,42 and converges diffuse lights from the respective light sources 41,42, a position detecting element 412-1 as a photosensor for receiving the diffuse light emitted from the light source 42 and converged by the lens 411 and detecting the received position of the diffuse light so converged, a similar position detecting element 412-2 for receiving the diffuse light emitted from the light source 41 and converged by the lens 411 and detecting the received position of the diffuse light so converged, a reflecting prism 413-1 as means for changing the direction of the diffuse light from the light source 42, said diffuse light being to be converged by the lens 411, such that the diffuse light is guided to the position detecting element 412-1, and a similar reflecting prism 413-2 for changing the direction of the diffuse light from the light source 41, said diffuse light being to be converged by the lens 411, such that the diffuse light is guided to the position detecting element 412-2. Roughly describing, the detector 410 is constructed of these lens 411, position detecting elements 412-1,412-2, and reflecting prisms 413-1,413-2.

The position detecting elements 412-1,412-2 should be arranged at positions where they do not block the diffuse lights which are about to enter the lens 411 from the respective light sources 41,42. In this example, the position detecting element 412-1 is arranged on a side with its light-receiving surface directed in a direction intersecting an optical axis C of the lens 411 at a right angle, whereas the position detecting element 412-2 is, arranged in an upper part with its light receiving surface directed in a direction intersecting the optical axis of the lens 411 at a right angle. As the position detecting elements 412-1, 412-1, two-dimensional photosensors such as MOS image pickup devices, each of which is formed of photodiodes arranged in a matrix, or CCD (Charge-Coupled-Device) image pickup devices can be used. As a further alternative, PSDs (Position-Sensitive-Device) which can detect the position of a light spot by relying upon the surface resistance of a photodiode may also be used. In essence, any position detecting elements can be used insofar as they can receive lights converged by the converging lens and can detect the positions of the lights so received, and no limitation is imposed on their kind. The reflecting prisms 413-1,413-2 are arranged in front of and in rear of the lens 411, respectively, and reflect portions of the diffuse lights from the light sources 42,42, said diffuse lights being to be converged by the lens 411, such that the portions of the diffuse lights are directed toward the position detecting elements 412-1,412-2, respectively, and can transmit therethrough at least portions of the diffuse lights entering from the light sources 41,42.

The diffuse light emitted from the light source 41, subsequent to its entrance into the near-side reflecting prism 413-1, is transmitted at least in a portion thereof through the same reflecting prism 413-1, is converged by the lens 411, is reflected by the reflecting prism 413-2 arranged behind the lens, and is focused on the position detecting element 412-2. Likewise, the diffuse light emitted from the light source 42 is transmitted at least in a portion thereof through the near-side reflecting prism 413-2, is converged by the lens 411, is reflected by the reflecting prism 413-1 arranged behind the lens, and is focused on the position detecting element 412-1. The use of the reflecting prisms 413-1,413-2 has made it possible to arrange the respective position detecting elements 412-1,412-2 at positions where they do not prevent the entrance of the diffuse lights into the lens 411 from the individual light sources 41,42, so that the light sources 41,42 do not require their own converging lens for converging diffuse lights but can use the single lens commonly. When the diffuse lights from the respective light sources 42,41 are focused on the corresponding position detecting elements 412-1,412-2, the position detecting elements detect the focal positions, that is, the received positions of the converged lights. The detector 410 detects the directions of the respective light sources 41,42 on the basis of the detection results.

Accordingly, the principle of the direction of the light sources 42,41 will be described by taking as an example a case in which the direction of the light source 42 is detected based on detection results at the position measuring element 412-1. The direction of the light source 42 is indicated by an angle which an optical axis D of the light source 42 (a line connecting the center of the light source 42 and that of the lens 411 with each other) forms with a base line of the detector 410, and in this example, an optical axis C of the lens 411 (an axis extending through the center of the lens 411 and intersecting the lens 411 at a right angle) is chosen as the base line of the detector 410. Upon detecting the direction of the light source 42, a horizontal component of the direction of the light source 42 (an angle formed between lines which are available by orthographically projecting the optical axis C of the lens 411 and the optical axis D of the light source 42 onto a horizontal plane, i.e., X-Z plane) and a vertical component of the direction of the light source 42 (an angle formed between lines which are available by orthographically projecting these optical axes C,D onto a vertical plane parallel with the optical axis C of the lens 411, i.e., Y-Z plane) are both detected. For the sake of convenience in explanation, a description will now be made of the detection of the horizontal component. For the position detecting element 412-1, an X-Z plane coordinate system has been set with the center of the lens 411 chosen as an origin, a left-to-right direction as viewed on the drawing sheet selected as Z-axis, and a horizontal direction (in a vertical direction as viewed on the drawing sheet) set as X-axis.

As is illustrated in FIG. 20, when the lens 411 and the position detecting element 412-1 are arranged in parallel with each other at an interval of F and a diffuse light is emitted from the light source 42, the diffuse light from the light source 42 is converged by the lens 411 and is focused on the surface of the position detecting element 412-1. An angle which indicates the horizontal component of the direction of the light source 42 can be determined by the following formula (24):

$$\Psi = \tan^{-1}(X/F) \qquad (24)$$

where X: X-axis component of the coordinate position relating to the point of an image of the light source 42.

Since F and X both stand for known values in the above formula, the angle T relating to the direction of the light source 42 can be automatically calculated on the basis of detection results of the position of light received on the position detecting element 412-1. In FIG. 20, for the sake of convenience of description, the arrangement of the lens 411 and position detecting element 412-1 in the optical deflection angle measuring apparatus of FIG. 19 is schematically illustrated such that they are arranged in parallel with each other at the interval F. When the angle Ψ is determined by the above formula (24) with the lens 411 and the position detecting element 412-1 arranged as shown in FIG. 19, however, the value of F may be taken as the sum of distances which are followed until the optical axis D of the light source 42 extending on the optical axis C of the lens 411 reaches the position detecting element 412-1 subsequent to its entrance to the lens 411. Similarly, the vertical component of the direction of the light source 41 can also be detected based on the results of a detection at the position detecting element 412-2.

When the horizontal components of the directions of the light sources 41,42 are detected, respectively, as described above, the horizontal component of a deflection angle between the optical axes D of the individual light sources 41,42 (an angle formed between lines which are available by orthographically projecting these optical axes D onto a horizontal plane, i.e., X-Z plane) is calculated based on the detection results. Its calculation will be described with reference to FIG. 19. Now, let's assume that the horizontal component of the angle indicating the direction of the light source 41 is ϕ and that the horizontal component of the deflection angle between the axes D of the respective light sources 41,42 is Φ. Further, the angles Φ,ϕ, Ψ are provided with polarities, and are designated "positive" when the direction in which the optical axes D of the light sources 41,42 are caused to turn over a minimum angle to overlap the optical axis C of the lens 411 is clockwise but are designated "negative" when the above direction is counter-clockwise. As is apparent from FIG. 19, the deflection angle Ψ can thus be determined by the following formula (25):

$$\Phi=\phi-\Psi \tag{25}$$

As will become clear from a comparison between the upper and lower diagrams in FIG. 19, even when the detector 410 is tilted over a given angle δ in the front-to-back direction of the drawing sheet (yawing direction) due to a change in its spatial position or vibrations and the angles relating the directions of the respective light sources 41,42 change from ϕ, Ψ to ϕ', Ψ', measured value of the deflection angle Φ always remain constant without being affected by such variations.

The measured value of the deflection angle Ψ is computed and calculated by an unillustrated controller on the basis of the results of detections at the respective position detecting elements 412-1,412-2. The method for determining the horizontal component Φ of the deflection angle between the optical axes of the respective light sources 41,42 has been described above. The vertical component of the deflection angle between the optical axes of the respective light sources 41,42 (the angle formed between lines which are available by orthographically projecting the optical axes onto a vertical plane, i.e., Y-Z plane) can also be determined by a method similar to the above-described method on the basis of the Y-axis component of the coordinate position relating to the point of an image of the light source 42. Like the measured value of the deflection angle Φ, the measured value of the deflection angle, which is determined as described above, always remains constant without being affected by such tilting even when the detector 410 is tilted in the vertical direction of the drawing sheet (pitching direction) due to a change in spatial position or vibrations. In this example, when measuring the deflection angle between the optical axes of the light sources 41,42, the exterior angle between these axes is measured as a deflection angle. As an alternative, the interior angle may be measured as the deflection angle. In essence, it is only necessary to measure as a deflection angle such a value as enabling to specify an relationship in angle between the optical axes of the light sources 41,42. To measure the deflection angle between two lines by the optical deflection measuring apparatus, it is necessary to arrange the detector 410 at the apex of the angle to be measured, namely, at the position of the cardinal point, to arrange the light sources 41,42 at desired places on the two lines and then to determine the vertical component and horizontal component of the deflection by the above-mentioned methods. This makes it possible to specify the relationship in angle between the two lines and hence to measure the deflection angle.

As has been described above, the optical deflection measuring apparatus of this specific example, upon optically measuring a deflection angle, does not require an operation which would otherwise be required to direct lights onto the position detecting elements 412-1,412-2 as in the case that laser beams are used as light sources, because the light sources 41,42 for the measurement of the deflection angle are arranged at the points set on the opposite sides of the cardinal point and light sources which emit diffuse lights are used specifically as the individual light sources 41,42 to permit illuminating wide areas with spread lights and further, because at least portions of the spread lights from the respective light sources 41,42 are converged by the lens 411 and are received by the corresponding position detecting elements 412-2,412-1 to detect the light-received positions and the deflection angle between the optical axes of the respective light sources 41,42 is determined based on the results of the respective detection results. In addition, even when external force such as vibrations in the pitching or yawing direction is applied to the deflection-angle-measuring detector 410 or light sources 41,42, its influence is not given to the measurement results of the deflection angle. Furthermore, the measurement results of the deflection angle are not affected even by the mounted spatial positions of the light sources 41,42 provided that upon mounting the detector 410 and the light sources 41,42, the setting of their positions is precisely effected.

Further, the reflecting prisms 413-1,413-2 are arranged such that at least portions of the diffuse lights from the respective light sources 42,42, said diffuse lights being about to enter the lens 411, are transmitted and the lights from the respective light sources 42,41, said lights being to be converged by the lens 411, are changed in direction to guide them to the respective position detecting elements 412-2, 412-1, and the respective position detecting elements 412-1,412-2 are arranged at positions where they do not block the corresponding diffuse lights which are about to enter the lens 411. The entrance of the diffuse lights from the respective light sources 41,42 into the lens 411 is therefore not prevented by the position detecting elements 412-1,412-2, so that it is unnecessary to provide the individual light sources 41,42 with their own lenses 411 for converging diffuse lights and the lens 411 can be used commonly. Owing to these features, even when a change takes place in the mounted spatial position in the pitching or yawing direction, a correct deflection angle can always be measured without being affected by such a change.

Incidentally, when a measurement is conducted in a usual manner by the above-mentioned optical deflection measuring apparatus, the diffuse lights from the respective light sources 41,42, said diffuse lights being about to enter the lens 411, are reflected in portions by the reflecting prisms 413-1,413-2 and are reduced before their entrance. The quantities of lights to be guided to the respective position detecting elements 412-2,412-1 are thus lost. Referring to FIG. 21, a description will be made of an optical deflection measuring apparatus embodied to solve this problem. In the example of FIG. 21, the respective reflecting prisms 413-1, 413-2 are formed of deflection reflecting prisms 413'-1, 413'-2 as deflected-light reflecting elements having such functions that S-polarized lights which are linear lights oscillating in directions parallel to the reflecting surfaces are reflected but P-polarized lights which are linear lights oscillating in directions intersecting the S-polarized lights at right angles are transmitted. These deflection reflecting prisms 413'-1,413'-2 are arranged such that as is shown in FIG. 21, the directions of their reflecting surfaces intersect each other at a right angle, in other words, the polarized directions of lights to be reflected at their reflecting surfaces intersect each other at a right angle.

On the other hand, wave plates 414-1,414-2 for changing polarization characteristics of the diffuse lights from the respective light sources 41,42 are arranged before these individual deflection reflecting prisms 413'-1,413'2, respectively, so that the diffuse lights from the respective light sources 41,42, said diffuse lights being about to enter the lens 411, are transmitted through the wave plates 414-1,414-2 to obtain linearly-polarized diffuse lights the oscillating directions of which intersect each other at a right angle. When the respective light sources 41,42 have properties to emit circularly-polarized lights, for example, ¼ wave plates are used as the wave plates 414-1,414-2 so that the diffuse lights from the respective lights 41,42, said diffuse lights being about to enter the lens 411, are converted into linearly-polarized diffuse lights the oscillating directions of which intersect with each other at a right angle. Namely, the crystal optical axes of the ¼ wave plates are set at a predetermined angle about the optical axis C of the lens 411 such that the diffuse lights from the respective light sources 41,42 become P-polarized lights relative to the corresponding deflection reflecting prisms 413'-1,413'-2 into which the diffuse lights first enter, respectively (as a result, they obviously become S-polarized lights to the corresponding deflection reflecting prisms 413'-2,413'-1 into which the diffuse lights enter next). When the respective lights 41,42 emit linearly-polarized lights which do not become P-polarized lights relative to the corresponding deflection reflecting prisms 413'-1,413'-2, on the other hand, ½ wave plates are used as the wave plates 414-1,414-2, and the crystal optical axes of the ½ wave plates are set at a predetermined angle about the optical axes such that the diffuse lights from the respective light sources 41,42 become P-polarized lights relative to the corresponding deflection reflecting prisms 413'-1,413'-2 into which the diffuse lights first enter, respectively.

As the polarized reflecting prisms 413'-1,413'-2 are arranged and are provided with the wave plates 414-1,414-2 as described above, the deflection reflecting prism 413'-1 can transmit the diffuse light from the light source 41, said diffuse light being about to enter the lens 411, without losing its light quantity, and moreover, can totally reflect the diffuse light from the light source 42, said diffuse light being in the course of its convergence by the lens 411, such that it is directed to the position detecting element 412-2. According to the example of FIG. 21, the diffuse lights from the respective light sources 41,42, which are about to enter the lens 411, can be efficiently guided to their corresponding position detecting elements 412-2,412-1 without losing their light quantities.

In the example depicted in FIG. 21, the wave plates 414-1,414-2 are arranged so that the diffuse lights from the light sources 41,42, said diffuse lights being about to enter the lens 411, are converted into P-polarized lights relative to the corresponding deflection reflecting prisms 413'-1, 413'-2. As an alternative, the light sources 41,42 themselves may be replaced by those capable of emitting P-polarized lights relative to the respective deflection reflecting prisms 413'-1, 413'-2, and the wave plates 414-1, 414-2 may be omitted. In essence, it is only necessary to convert the diffuse lights from the respective light source 41,42, said diffuse lights being about to enter the lens 411, into linearly-polarized diffuse lights the oscillating directions of which intersect each other at a right angle. Further, as the light sources 41,42, those capable of emitting circularly-polarized or elliptically-polarized diffuse lights may be used as those capable of emitting nonlinearly-polarized diffuse lights and by the wave plates 414-1,414-2, they may be converted to linearly-polarized diffuse lights of P-polarization relative to the deflection reflecting prisms 413'-1, 413'-2 into which the first enter.

Next, a position measuring apparatus for an underground excavator, which measures the position of excavation by the underground excavator by using such an optical deflection angle measuring apparatus, will be described with reference to FIG. 22 through FIG. 25. In these drawings, elements of structure identified by like signs as in FIG. 18 through FIG. 21, which have already been described, designate equivalent elements of structure in FIG. 28 to FIG. 21, so that such elements will not be described in detail. The position measuring apparatus for the underground excavator is adapted to measure the position of excavation by the underground excavator, which is useful for curved tunneling and advances along a curve route to excavate a tunnel. Similarly to the deflection angle measuring apparatus shown in FIG. 19, the optical deflection angle measuring apparatus, which is used for the measurement of the position of excavation by the underground excavator, is provided with deflection-angle-measuring light sources 41,42, which emit diffuse lights, and also with a detector similar to the deflection-angle-measuring detector 410.

Figure 22:
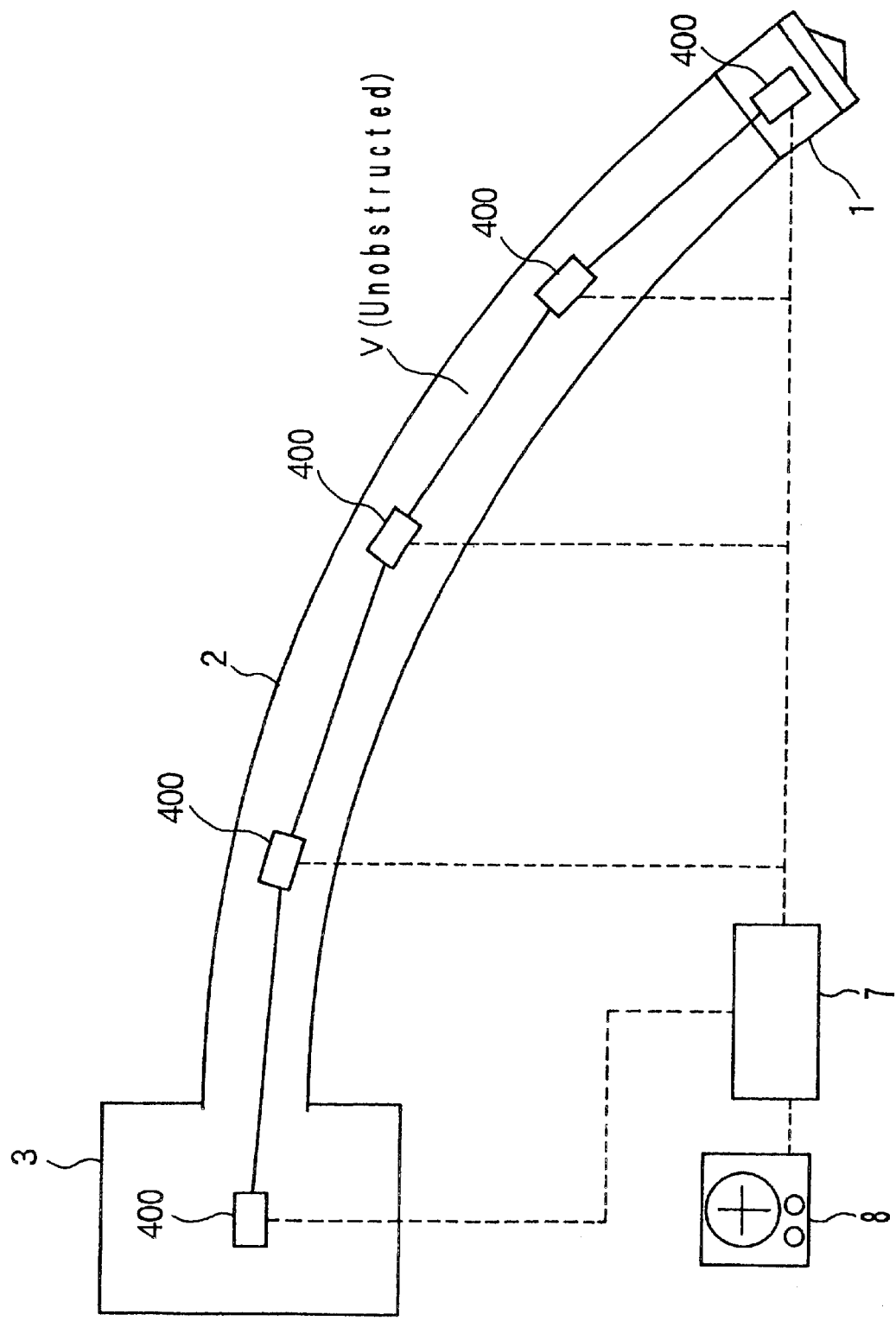
FIG. 22 is a diagram schematically illustrating overall features of a situation where a position of excavation by an underground excavator is being measured by a position measuring apparatus for the underground excavator, said position measuring apparatus pertaining to a specific example of the second embodiment.
Figure 23:
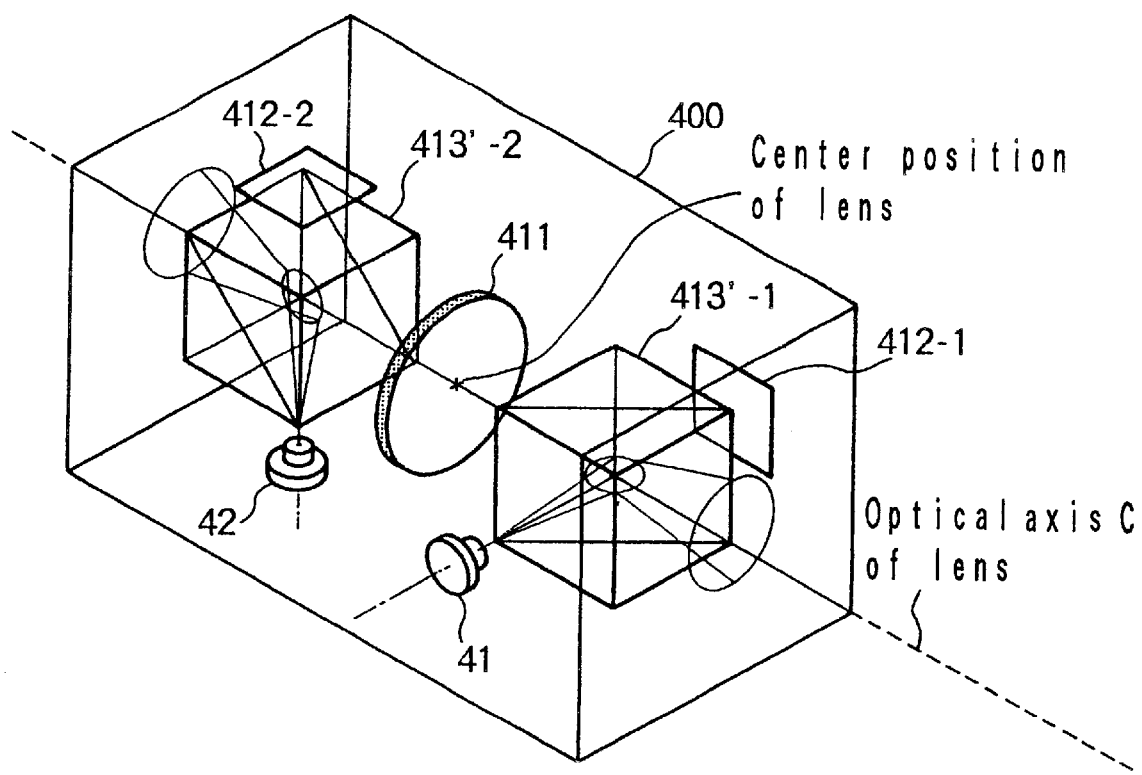
FIG. 23 is a perspective view illustrating a unit-form example of an optical deflection angle measuring apparatus for use in the position measuring apparatus of FIG. 22 for the underground excavator.

In FIG. 22 through FIG. 25, there are shown an excavator I as a principal unit of the underground excavator, a tunnel 2 such as a gallery excavated by a shield machine or a pipe drain excavated by a pipe-jacking machine, a starting shaft 3 as a starting point for excavation by the underground excavator, unit-form optical deflection angle measuring apparatuses 400 to be described in detail subsequently herein with reference to FIG. 23, a central processing unit 7 connected with the individual unit-form optical deflection angle measuring apparatuses 400 via communication lines and adapted to compute a position of excavation by the underground excavator, and a display 8 for displaying the results of computation by the central processing unit 7 and information available based on the computation results in the form of numeral values and/or graphs for the convenience of operation by an operator. The excavator I can be any excavator insofar as it is an excavator of an underground excavator which advances in the ground while excavating a tunnel, such as a pipe-jacking machine or a shield machine. In the tunnel 2, the tunnel wall is formed with underground pipes such as hume pipes or steel pipes in the case of a pipe-jacking machine, or the tunnel wall is formed with steel or concrete segments in the case of a shield machine. Upon measuring the position of excavation by the underground excavator by the position measuring apparatus for the underground excavator, a start-point measuring point, an end-point measuring point and at least one intermediate measuring point are set at a position which can serve as a start point for the measurement, at a position which can serve at an indication for the position of excavation by the underground excavator, and between the start-point measuring point and the end-point measuring point, respectively. According to the example illustrated in FIG. 22, the start-point measuring point and the end-point measuring point are set in the starting shaft 3 and the excavator 1, respectively, many intermediate measuring points are set between these measuring points, and the unit-form optical deflection angle measuring apparatuses 400 are arranged at all the measuring points, respectively.

The unit-form optical deflection angle measuring apparatuses 400 will now be described with reference to FIG. 23. Each of these deflection angle measuring apparatuses 400 is constructed as an integral unit by assembling, in a casing, light sources 41,42—which are adapted to emit diffuse lights toward the respective detectors of the two deflection angle measuring apparatuses 400 located adjacent and on opposite sides of the first-mentioned deflection angle measuring apparatus—and a deflection-angle measuring detector to be arranged at a cardinal point. Further, like the above-described detector 410 in FIG. 18, the deflection-angle measuring detector is constructed by arranging a lens 411 as a common converging means, position detecting elements 412-1,412-2, and reflecting prisms 413-1,413-2 as light-direction changing means. In this case, deflection reflecting prisms 413'-1,413'-2 similar to those described with reference to FIG. 21 are used as the reflecting prisms 413-1,413-2, and as the light sources 41,42, light sources which emit diffuse lights of S polarization relative to the deflection reflecting prisms 413'-1,413'-2 arranged very close to the light sources are used. When diffuse lights are emitted form the light sources 41,42 in FIG. 23, the diffuse lights are therefore reflected by reflecting surfaces of the corresponding deflection reflecting prisms 413'-1,413'-2 and are changed in direction toward a right side and a left side, respectively, so that the diffuse lights are emitted toward the left and right measuring points located adjacent the measuring point.

At these left and right, adjacent measuring points, the optical-deflection angle measuring apparatuses 300 are arranged, respectively, as in the case of the measuring point. The diffuse light from the light source 41 at the measuring point becomes a diffusion light of P polarization relative to the deflection reflecting prism 413'-2 of the deflection angle measuring apparatus 400 located at the adjacent measuring point on the right side. Similarly, the diffuse light from the light source 42 at the measuring point becomes a diffusion light of P polarization relative to the deflection reflecting prism 413'-1 located at the adjacent measuring point on the left side. As this example is constructed such that the diffusion lights from the light sources 41,42 are reflected specifically by the deflection reflecting prisms 413'-1,413'-2 and are directed toward the adjacent measuring points. Appropriate setting of the positional relationship between the light sources 41,42 and the reflecting surfaces of the deflection reflecting prisms 413'-1,413'-2 can therefore bring about a structure equivalent to a structure with the light sources 41,42 arranged at the center position of the lens 411. Referring FIG. 24 and FIG. 25, a description will be made of a method for measuring an excavating position of the underground excavator by arranging these optical deflection angle measuring apparatuses 400, in each of which the light sources 41,42 are arranged at the center position of the lens 411, as illustrated in FIG. 22.

Figure 24:
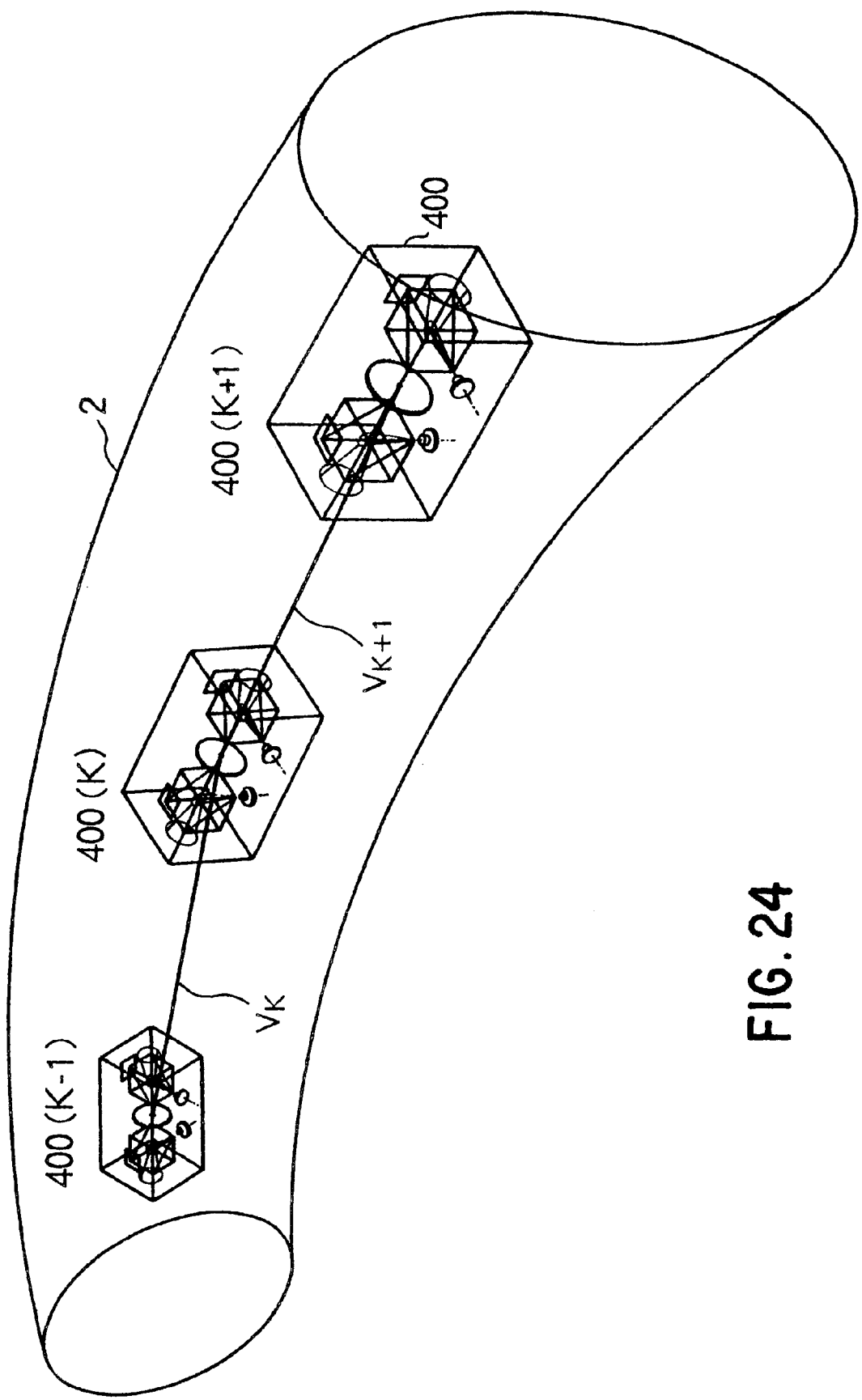
FIG. 24 is a fragmentary perspective view illustrating an embodiment upon measurement of a position of excavation by the underground excavator by using the optical deflection angle measuring apparatus of FIG. 23.

FIG. 24 illustrates a manner of measurement when the position of excavation by the underground excavator is measured by emitting diffuse lights to the optical deflection angle measuring apparatus 400(K), which is arranged at the measuring point, from the light sources 42,41 of the deflection angle measuring apparatuses 400(K+1),400(K−1) arranged at the forward and rearward (right and left as viewed in FIG. 24), adjacent measuring points and then measuring the deflection angle Φ at the measuring point as the cardinal point. comparing the thus-constructed position measuring apparatus for the underground excavator with the optical deflection angle measuring apparatus 4 of FIG. 19, it is appreciated that the optical deflection angle measuring apparatus of FIG. 19 is constructed by the detector built in the deflection angle measuring apparatus 400(K), the frontside light source 41 of the deflection angle measuring apparatus 400(K−1) and the rearside light source 42 of the deflection angle measuring apparatus 400(K+1). Here, "400(K)" indicates the deflection angle measuring apparatus 400 arranged at the $K^{th}$ intermediate measuring point as viewed from the measuring start point, and "400(K+1)" and "400(K−1)" designate its forward and rearward deflection angle measuring apparatuses. Further, "$V_k$" indicates a straight line connecting base points of the deflection angle measuring apparatus 400(K−1) and deflection angle measuring apparatus 400(K) together and "$V_{k+1}$" indicates a straight line connecting the base point of the deflection angle measuring apparatus 400(K) and a base point of the deflection angle measuring apparatus 400(K+1) together. These straight lines are called "unobstructed view lines" in this description. Since these deflection angle measuring apparatuses 400(K−1), 400(K),400(K+1) have a construction equivalent to the construction with the light sources 41,42 arranged at the center position of the lens 411 as described above, the cardinal points of these deflection angle measuring apparatuses are all located at the centers of their lenses 411.

As has been described with reference to FIG. 5 which is directed to the first embodiment, the center positions of the lenses 4–11 arranged in a forward-to-rearward relationship and those of the forward and rearward light source 42 do not coincide at a single point and their positional relationships are different. Accordingly, the optical axis of light sources between which lights are given and received between the measuring units and the unobstructed view line connecting the base points of the measuring units together do not coincide with each other. To perform the measurement of the position of excavation by the underground excavator still more accurately, it is therefore necessary to correct the deviation—which has occurred between the optical axis of the light sources, between which lights are given and received between the measuring units, and the unobstructed view line connecting the base points of the measuring units together—on the basis of a positional relationship of the center positions of the forward and rearward lenses 4–11 and forward and rearward light sources 42 with the base points set on the measuring units and also tilted values of spatial positions of the measuring units due to pitching and yawing. In the second embodiment for use in the apparatus for measuring the position of excavation by the underground excavator, i.e., the deflection angle measuring apparatuses 400 (K−1), 400(K), 400(K+1), on the other hand, the optical axis of lights given and received between the respective measuring apparatuses can be brought into coincidence with the unobstructed view lines $V_k, V_{k+1}$ connecting the centers of the lenses 411 as the base points of the measuring apparatuses by using the deflection reflecting prisms 413'-1,413'-2 and arranging the light sources 41,42 at positions equivalent to the center position of the lens 411. This has made it unnecessary to perform the correction mentioned above in connection with the first embodiment upon measuring the position of excavation by the underground excavator, that is, to correct the correction of the deviation of the optical axes of light sources, between which lights are given and received between the measuring units, from the unobstructed view line connecting the base points of the measuring units with each other in accordance with the positional relationship of the respective center positions of the forward and rearward lenses 4–11 and forward and rearward light sources 42 with the base points set on the measuring units and also in accordance with tilted values of spatial positions of the measuring units due to pitching or yawing. As a consequence, even when the deflection angle measuring apparatuses 400(k−1), 400(k), 400(k+1) are tilted due to pitching or yawing, the position of excavation by the underground excavator can always be measured correctly without measuring and controlling the values of their tiltings.

Figure 25:
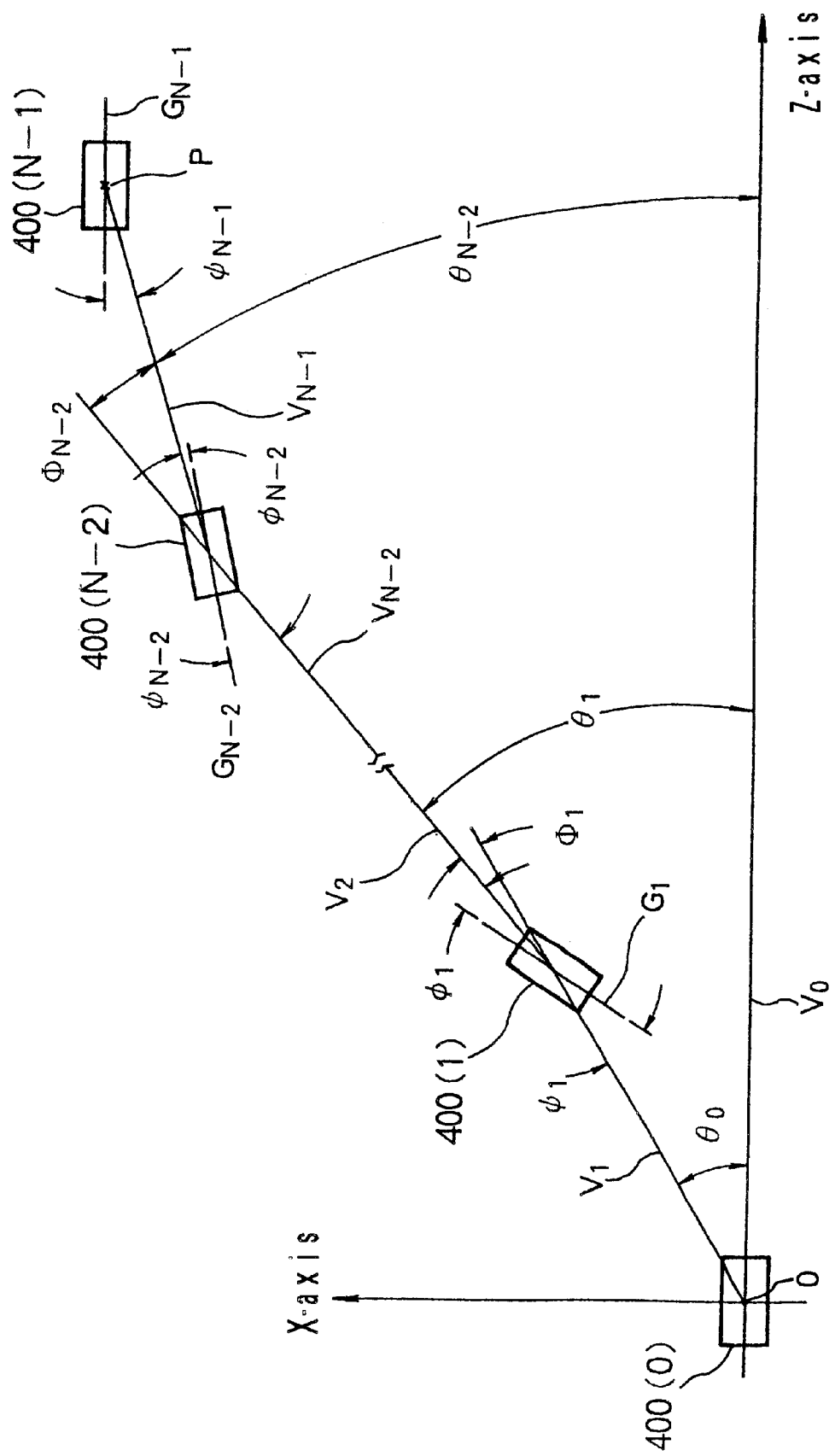
FIG. 25 is a concept diagram illustrating a basic principle of measurement and determination of a position of excavation by the underground excavator by using the position measuring apparatus of FIG. 22.

Referring now to FIG. 25, a description will be made of a basic principle of calculation of an excavating position of the underground excavator by arranging these optical deflection angle measuring apparatuses 400 as illustrated in FIG. 22. The position of excavation by the underground excavator is determined in terms of coordinate points on a three-dimensional coordinate system formed of X-, Y- and X-axes. The three-dimensional coordinate system is set as shown in FIG. 25, with the base point of the deflection angle measuring apparatus 400(0) arranged at the start-point measuring point being chosen as an origin, Z-axis being directed in a horizontal direction which coincides with the starting direction of the underground excavator, X-axis being directed in a horizontal direction intersecting Z-axis at a right angle, and Y-axis being directed in a vertical direction which intersects Z-axis at a right angle. For the sake of convenience of description, a description will now be made centering around a method in which, when measuring the position of excavation by the underground excavator relying upon coordinate points on such a three-dimensional coordinate system, coordinate positions in the direction of X-axis, said coordinate positions corresponding to individual measuring points (the base points of the individual deflection angle measuring apparatuses 400), in other words, their horizontal components are measured. Before describing this method, the meanings of signs used in formulas to be described subsequently herein and of signs in the drawings will be described.

$V_O$: a starting direction line indicating a starting direction of the underground excavator upon starting, $V_N$: an unobstructed view line connecting a base point of a deflection measuring apparatus 400(N'−1) and a base point of a deflection measuring apparatus 400(N) with each other, in other words, an optical axis of lights given and received between adjacent deflection angle measuring apparatus 400(N−1) and deflection angle measuring apparatus 400(N), $G_N$: a base line of the deflection angle measuring apparatus 400(N), namely, the optical axis of the lens 411 of the deflection angle measuring apparatus 400(N), $\phi_N$: X-Z plane component of an angle formed between the base line $G_N$ of the deflection angle measuring apparatus 400(N) and its forward unobstructed view line $V_{N+1}$ (an angle formed between lines which are available when the base line $G_N$ and the unobstructed view line $V_{N+1}$ are orthographically projected onto X-Z plane), in other words, horizontal component of an angle indicating the direction of a light source 42 of an adjacent forward deflection angle measuring apparatus 400(N+1), $\Psi_N$: X-Z plane component of an angle formed between the base line $G_N$ of the deflection angle measuring apparatus 400(N) and its rearward unobstructed view line $V_N$ (an angle formed between lines which are available when the base line $G_N$ and the unobstructed view line $V_N$ are orthographically projected onto X-Z plane), in other words, an angle indicating a component in a horizontal direction of the direction of a light source 41 of an adjacent rearward deflection angle measuring apparatus 400(N−1), $\Phi_N$: X-Z plane component of an angle (exterior angle) formed between a forward unobstructed view line $V_{N+1}$ and a rearward unobstructed view line $V_N$ of the deflection angle measuring apparatus 400(N) (an angle formed between lines which are available when the unobstructed view line $V_{N+1}$ and the unobstructed view line $V_N$ are orthographically projected onto X-Z plane), in other words, a deflection angle $\Phi$ at the base point of the deflection angle measuring apparatus 400(N) as a cardinal point, $\theta_N$: X-Z plane component of an angle which the unobstructed view line $V_{N+1}$ forms with the starting direction line $V_O$ (an angle formed by lines which are available when the unobstructed view line $V_{N+1}$ forms with the starting direction line $V_O$ are orthographically projected onto X-Z plane), and $l_N$: distance between the base points of the deflection angle measuring apparatus 400(N) and deflection angle measuring apparatus 400(N+1), in other words, the length of the unobstructed view line $V_{N+1}$.

FIG. 25 illustrates the example in which N deflection angle measuring apparatuses 400 are arranged within a range extending from the start-point measuring point to the end-point measuring point. The deflection measuring apparatus 400 arranged at the end-point measuring point is indicated by 400(N−1). On the advancing route of the underground excavator between the deflection angle measuring apparatus 400(0) at the start-point measuring point and the deflection angle measuring apparatus 400(N−1) at the end-point measuring point, plural intermediate measuring points are set as the excavation by the underground excavator advances. At these intermediate measuring points, deflection angle measuring apparatus 400(1) to 400(N−1) are arranged at appropriate intervals which make it possible to see through them each other. Further, the deflection angle measuring apparatus 400(0) at the start-point measuring point is arranged such that its base line $G_o$ is coincided with the starting direction line $V_o$, and therefore, the base line $G_o$ is located on Z-axis.

The position of excavation by the underground excavator in the direction of Y-axis on the three-dimensional coordinate system in FIG. 25 is eventually determined by computation on the basis of the angle $\theta_N$ and the distance $l_N$. Of these, the distance $l_N$ is measured by a suitable known method, while the angle $\theta_N$ is determined by computation from the $\Phi_N$ which is measured by the deflection angle measuring apparatus 400. A description will therefore be made of a method for computing the angle $\theta_N$. A deflection angle $\Phi_{K-1}$ at the base point of a desired $K^{th}$ deflection angle measuring apparatus 400(K−1) as a cardinal point can be determined by the following formula (26):

$$\Phi_{K-1} = \phi_{K-1} - \Psi_{K-1} \qquad (26)$$

The angle $\phi_{K-1}$ and angle $\Psi_{K-1}$ are provided with polarities by designating "positive" when the direction in which the unobstructed view lines $V_K, V_{K-1}$ are caused to turn over a minimum angle to overlap the base line $G_{K-1}$ is clockwise and "negative" when the above direction is counterclockwise.

Then, an angle $\phi_K$ which the unobstructed view line $V_{K+1}$ forms with the starting direction line $V_o$ at a desired measuring point can be determined by the following formula (4):

$$\phi_K = \phi_{K-1} + \Phi_K \quad (27)$$
$$= \Phi_0 + \Phi_1 + \cdots + \Phi_K$$
$$= \sum_{i=0}^{K} \Phi i$$

Once the angle $\phi_K$ at the desired measuring point can be determined as described above, the coordinate positions of the underground excavator in the direction of X-axis on the three-dimensional coordinate system can be determined by computation from the angles $\phi_K$ determined at the respective measuring points and the distances 1K successively measured during excavation by the underground excavator. Described specifically, as the quantity of a change of the coordinate position of the base point of the deflection angle measuring apparatus 400(K) in the direction of X-axis relative to the base point of a desired deflection angle measuring apparatus 400(K-1) can be determined as $l_K \sin \phi_{K-1}$, the coordinate position of the base point of the deflection angle measuring apparatus 400(N-1) (the end-point measuring point P set within the excavator 1) in the direction of X-axis in FIG. 25 can be determined by computing the formula $$\sum_{K=1}^{N-1} l_K \cdot \sin \theta_{K-1}.$$

Collectively expressing the position of the end-point measuring point P relative to the start-point measuring point O together with the component in the direction of Z-axis by a formula, it can be expressed by the following formula (28):

$$\vec{OP} = (Z_P, i \cdot y_p) \quad (28)$$
$$= \sum_{K=1}^{N-1} l_K \cdot e^{i\theta_{K-1}}$$

In the above formula, $i2=-1$, ZP means the Z-axis coordinate point of the end-point measuring point P, and yp means the Y-axis coordinate point of the end-point measuring point P. As is understood from the foregoing, the position of excavation by the underground excavator is measured by computing the position of the end-point measuring point P relative to the start-point measuring point O by computing means, and this computation is performed at the central processing unit 7 in this example.

The description has been made about the method for measuring Y-axis coordinate positions corresponding to individual measuring points set as the excavation by the underground excavator advanced. Coordinate positions in the direction of X-axis can also be measured by performing computation by a method similar to the above-described method.

In the above-described position measuring apparatus for the underground excavator, the front light source 41 in the deflection angle measuring apparatus 400(0) arranged at the start-point measuring point O out of the deflection angle measuring apparatuses 400(0) to 400(N-1) arranged at the respective measuring points requires, as a constituent element, the deflection-angle measuring light source of the optical deflection angle measuring apparatus 4 of FIG. 19. Further, the detector built in the deflection angle measuring apparatus 400(0) at the start-point measuring point O is not an element constituting the optical deflection angle measuring apparatus 4 of FIG. 19, but go, detects the direction of the light source 42 of the adjacent deflection angle measuring apparatus 400(1) and functions as a start-point measuring detector which detects the angle $\theta_o$ of the unobstructed view line $V_1$ relative to the starting direction line $V_o$, and is hence indispensable in measuring the position of excavation by the underground excavator. Similarly, the light source 42 of the deflection angle measuring apparatus 400(1) at the intermediate point adjacent the deflection angle measuring apparatus 400(0) at the start-point measuring point O is not an element constituting the optical deflection angle measuring apparatus 4 of FIG. 19, but is required as a light source for the start-point measuring point, which emits a diffuse light toward the start-point measuring point O so that the angle $\theta_o$ can be detected by the start-point-measuring detector.

In the deflection angle measuring apparatus 400(N-1) arranged at the end-point measuring point P, the rear light source 42 is needed as an element constituting the deflection-angle-measuring light source of the optical deflection angle measuring apparatus 4 of FIG. 19, but the front light source 41 is unnecessary. Further, the detector built in the deflection angle measuring apparatus 400(N-1) at the end-point measuring point P is useful in detecting the spatial position of the excavator 1 in the pitching direction and the yawing direction, but can be replaced by other means such as a pitching meter and a yawing meter and is hence not an indispensable element, and is not an element constituting the optical deflection angle measuring apparatus of FIG. 19. Similarly, the front light source 41 of the deflection angle measuring apparatus 400(N-1) at the intermediate measuring point adjacent the deflection angle measuring apparatus 400(N-1) at the end-point measuring point P is useful but is not an indispensable element. For these reasons, when the unit-form optical deflection angle measuring apparatuses 400 are arranged at the start-point measuring point O and the end-point measuring point P in addition to the intermediate measuring points as in this example, means which are needed may only be activated by software. When the optical deflection angle measuring apparatuses 4 of FIG. 19 are used in the position measuring apparatus for the underground excavator, the arrangement and use of unified unit-form deflection angle measuring apparatuses 400 at the respective measuring points as mentioned above make it possible not to reduce the kinds of equipments to be manufactured, thereby not only saving the labor for their manufacture but also permitting use of fewer kinds of equipments and hence bringing about convenience upon using the equipments.

The position measuring apparatus for the underground excavator measures the position of excavation by the underground excavator by using the optical deflection angle measuring apparatus of FIG. 19. As the principal parts of the technical means adopted therein are the same, the position measuring apparatus for the underground excavator can exhibit similar advantageous effects as the optical deflection angle measuring apparatus 4 of FIG. 19. Namely, due to the use of a laser beam as a light source, the conventional technique requires an operation to turn a wedge prism upon measuring the position of excavation by an underground excavator such that a laser beam is directed onto a predetermined position of a position detecting element. On the other hand, the present invention uses as light sources those capable of emitting diffuse lights so that, even when the position or spatial position of the deflection angle measuring apparatus 400 varies during excavation of the tunnel 2, the lights of the light sources 41,42 can be precisely directed onto the position detecting elements 412-1,412-2. The present invention therefore does not require such an operation and does not require any operating mechanism therefor. Further, even when the mounted spatial positions of the detectors 410 and light sources 41,42 are not unified or vary due to yawing and pitching during excavation by the underground excavator, the position of excavation by the underground excavator can always be correctly computed and measured without being affected by such potential problems provided that the setting of positions is precisely performed upon mounting the detectors 410 and light sources 41,42 at the intermediate measuring points.

Capability of Exploitation in Industry

As is apparent from the above description, the position measuring apparatus of this invention for the underground excavator does not require an operation which would otherwise be required to direct light onto light-receiving means upon measuring the position of excavation by the underground excavator, and does not require any operation mechanism therefor. Further, even when the mounted spatial positions of the measuring units are not unified or vary due to yawing and pitching during excavation by the underground excavator, the position of excavation by the underground excavator can always be correctly computed and measured without being affected by such potential problems. As the spatial position of the excavator in the pitching and yawing directions can be detected by the measured-point measuring unit, the excavator is allowed to excavate forward still more correctly.

If a measuring unit usable as an intermediate measuring unit is also used as at least one of a cardinal-point measuring unit and a measured-point measuring unit, measuring units for use as intermediate measuring units can also be used as the cardinal-point measuring unit and/or measured-point measuring unit. This makes it possible not to reduce the kinds of equipments to be manufactured, thereby not only saving the labor for their manufacture but also permitting use of fewer kinds of equipments and hence bringing about convenience upon using the equipments.

Upon arranging each intermediate measuring unit in a tunnel, the intermediate measuring unit may be arranged by mounting it on a temporary extension which is temporarily arranged with an arranged distance extended as the excavation of the tunnel proceeds and which is removed subsequent to completion of the excavation of the tunnel. This is convenient because the intermediate measuring unit can be removed automatically upon removal of the temporary extension.

Upon computing and measuring by the computing means the position of the measured point relative to the measuring cardinal point on the basis of the data on the directions of the respective light sources and the data on the distances between the individual measuring units and their adjacent measuring units as obtained based on the detection results by the respective measuring units, distance measuring means capable of automatically detecting a varying distance in a predetermined zone of the tunnel may be arranged, and concerning a zone a distance of which varies, data on distances as obtained from results of detections by the distance measuring means may be continuously inputted to the computing means, and concerning other zones, established distance data may be inputted intermittently. This can save the cost and space which would otherwise be required for the arrangement of means for measuring distances in the tunnel.

The underground excavator may be a shield machine which excavates forward in the ground while pushing an excavator by a shield jack, and the distance measuring means may be a stroke detector for the shield jack. As an alternative, the underground excavator may be a pipe-machine which pushes a buried pipe forward by a final lining jack arranged in a starting shaft, and the distance measuring means may be a stroke detector for the final lining jack. In addition to exhibition of the above-described advantageous effects, a shield jack stroke meter or final lining jack stroke meter, which the shield machine or pipe-jacking machine is usually provided with, can also be used for the measurement of distances in the tunnel, and additional arrangement of any special distance-measuring means is not needed for the measurement of such distances.

Further, at least one of the cardinal-point measuring unit, the measured-point measuring unit and the intermediate measuring unit may have light sources arranged such that the light sources are located symmetrically in a pair with a line interposed therebetween, said line extending through a center of the associated converging means and intersecting a surface of the associated light-receiving means at a right angle, and can emit diffuse lights in the same one of forward and rearward directions. Averaging of detection results on the directions of the light sources arranged symmetrically in the pair makes it possible to simplify computation upon measuring the position of the underground excavator.

At least one of the cardinal-point measuring unit, the measured-point measuring unit and the intermediate measuring unit may have plural light sources capable of emitting diffuse lights in the same one of forward and rearward directions; and based on data concerning directions of the plural light sources of the measuring unit provided with the plural light sources and also the direction of the light source of the adjacent measuring unit with its light-receiving means arranged to permit detection of the directions of the plural light sources, said data being available from both of these measuring units, and also data concerning positions of lights from the plural light sources as received by the light-receiving means of the adjacent measuring unit, the distance between the measuring units may be measured. This makes it possible to save the cost and space which would otherwise be required for the arrangement of means for measuring distances in the tunnel, and also makes it possible to use the individual measuring units, which are arranged specifically for the measurement of the position of the underground excavator, for the measurement of distances in the tunnel, too, thereby permitting use of the specifically-arranged equipments for multiple purposes.

In addition, at least one of the cardinal-point measuring unit, the measured-point measuring unit and the intermediate measuring unit may have a pair of light sources capable of emitting diffuse lights in the same one of forward and rearward directions, and based on data concerning inclinations of images of the paired light sources, said images being formed in a pair on the adjacent measuring unit, a quantity of rolling of the adjacent measuring unit may be measured. Since no additional arrangement of any special measuring equipments is needed for the measurement of the quantity of rolling of the measuring unit, it is possible to save the cost and space which would otherwise be required for the arrangement of such equipments. Further, the measuring units arranged specifically for the measurement of the position of the underground excavator can also be used for the measurement of the quantity of rolling of the measuring unit, thereby making it possible to use the specifically-arranged equipments for multiple purposes.

According to the optical deflection angle measuring apparatus of the present invention, an operation to direct light onto a position detecting element is not required upon optically measuring a deflection angle. Further, it is not necessary to provide light sources with their own means for converging diffuse lights, and a common converging means can be used. It is therefore possible to obtain an optical deflection angle measuring apparatus which, even if external force such as vibrations are applied, can provide measurement results without being affected by the external force. Moreover, the measurement results of a deflection are not affected by the mounted spatial positions of the detector and light sources angle provided that setting of their positions is precisely performed upon mounting the detector and light sources at the intermediate measuring point.

The diffuse lights from the respective light sources, said diffuse lights being about to enter the converging means, may be converted into linearly-polarized diffuse lights with oscillation directions thereof intersecting each other at a right angle, and the respective light-direction changing means may be constructed of polarized-light reflecting elements, respectively, such that one of the linearly-polarized diffuse lights, which is about to enter the converging means, may be allowed to be transmitted and the other linearly-polarized diffuse light, which is in a course of convergence by the converging means, may be guided to the corresponding position detecting element. This makes it possible to effectively guide a diffuse light from each deflection-angle-measuring light source, which is about to enter the corresponding converging means, to the corresponding position detecting element without losing its light quantity.

According to the position measuring apparatus of this invention for the underground excavator, an operation to direct light onto a position detecting element is not needed upon measuring the position of excavation by the underground excavator. Further, use of the deflection angle measuring apparatuses of this invention as detectors makes it unnecessary to provide the light sources with their own means for converging diffuse lights and makes it possible to use a converging means in common. The individual light sources, which are arranged at the start-point measuring point and the intermediate measuring points, respectively, may be arranged at positions equivalent to the center positions of the converging means, which constitute the detectors arranged at the respective measuring points, by using light-direction-changing means such as reflecting prisms. This makes it possible to bring the optical axis of lights, which are given and received between the measuring units, into coincidence with an unobstructed view line connecting the centers of the converging means, said centers serving as cardinal points. As a result, it has become unnecessary to correct the correction of a deviation of the optical axes of light sources, between which lights are given and received between the measuring units, from the unobstructed view line connecting the base points of the measuring units with each other in accordance with the positional relationship of the respective center positions of the forward and rearward lenses 4–11 and forward and rearward light sources 42 with the base points set on the measuring units and in accordance with tilted values of spatial positions of the measuring units due to pitching or yawing. As a consequence, even when the detectors and light sources are tilted due to pitching or yawing, the position of excavation by the underground excavator can always be measured correctly without measuring and controlling the values of their tiltings.

The measurement results of deflection angles an not affected by the mounted spatial positions of the detectors and light sources and the position of excavation by the underground excavator can always be correctly computed and measured, provided that upon mounting the detector and light sources at the intermediate measuring point, the setting of their positions is precisely performed.

What is claimed is:

1. A position measuring apparatus for an underground excavator, said apparatus being useful in measuring a position of excavation by said underground excavator advancing in the ground while excavating a tunnel and being adapted to measure a position of a measured point, which is arranged at a front in an excavating direction and serves as an indication for said position of excavation, on a basis of its positional relationship with a measuring cardinal point arranged at a rear in said excavating direction and serving as a cardinal point for said measurement, comprising:

a cardinal-point measuring unit for setting said measuring cardinal point, said cardinal-point measuring unit having a light source capable of emitting a light forward, converging means capable of converging a diffuse light from a forward light source, and light-receiving means arranged such that said light-receiving means can receive a light converged by said converging means and can detect a direction of said forward light source on a basis of a position of said light so received, said position being located in a two-dimensional plane;

a measured-point measuring unit for setting said measured point, said measured-point measuring unit being arranged on said underground excavator and having a light source capable of emitting a diffuse light rearward, converging means capable of converging a diffuse light from a rear light source, and light-receiving means arranged such that said light-receiving means can receive a light converged by said converging means and can detect a direction of said rear light source on a basis of a position of said light so received, said position being located in a two-dimensional plane;

at least one intermediate measuring unit arranged between said cardinal-point measuring unit and said measured-point measuring unit in said tunnel and having a light source capable of emitting diffuse lights forward and rearward, converging means capable of converging diffuse lights from forward and rearward light sources, respectively, and light-receiving means arranged such that said light-receiving means can receive respective lights converged by said converging means and can detect directions of said forward and rearward light sources on a basis of said positions of said respective lights so received, said positions being located in their corresponding two-dimensional plane; and computing means for computing and measuring a position of said measured point relative to said measuring cardinal point on a basis of data, which are concerned with said two-dimensional directions of said respective light sources as determined based on detection results at said respective measuring units consisting of said cardinal-point measuring unit, said measured-point measuring unit and said intermediate measuring unit, and data on distances between said individual measuring units and their adjacent measuring units.

2. The position measuring apparatus according to claim 1, wherein each converging means and its associated light-receiving means comprise a convex lens and a CCD image pickup device arranged in its corresponding two-dimensional plane and in parallel with said convex lens, whereby based on an offset of an image-forming point of the corresponding light source on a surface of said CCD image pickup device from a reference line, which is a line extending through a center of said convex lens and also extending at a right angle relative to said surface of said CCD image pickup device, and a distance between said convex lens and said CCD image pickup device, an angle which an optical axis of said light source forms with said reference line is determined to obtain data on said direction of said light source.

3. The position measuring apparatus according to claim 1, wherein each light-receiving means is a position detecting element which can ascertain a position of a light spot by using a surface resistance of a photodiode.

4. The position measuring apparatus according to claim 1, wherein a measuring unit usable as said intermediate measuring unit is also used as at least one of said cardinal-point measuring unit and said measured-point measuring unit.

5. The position measuring apparatus according to claim 1, wherein upon arranging said intermediate measuring unit in said tunnel, said intermediate measuring unit is arranged by mounting the same on a temporary extension which is temporarily arranged with an arranged distance extended as said excavation of said tunnel proceeds and which is removed subsequent to completion of said excavation of said tunnel.

6. The position measuring apparatus according to claim 1, wherein upon computing and measuring by said computing means said position of said measured point relative to said measuring cardinal point on the basis of said data on said two-dimensional directions of said respective light sources and said data on said distances between said individual measuring units and their adjacent measuring units as obtained based on said detection results by said respective measuring units, distance measuring means capable of automatically detecting said distances between said individual measuring units and their adjacent measuring units is arranged, and data on said respective distances as obtained from results of detections by said distance measuring means are automatically inputted to said computing means.

7. The position measuring apparatus according to claim 1, wherein upon computing and measuring by said computing means said position of said measured point relative to said measuring cardinal point on the basis of said data on said two-dimensional directions of said respective light sources and said data on said distances between said individual measuring units and their adjacent measuring units as obtained based on said detection results by said respective measuring units, distance measuring means capable of automatically detecting a varying distance in a predetermined zone of said tunnel is arranged; and concerning a zone a distance of which varies, data on distances as obtained from results of detections by said distance measuring means are continuously inputted to said computing means, and concerning other zones, established distance data are inputted intermittently.

8. The position measuring apparatus according to claim 7, wherein said underground excavator is a shield machine which excavates forward in the ground while pushing an excavator by a shield jack, and said distance measuring means is a stroke detector for said shield jack.

9. The position measuring apparatus according to claim 7, wherein said underground excavator is a pipe-machine which pushes a buried pipe forward by a final lining jack arranged in a starting shaft, and said distance measuring means is a stroke detector for said final lining jack.

10. The position measuring apparatus according to claim 1, wherein at least one of said cardinal-point measuring unit, said measured-point measuring unit and said intermediate measuring unit has light sources arranged such that said light sources are located symmetrically in a pair with a line interposed therebetween, said line extending through a center of the associated converging means and intersecting a two dimensional surface of the associated light-receiving means at a right angle, and can emit diffuse lights in the same one of forward and rearward directions.

11. The position measuring apparatus according to claim 1, wherein at least one of said cardinal-point measuring unit, said measured-point measuring unit and said intermediate measuring unit has plural light sources capable of emitting diffuse lights in the same one of forward and rearward directions; and based on data concerning two-dimensional directions of said plural light sources of said measuring unit provided with said plural light sources and also said two-dimensional direction of said light source of the adjacent measuring unit with its light-receiving means arranged to permit detection of said two dimensional directions of said plural light sources, said data being available from both of these measuring units, and also data concerning positions, in their corresponding two-dimensional planes, of lights from said plural light sources as received by said light-receiving means of said adjacent measuring unit, said distance between said measuring units is measured.

12. The position measuring apparatus according to claim 1, wherein at least one of said cardinal-point measuring unit, said measured-point measuring unit and said intermediate measuring unit has a pair of light sources capable of emitting diffuse lights in the same one of forward and rearward directions; and based on data concerning inclinations of images of said paired light sources, said images being formed in a pair on the adjacent measuring unit, a quantity of rolling of said adjacent measuring unit is measured.

* * * * *